Figure 1A:
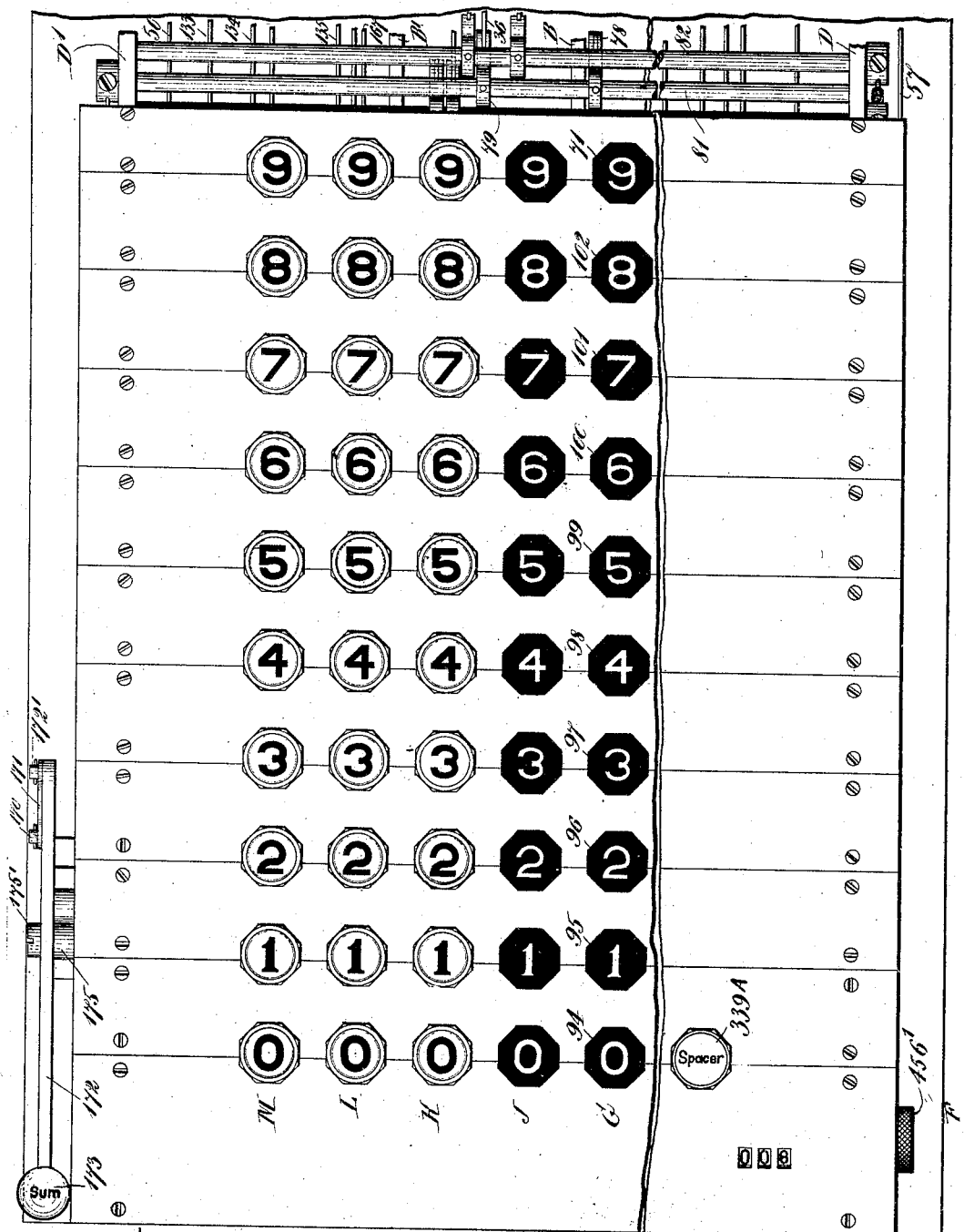

G. WALKER.
TYPOGRAPHICAL COMPUTING MACHINE.
APPLICATION FILED JAN. 17, 1910.
996,173.
Patented June 27, 1911.
42 SHEETS—SHEET 1.
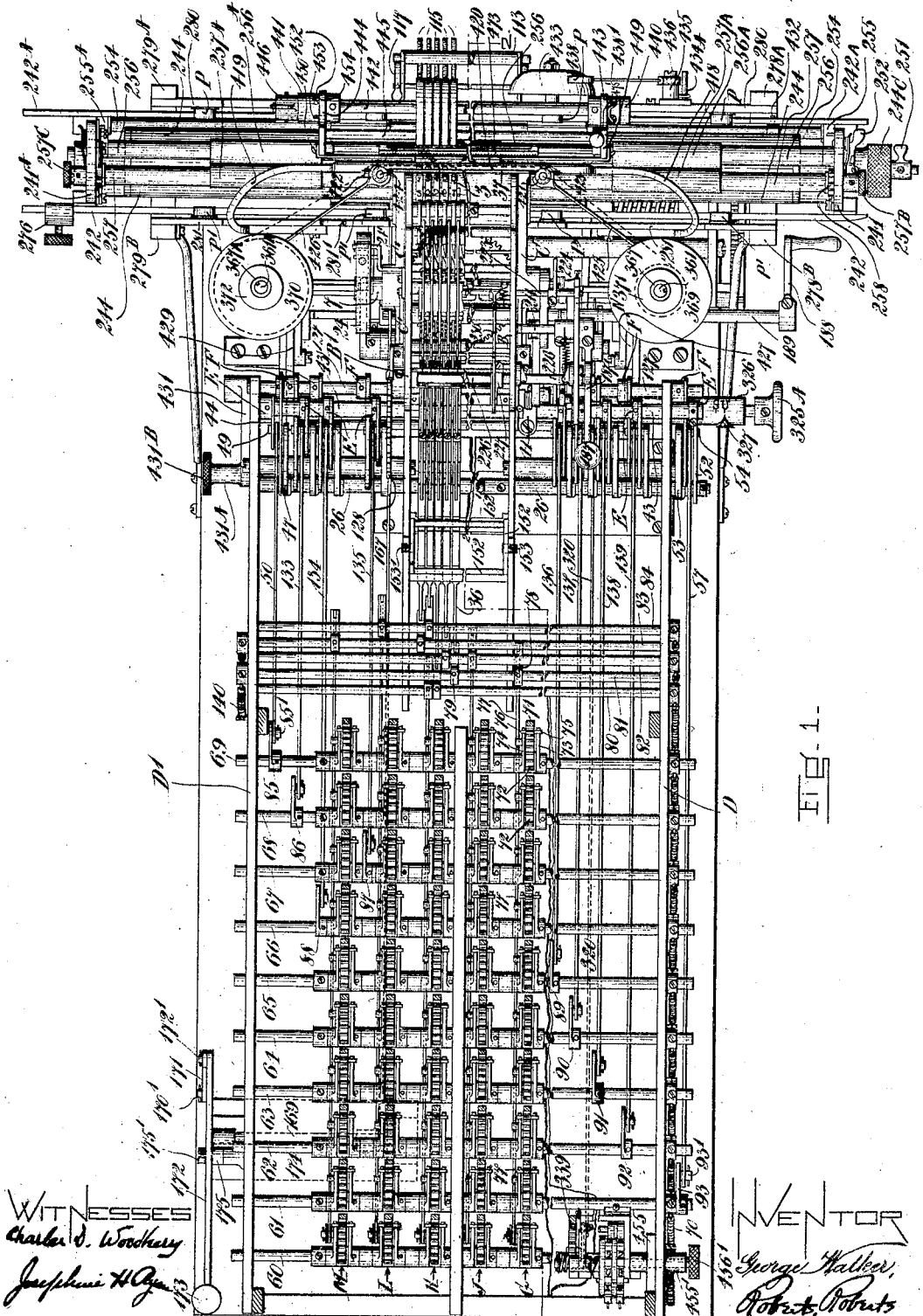

G. WALKER.
TYPOGRAPHICAL COMPUTING MACHINE.
APPLICATION FILED JAN. 17, 1910.

996,173.

Patented June 27, 1911.
42 SHEETS—SHEET 2.

WITNESSES
Charles D. Woodberry
Josephine H. Ryan

INVENTOR
George Walker
By Roberts, Roberts & Cushman
Attorneys.

G. WALKER.
TYPOGRAPHICAL COMPUTING MACHINE.
APPLICATION FILED JAN. 17, 1910.
996,173.
Patented June 27, 1911.
42 SHEETS—SHEET 3.
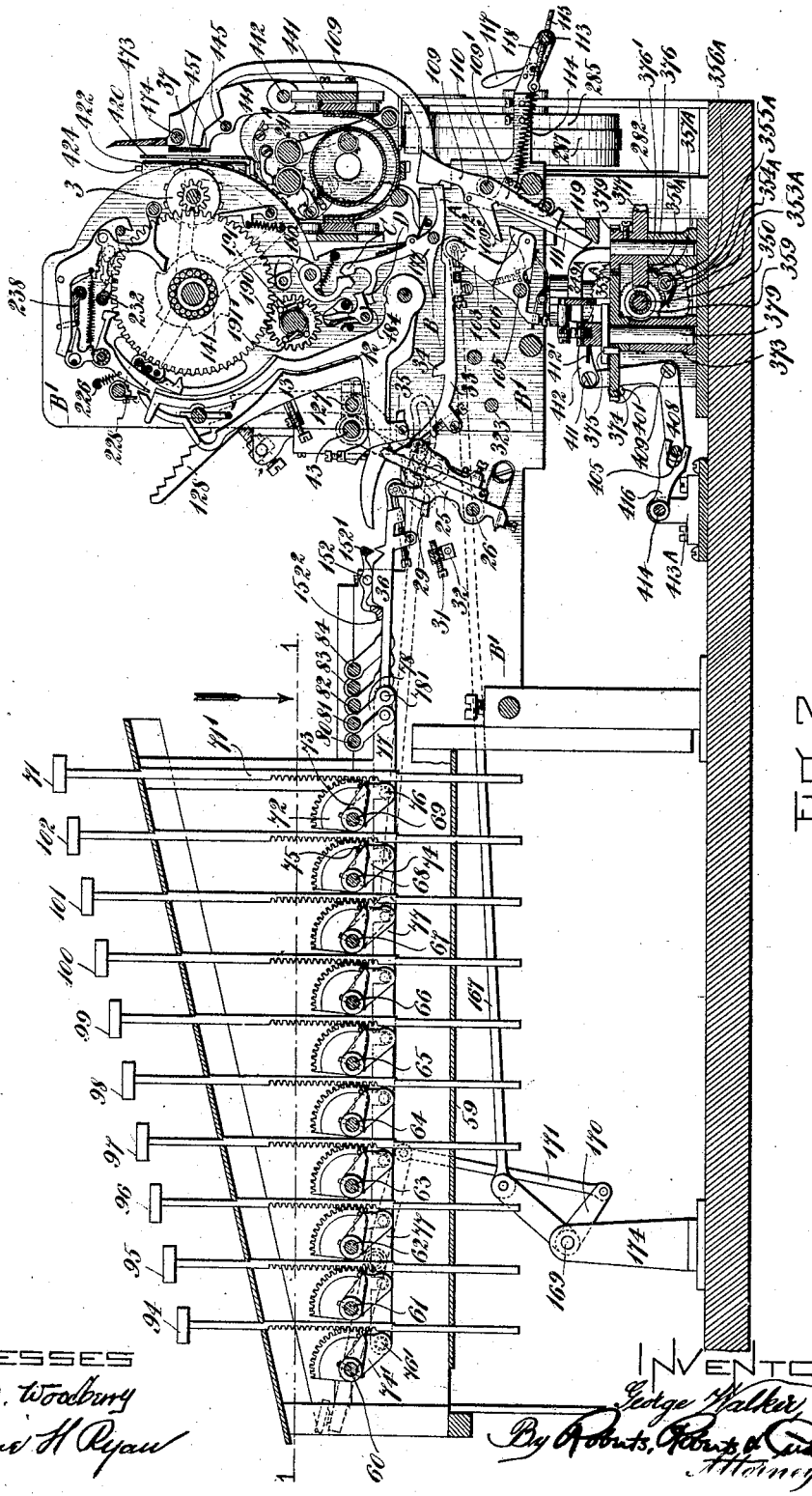

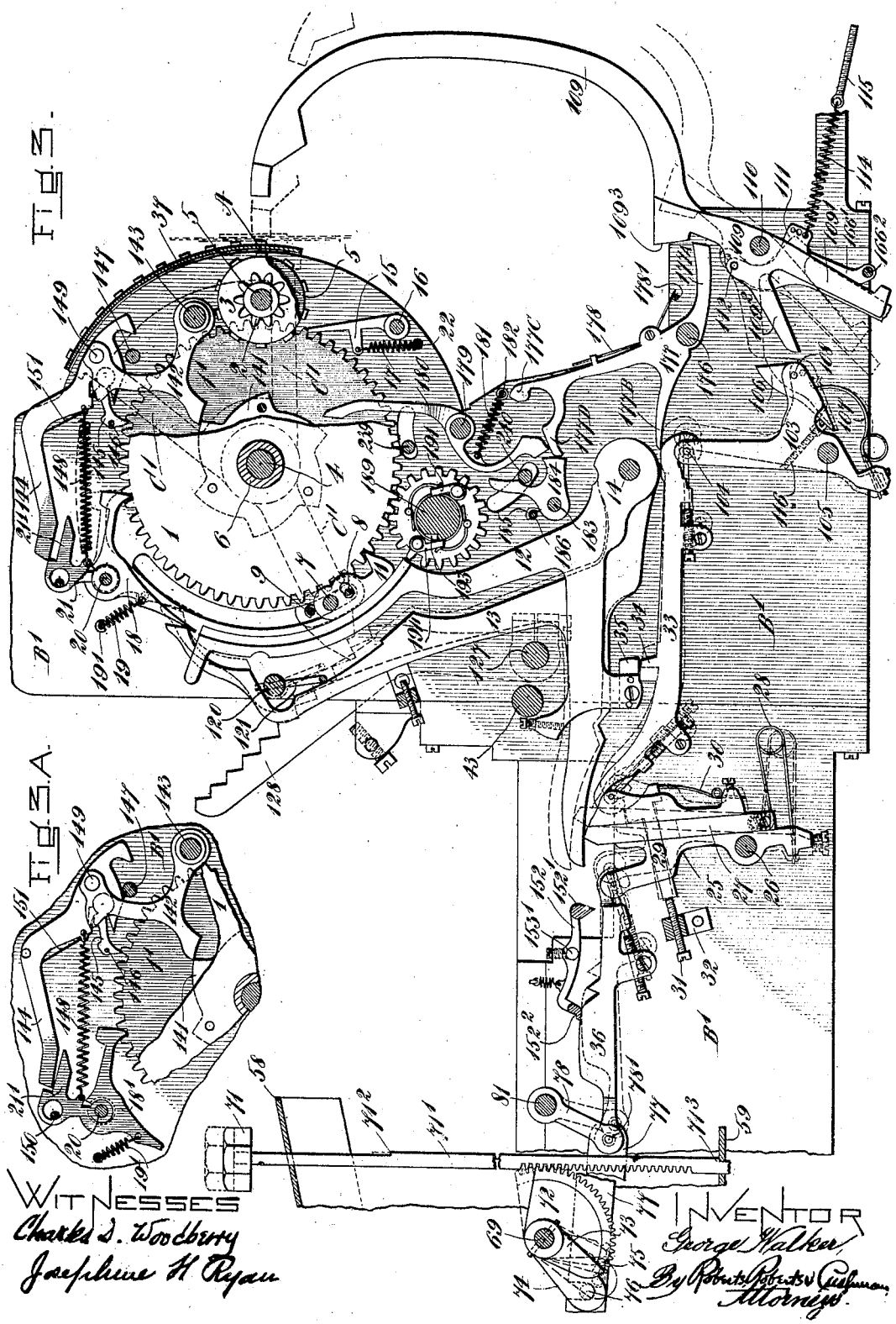

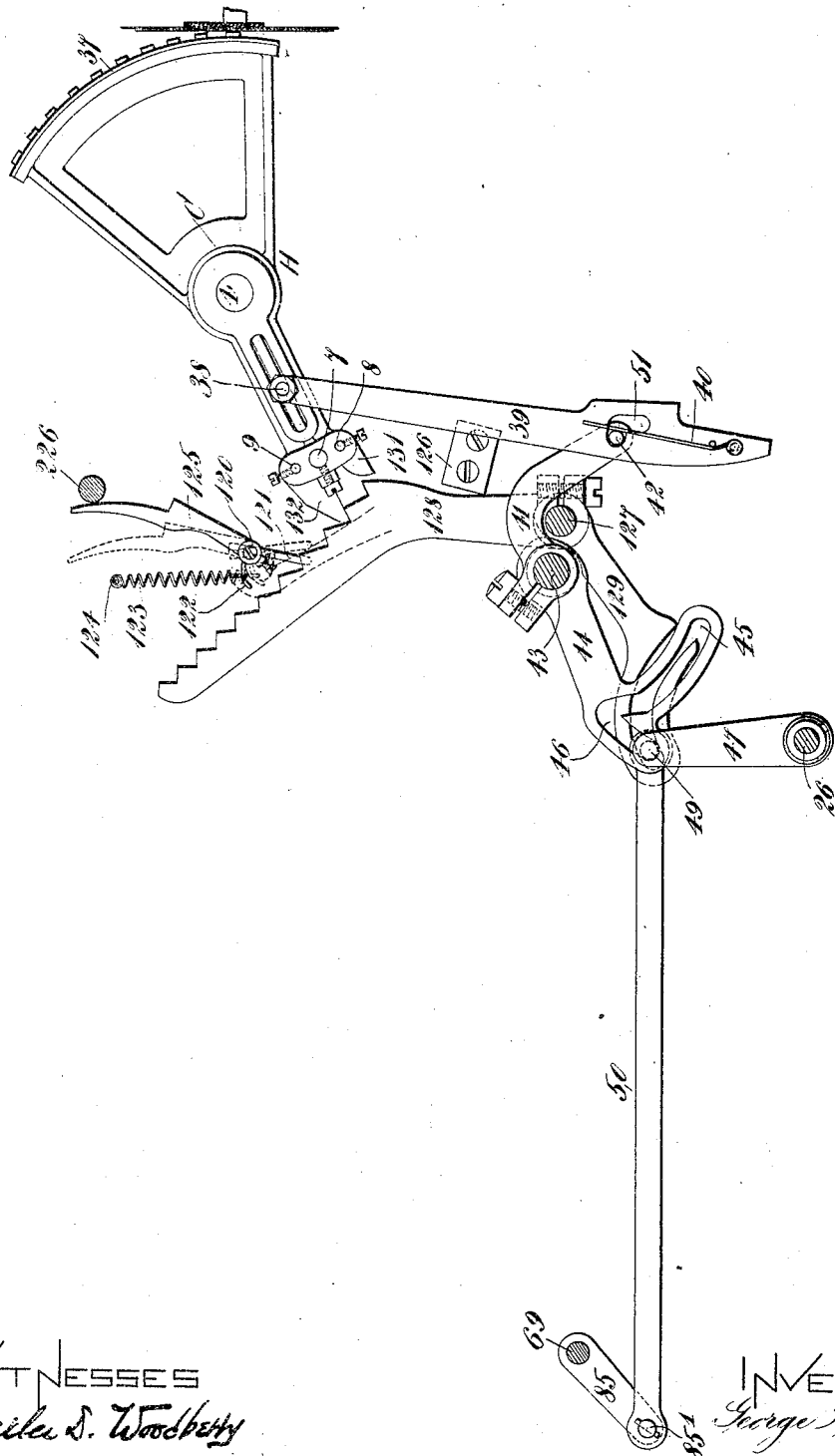

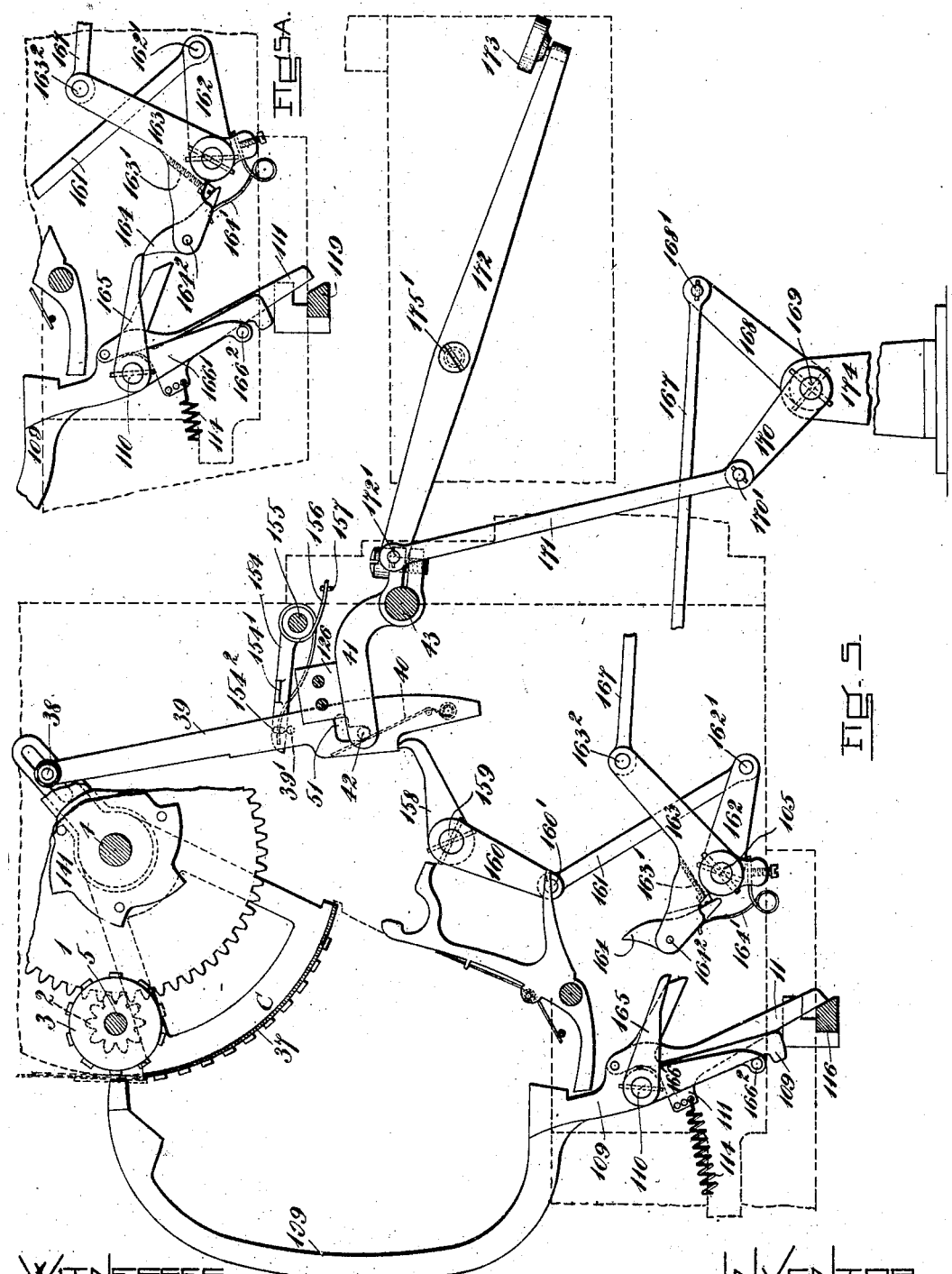

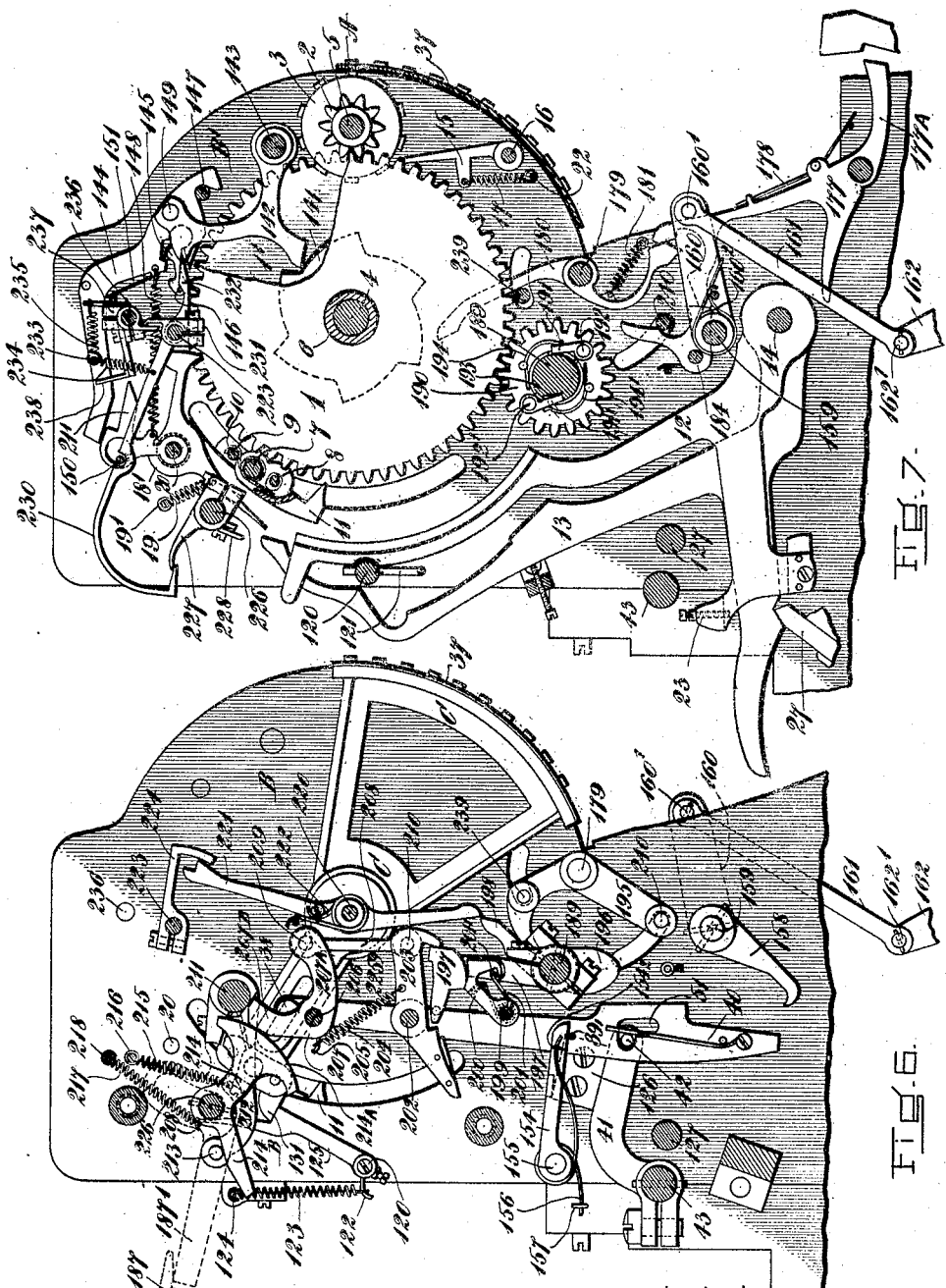

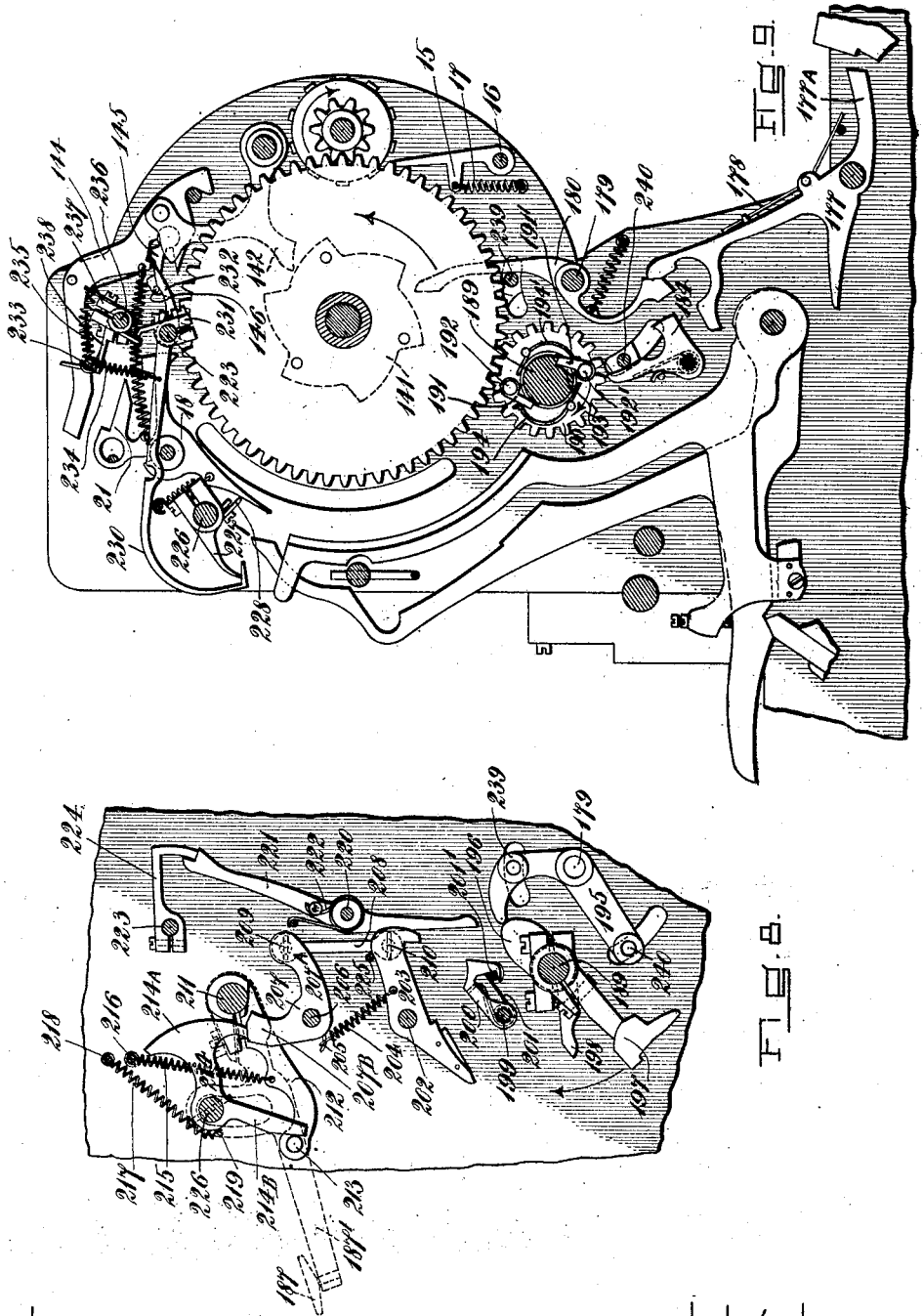

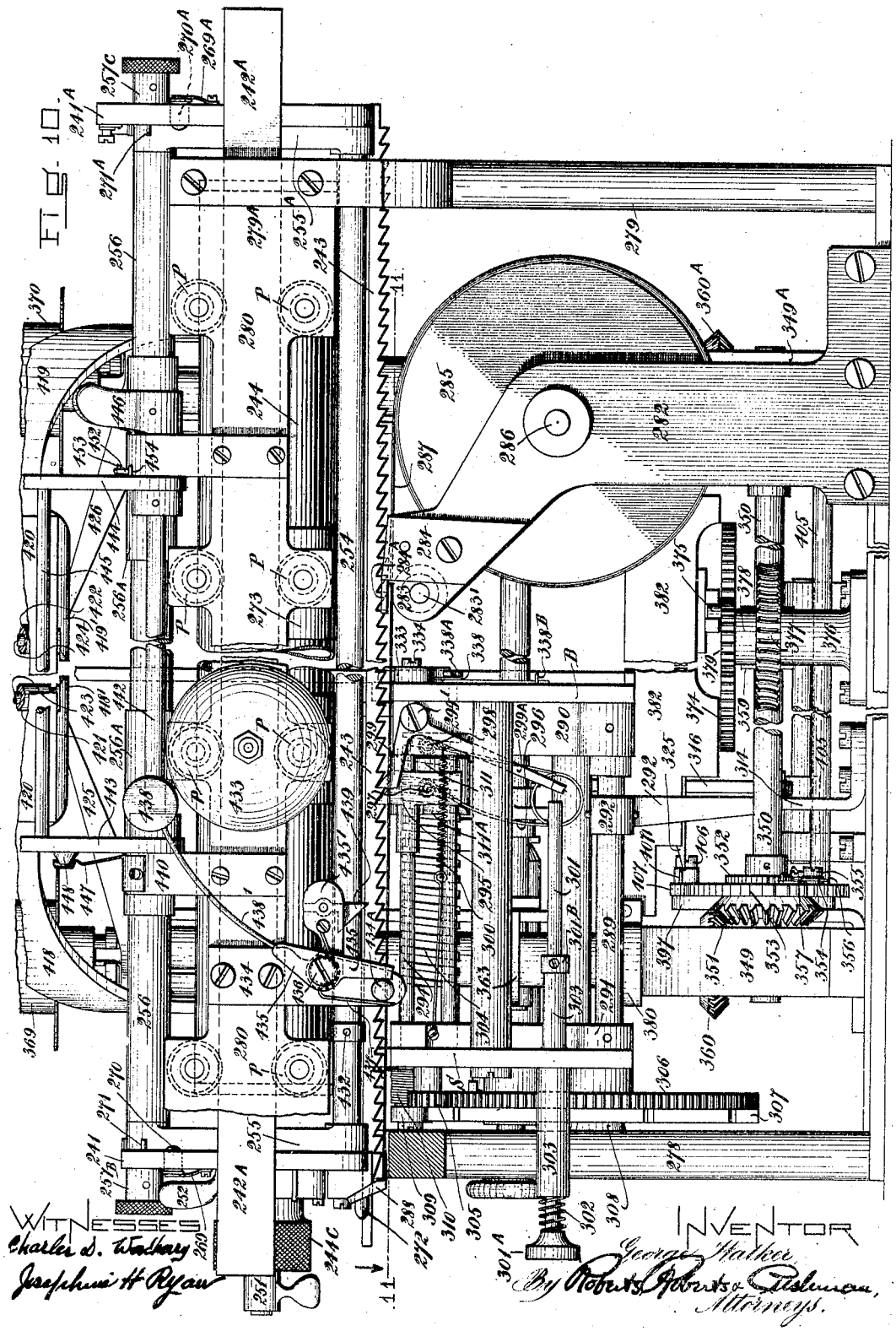

G. WALKER.
TYPOGRAPHICAL COMPUTING MACHINE.
APPLICATION FILED JAN. 17, 1910.
996,173.
Patented June 27, 1911.
42 SHEETS—SHEET 10.
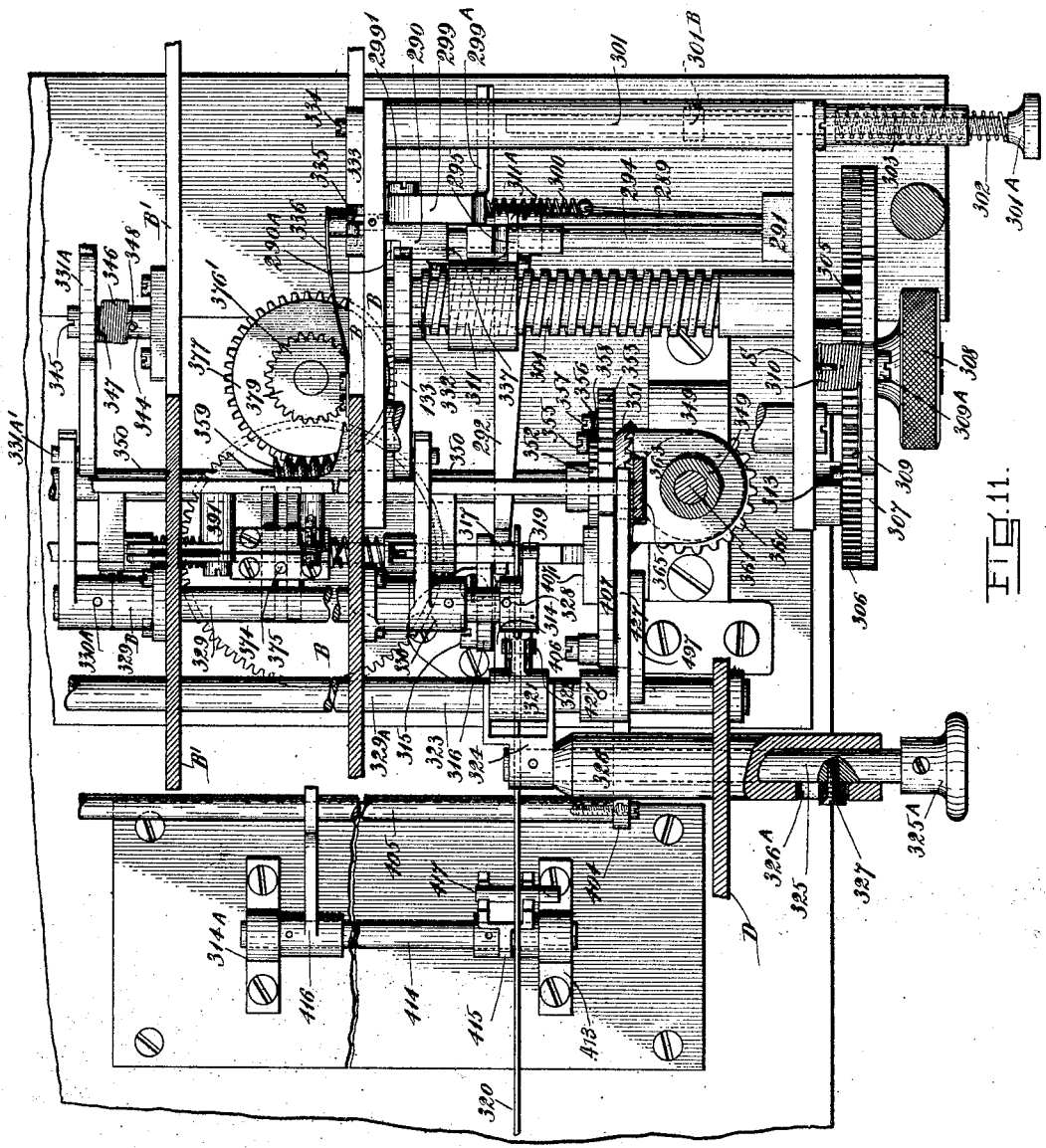
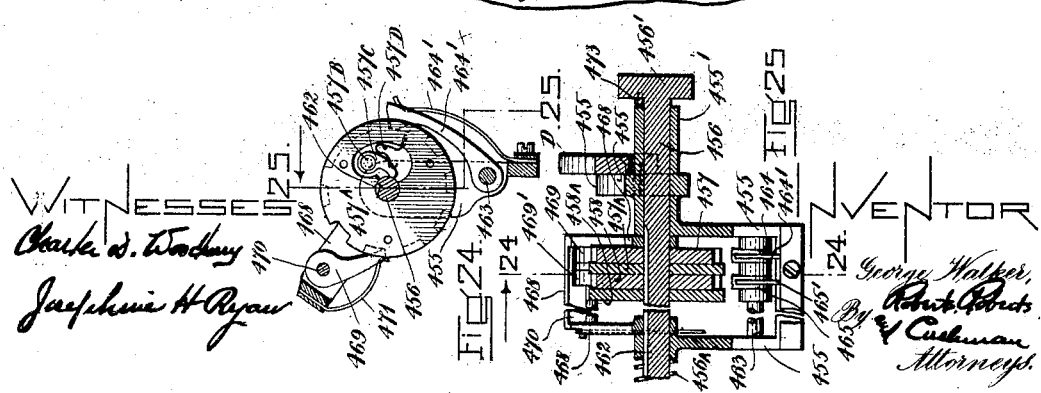

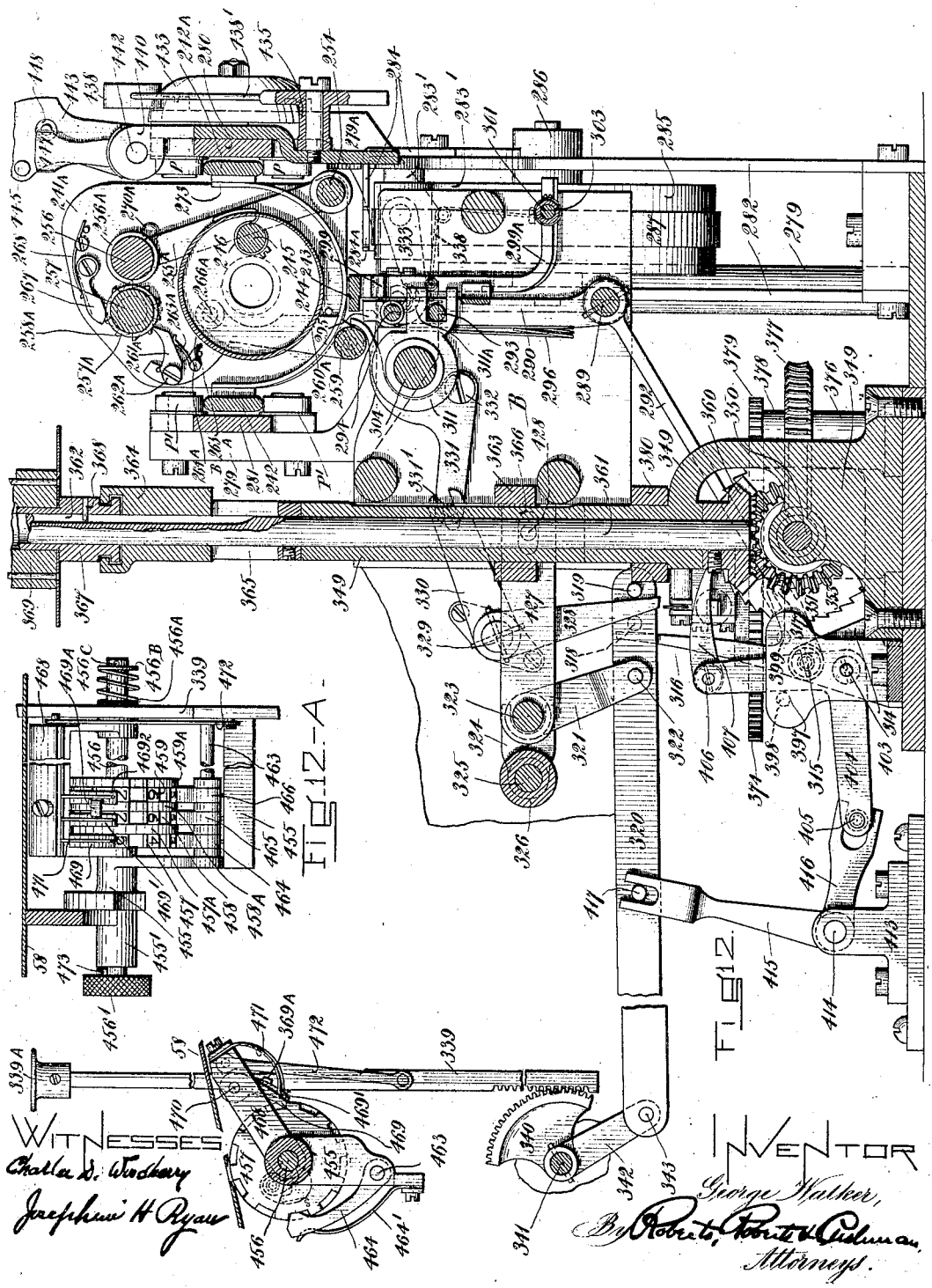

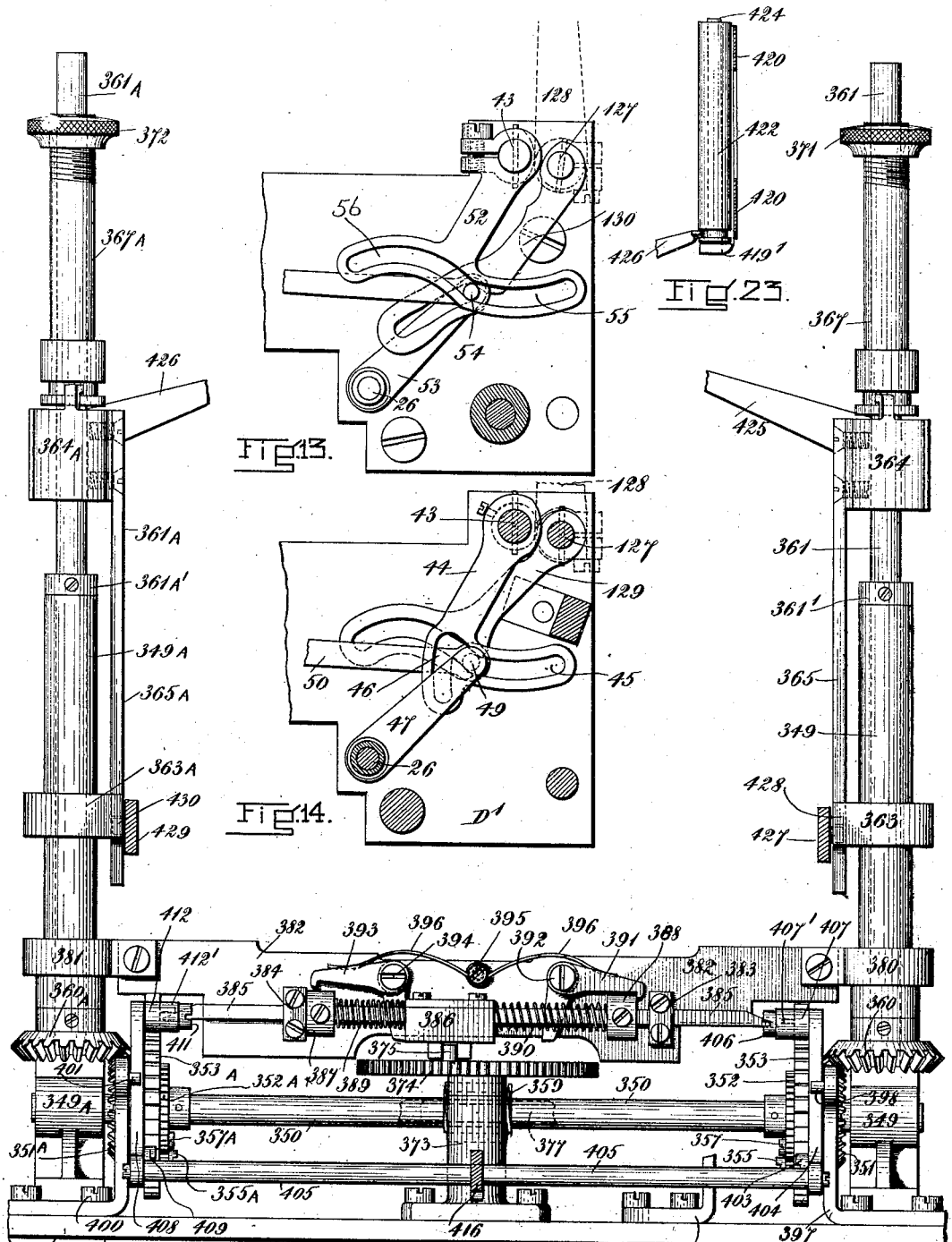

G. WALKER.
TYPOGRAPHICAL COMPUTING-MACHINE.
APPLICATION FILED JAN. 17, 1910.

996,173.

Patented June 27, 1911.
42 SHEETS—SHEET 13.

Witnesses
Charles D. Watkins
Josephine H. Ryan

Inventor
George Walker
By Roberts, Roberts & Cushman
Attorneys.

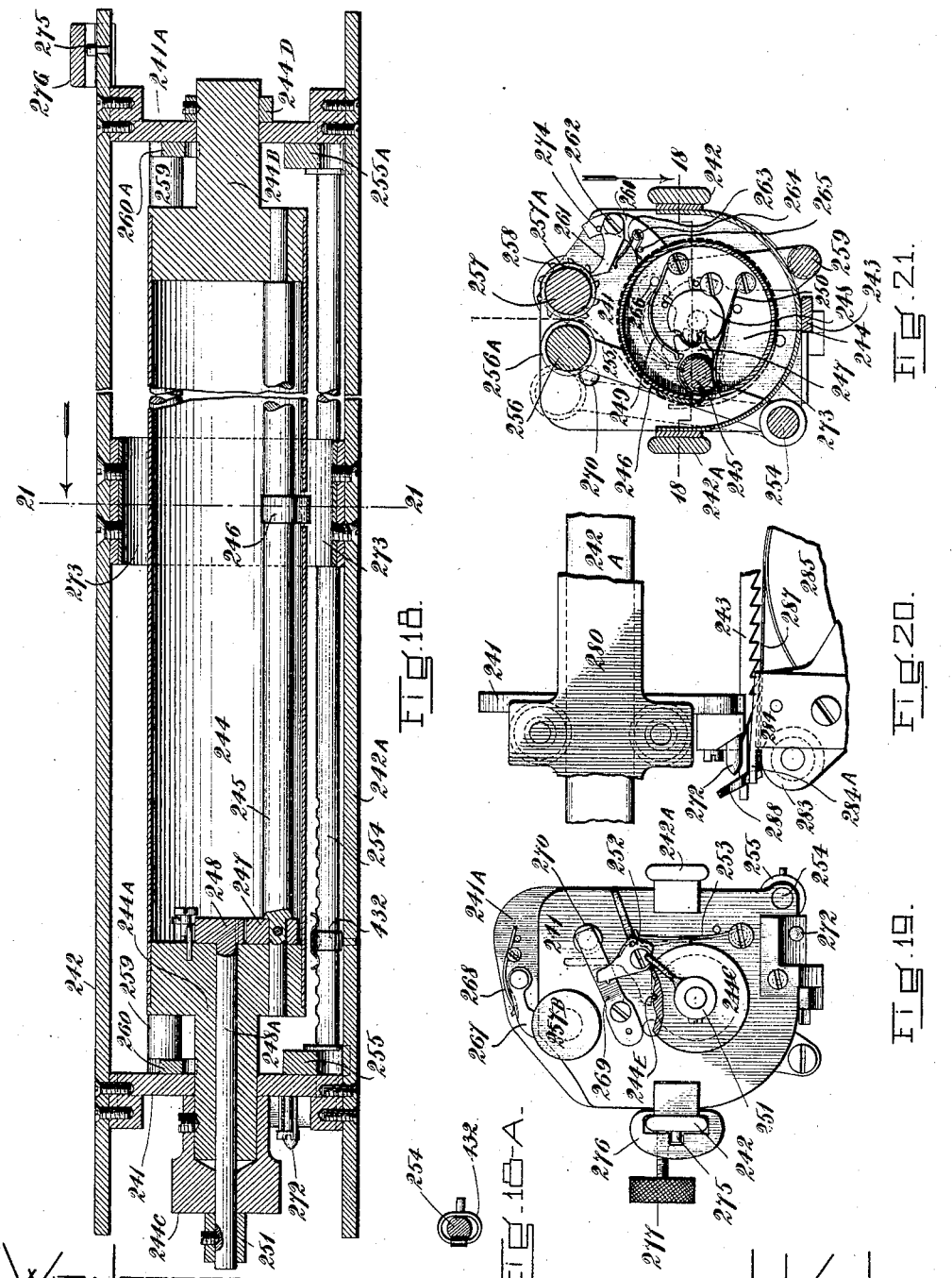

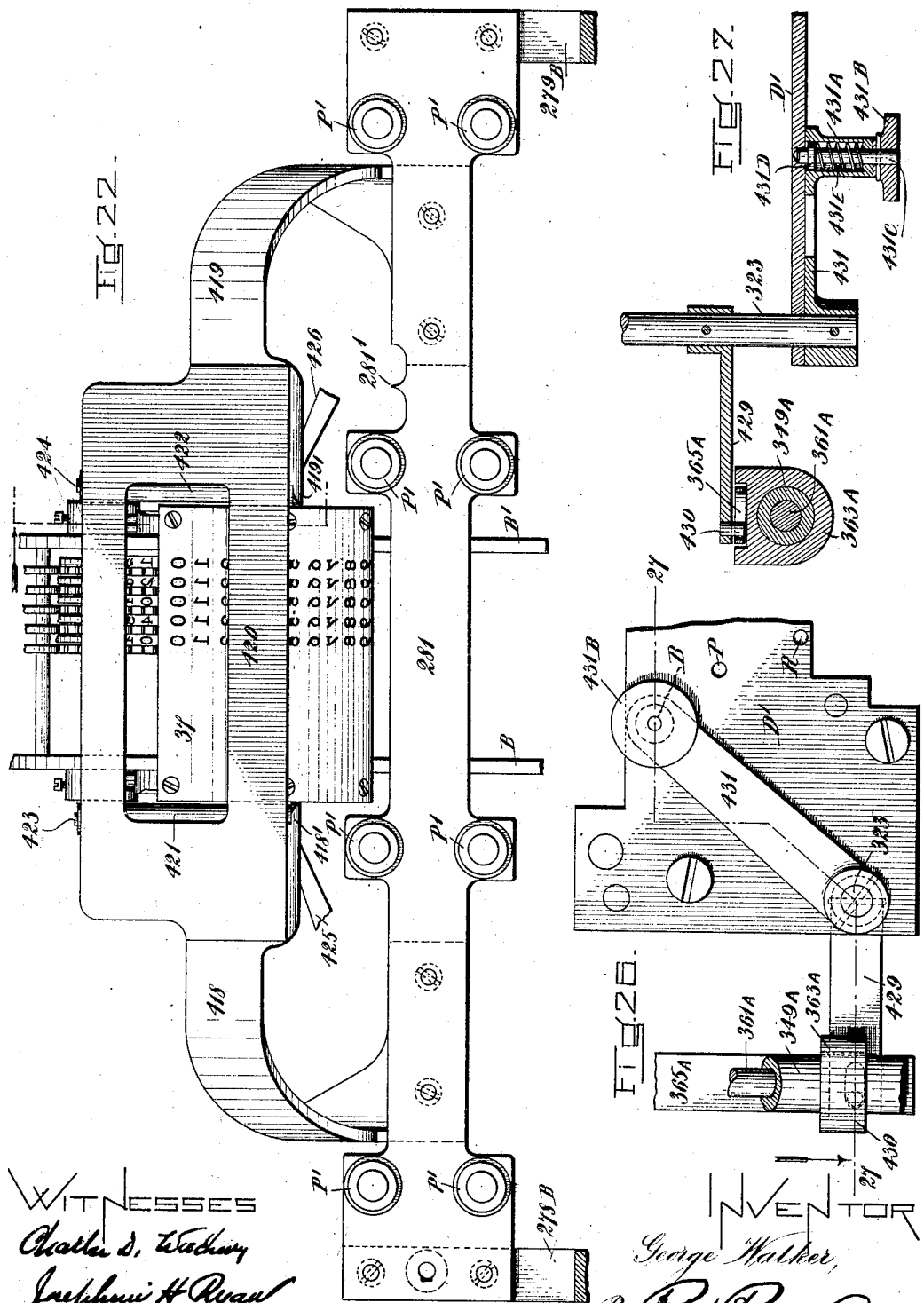

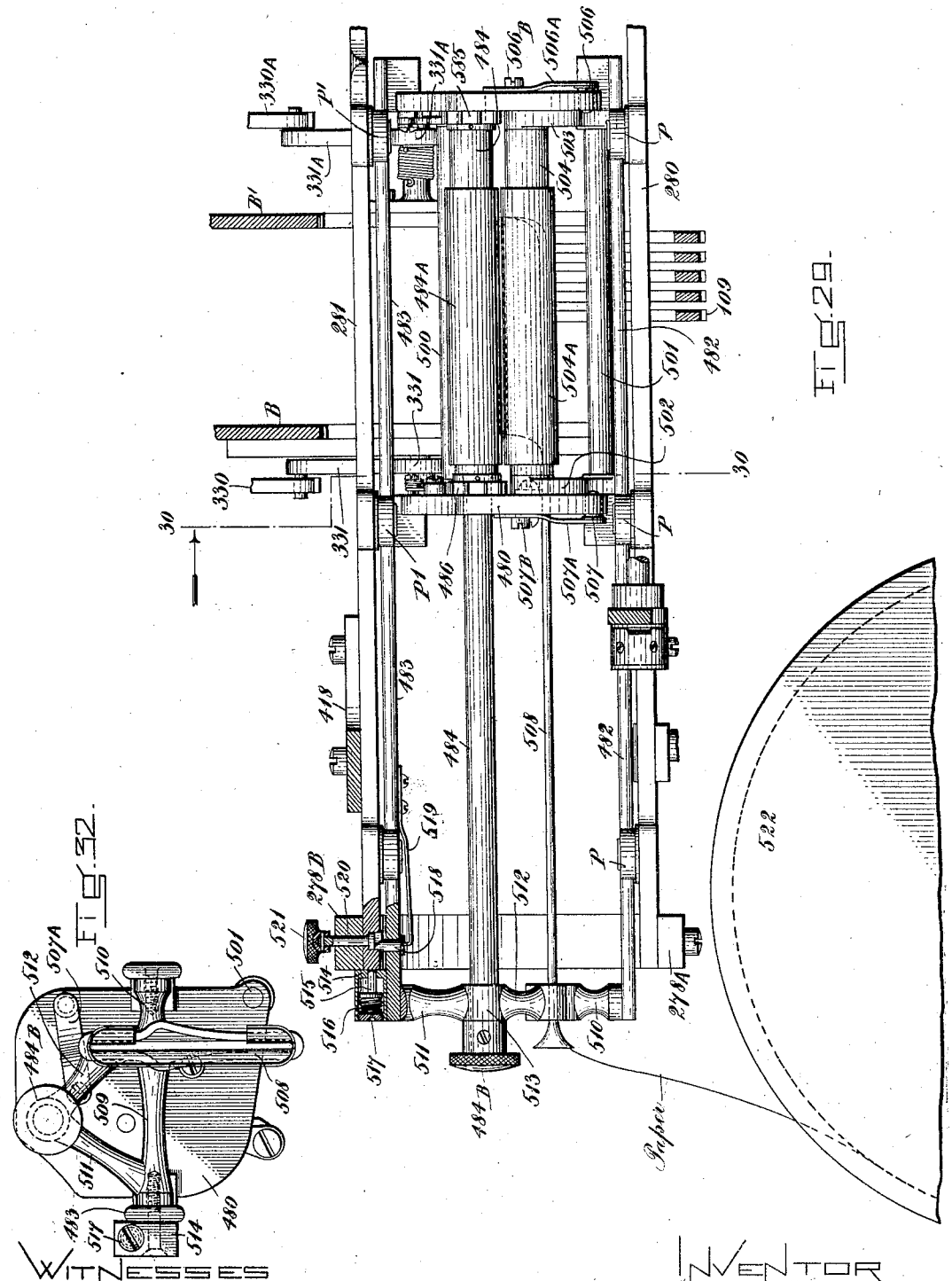

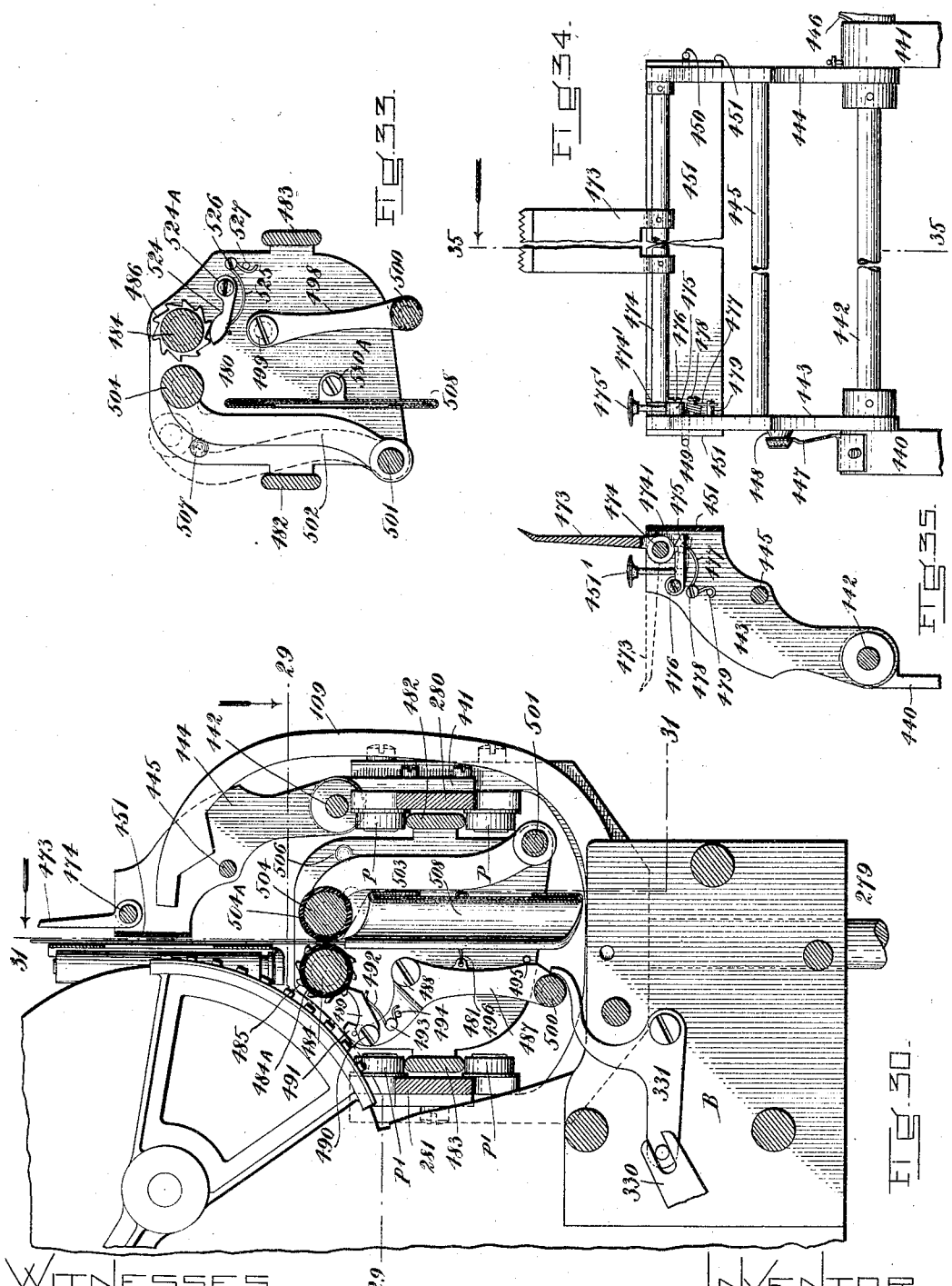

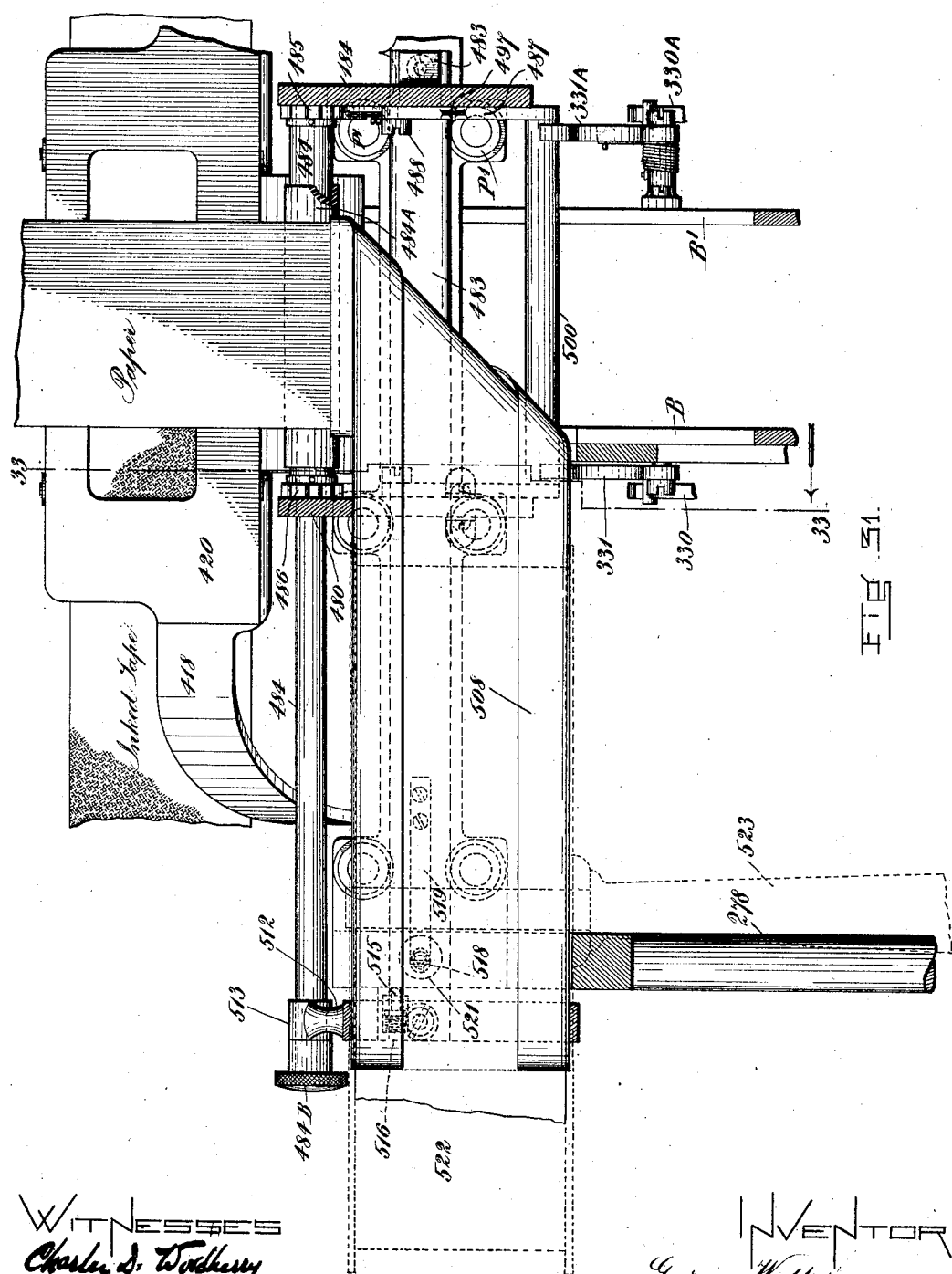

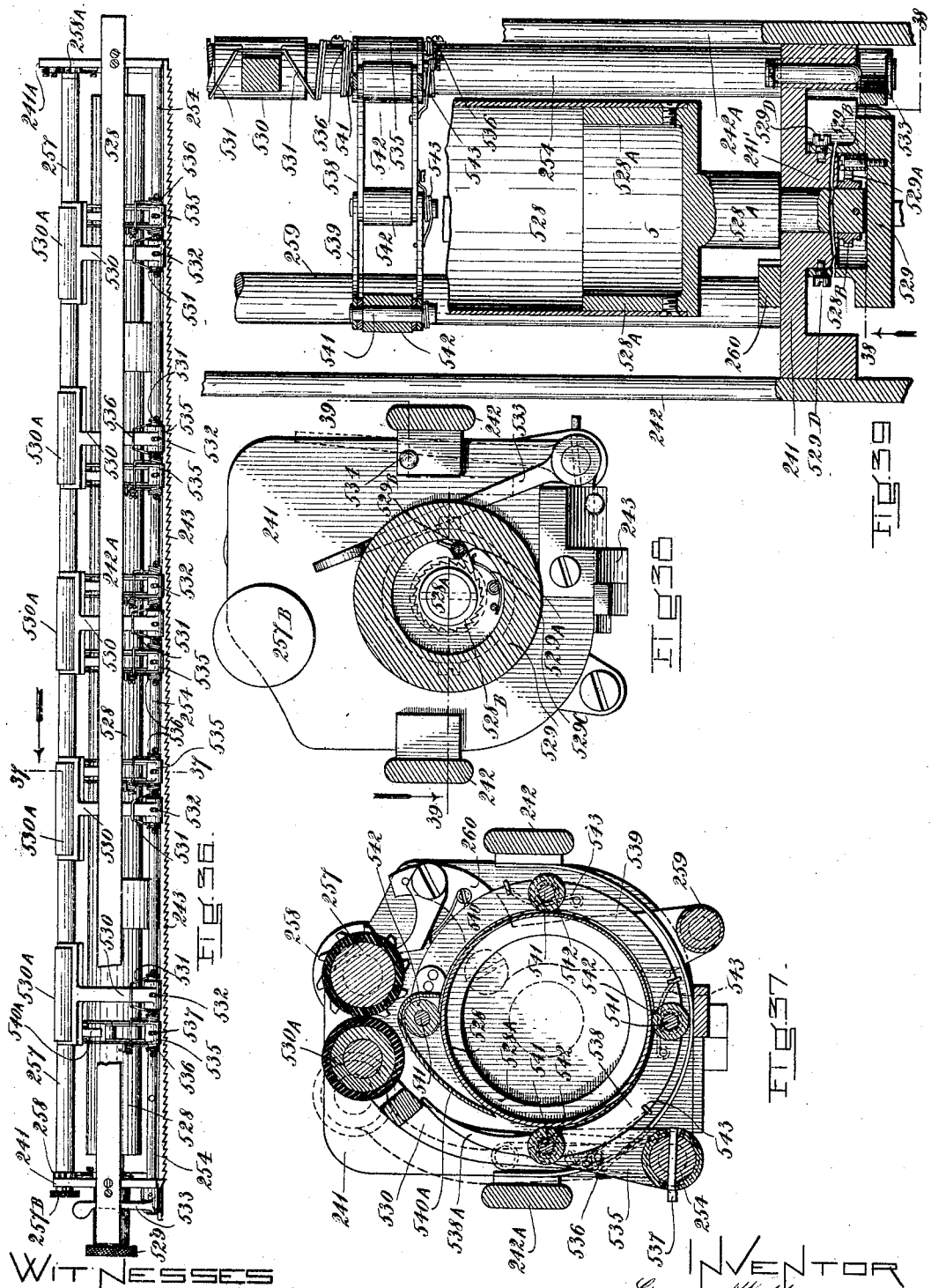

G. WALKER.
TYPOGRAPHICAL COMPUTING MACHINE.
APPLICATION FILED JAN. 17, 1910.

996,173.

Patented June 27, 1911.
42 SHEETS—SHEET 20.

Witnesses
Charles S. Woodbury
Josephine H. Ryan

Inventor
George Walker
By Roberts, Roberts & Cushman
Attorneys

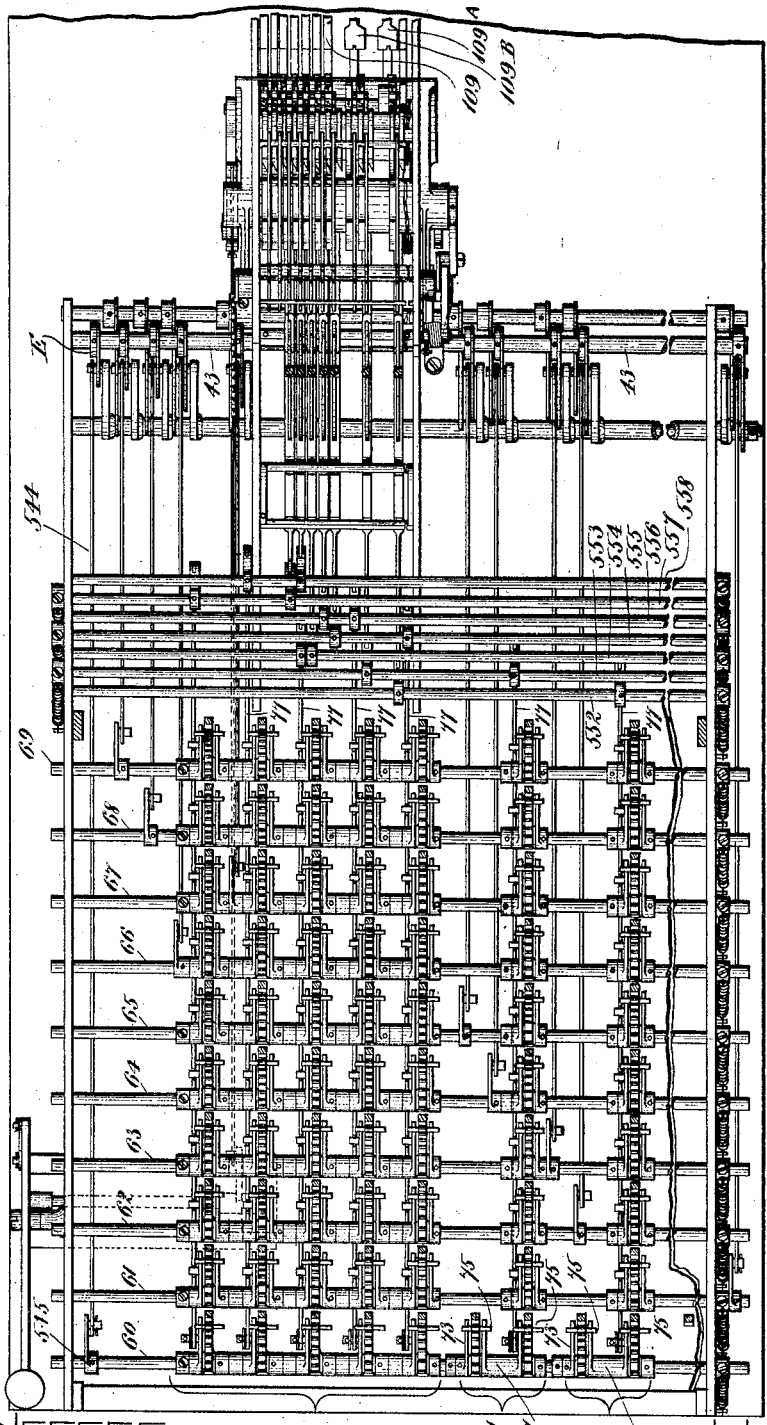

G. WALKER.
TYPOGRAPHICAL COMPUTING MACHINE.
APPLICATION FILED JAN. 17, 1910.
996,173.
Patented June 27, 1911.
42 SHEETS—SHEET 22.
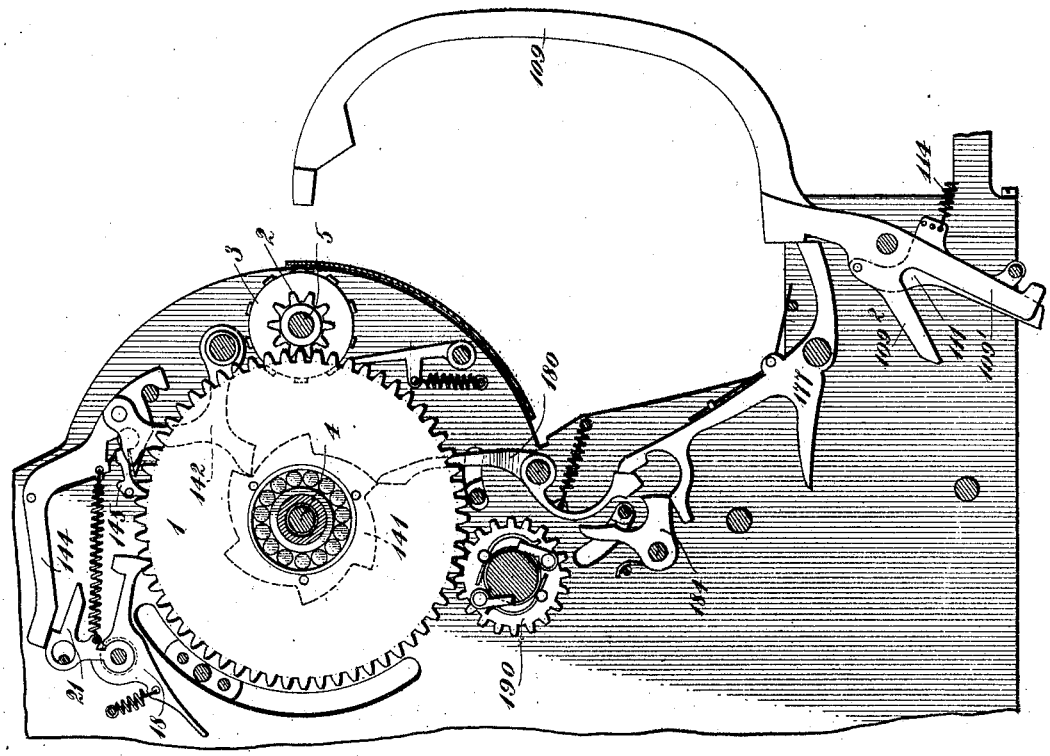
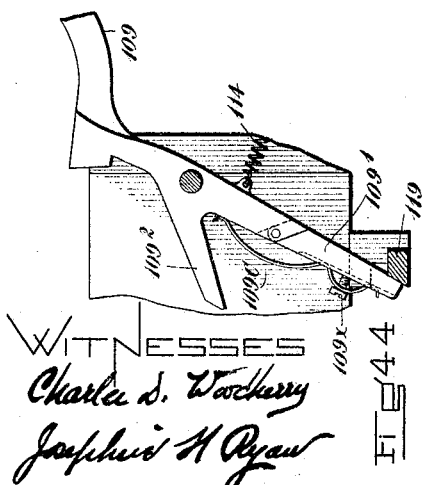
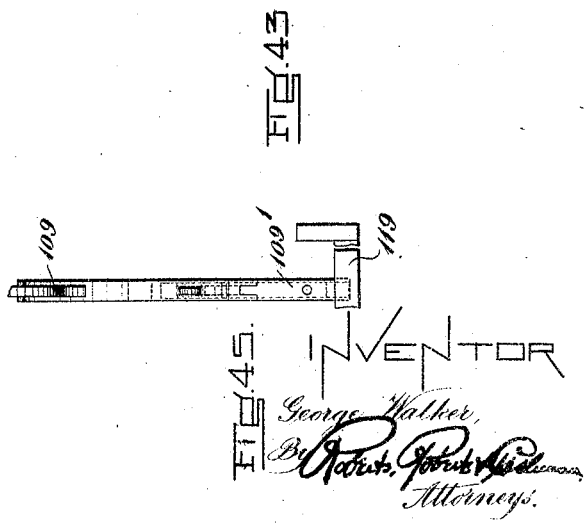

G. WALKER.
TYPOGRAPHICAL COMPUTING MACHINE.
APPLICATION FILED JAN. 17, 1910.

996,173.

Patented June 27, 1911.
42 SHEETS—SHEET 23.

WITNESSES
Charles D. Woodbury
Josephine H. Ryan

INVENTOR
George Walker,
By Roberts, Roberts & Cushman
Attorneys.

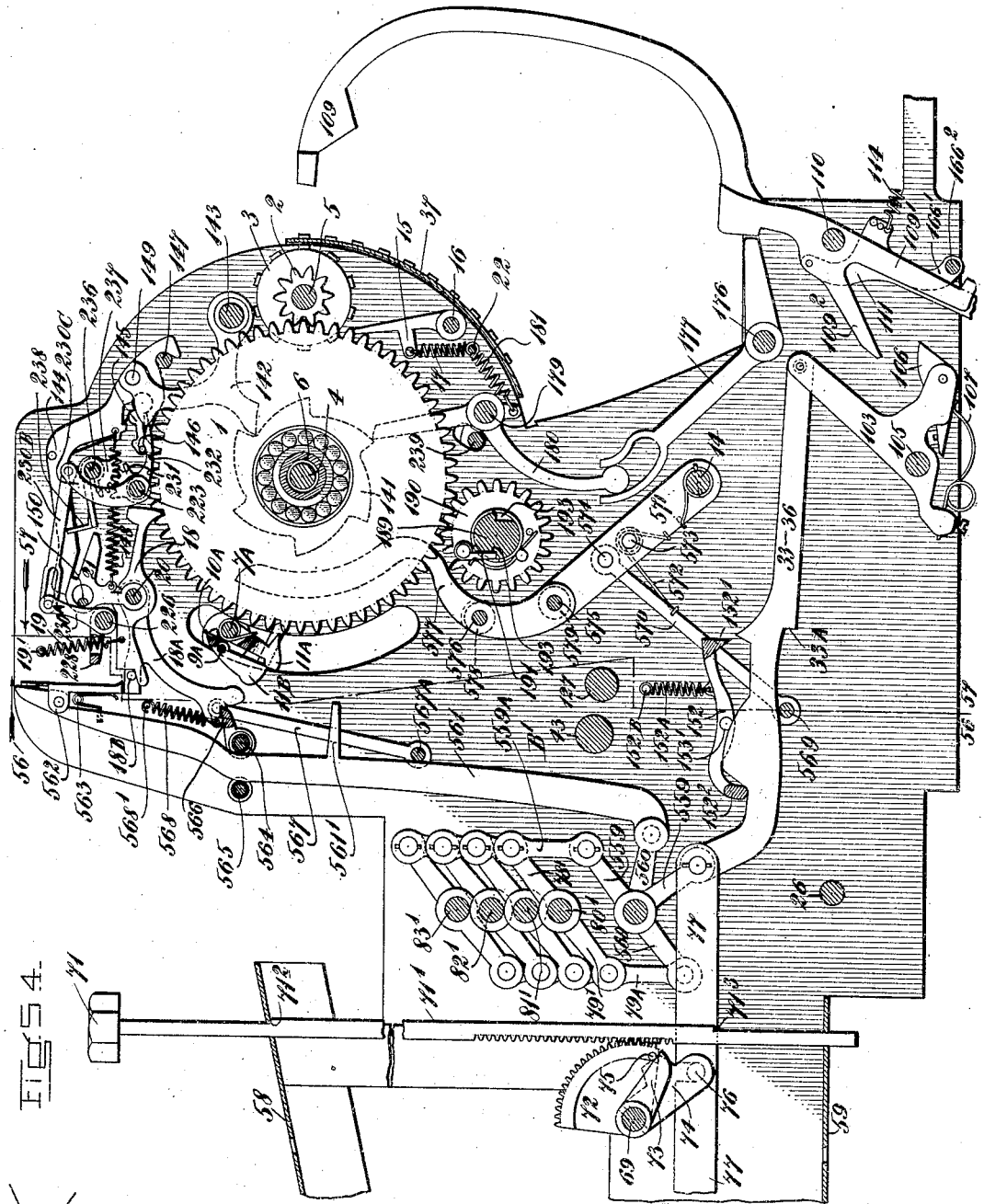

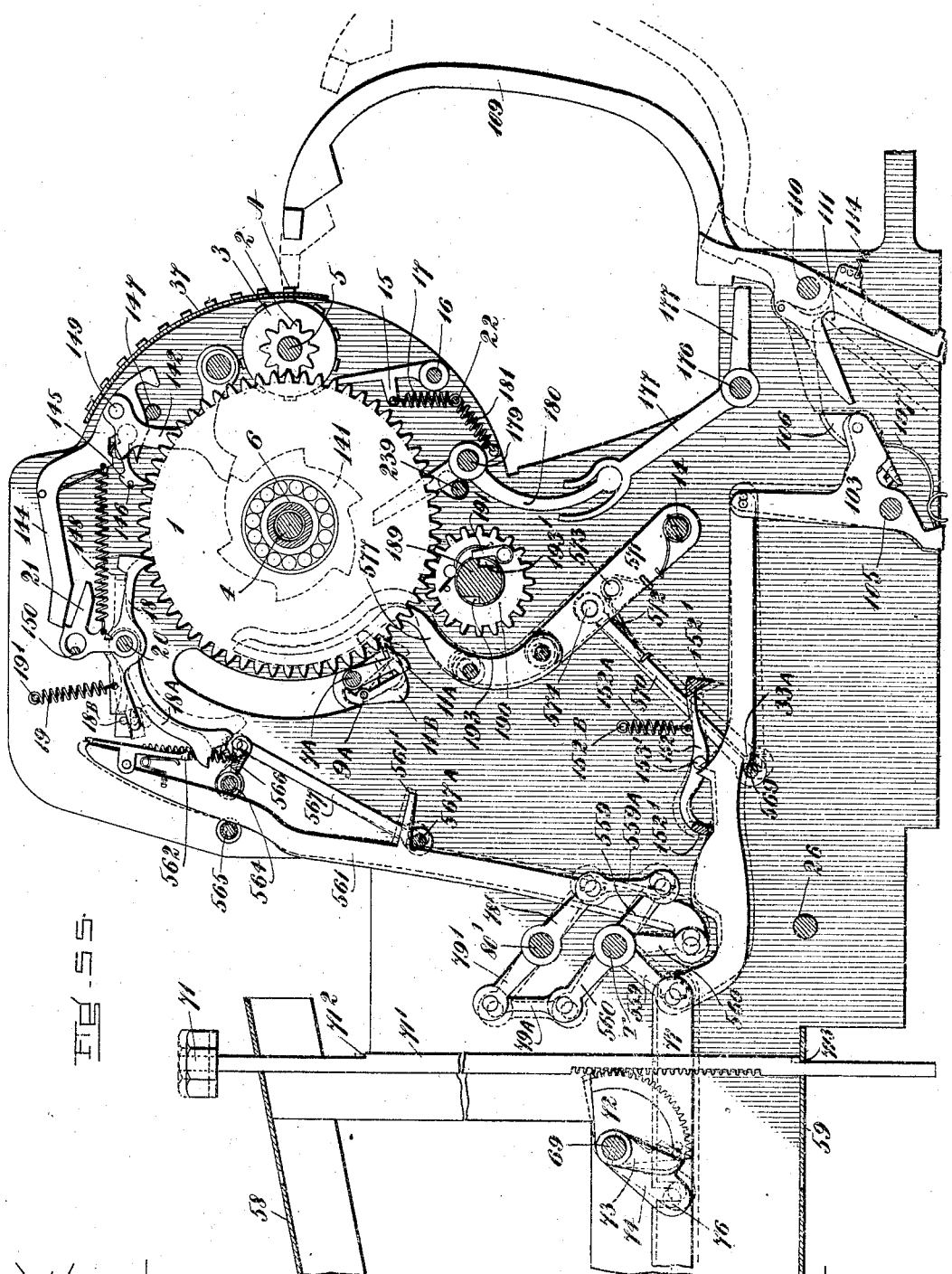

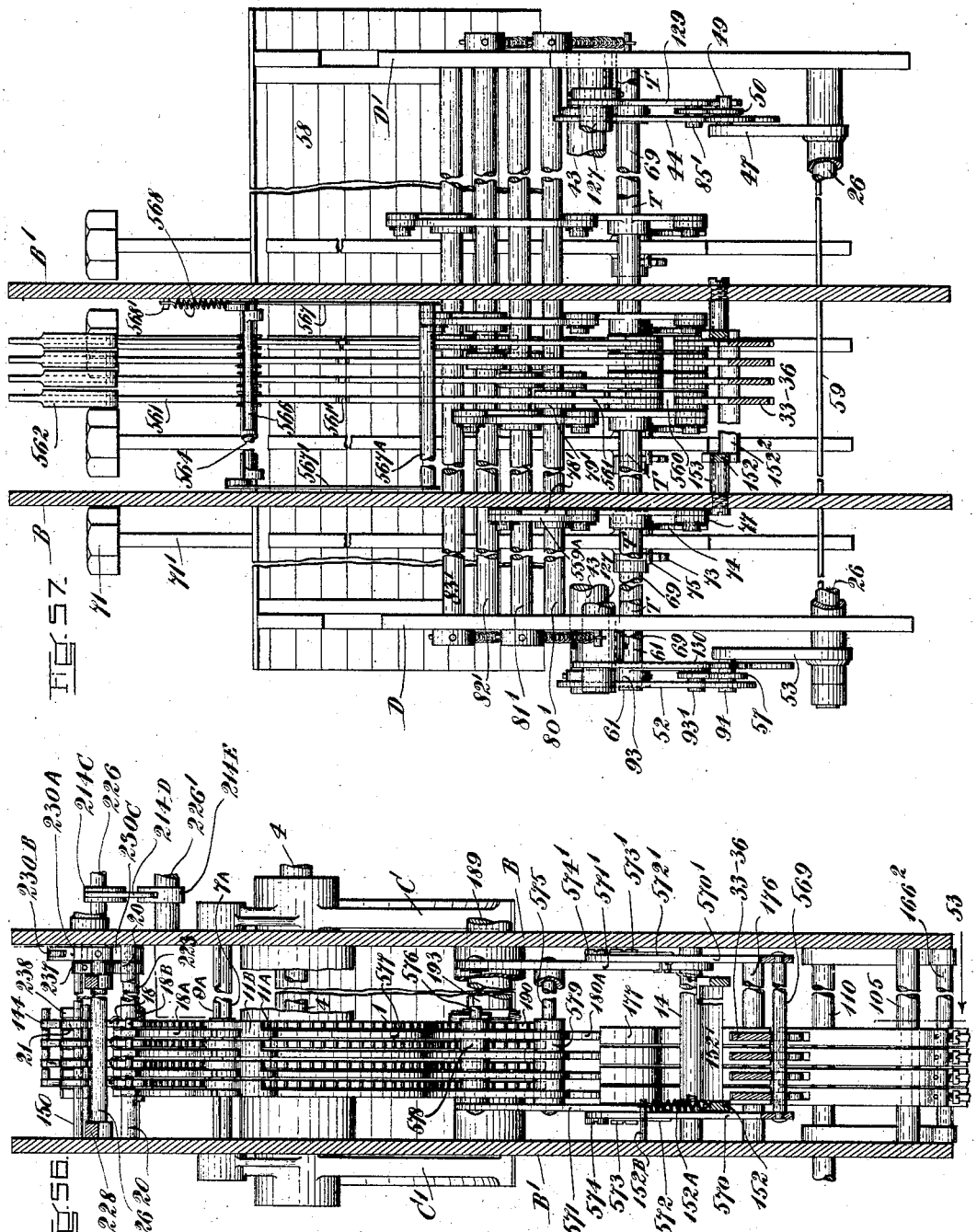

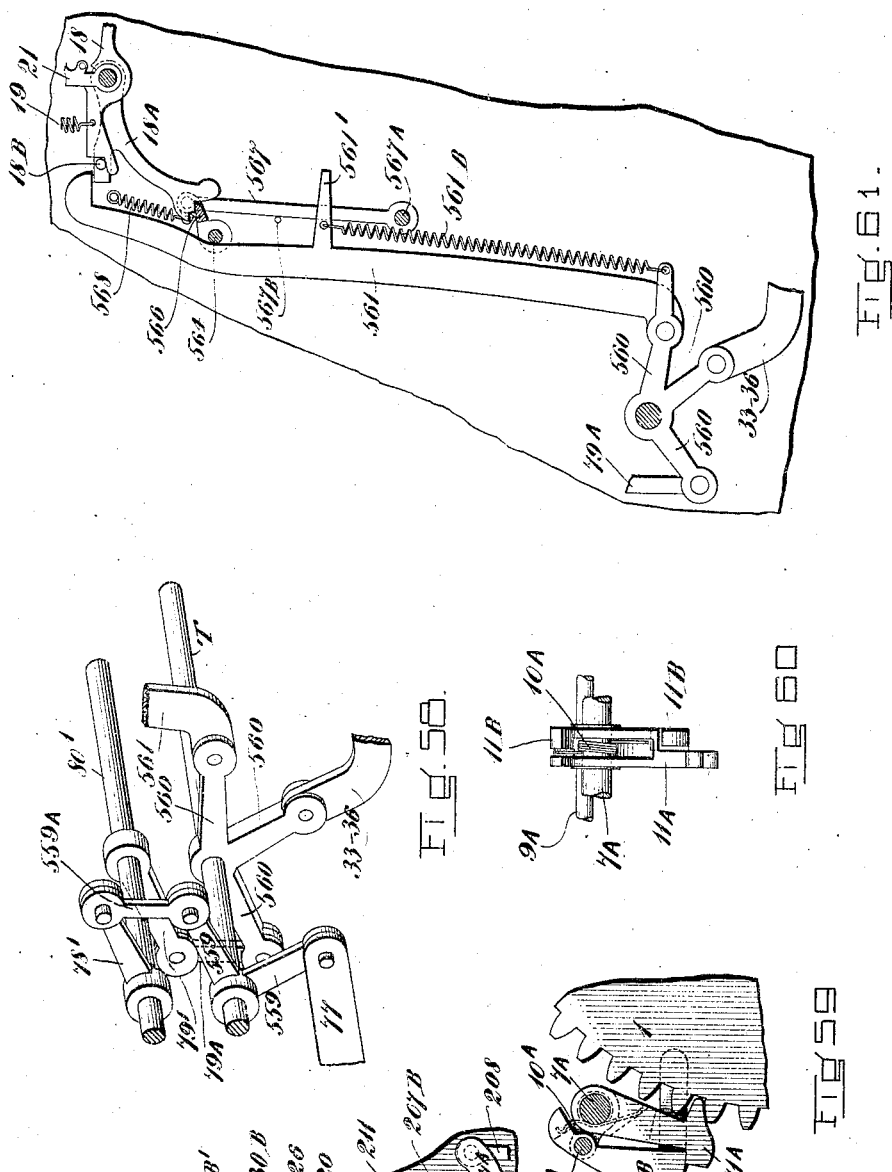
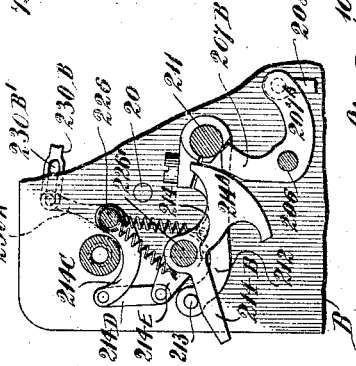

G. WALKER.
TYPOGRAPHICAL COMPUTING MACHINE.
APPLICATION FILED JAN. 17, 1910.
996,173.
Patented June 27, 1911.
42 SHEETS—SHEET 28.
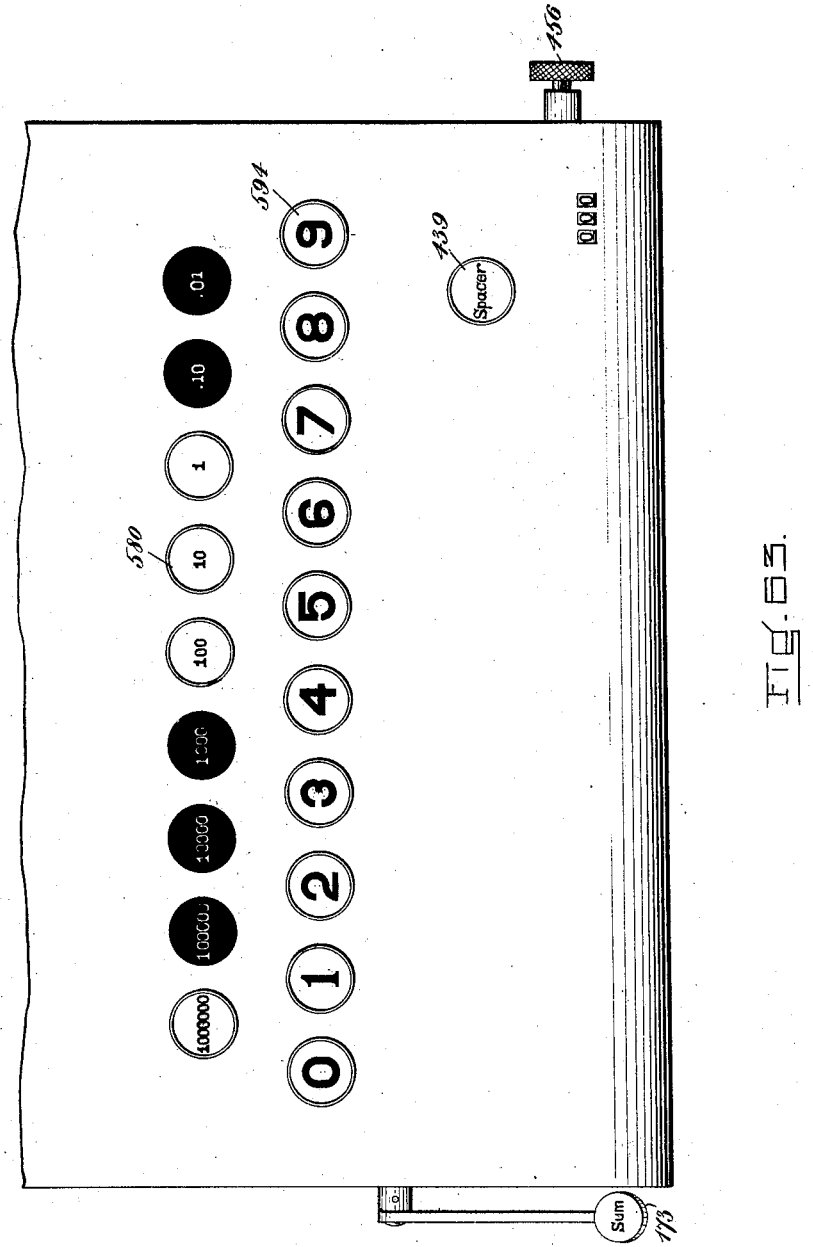

G. WALKER.
TYPOGRAPHICAL COMPUTING MACHINE.
APPLICATION FILED JAN. 17, 1910.
996,173.
Patented June 27, 1911.
42 SHEETS—SHEET 29.
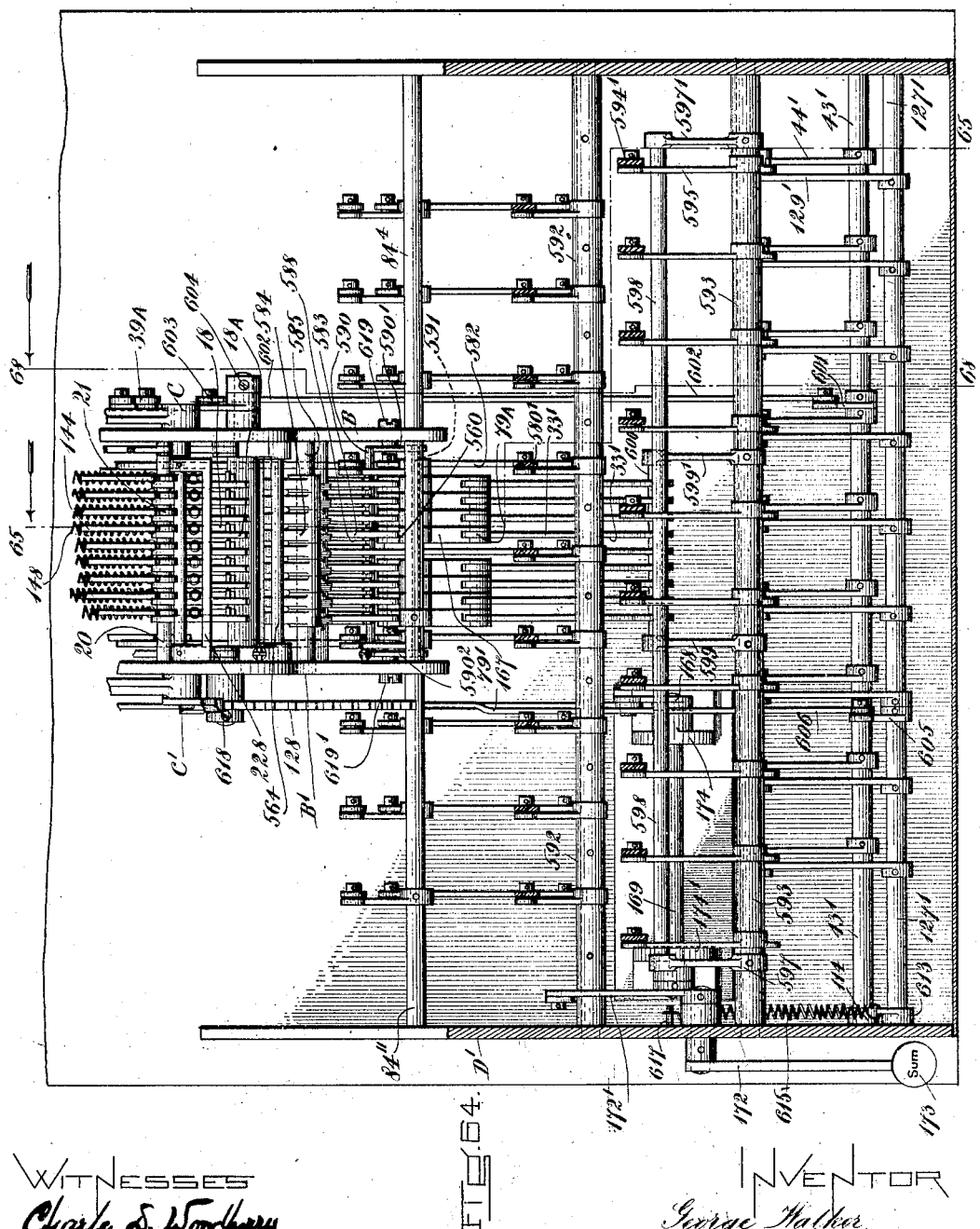

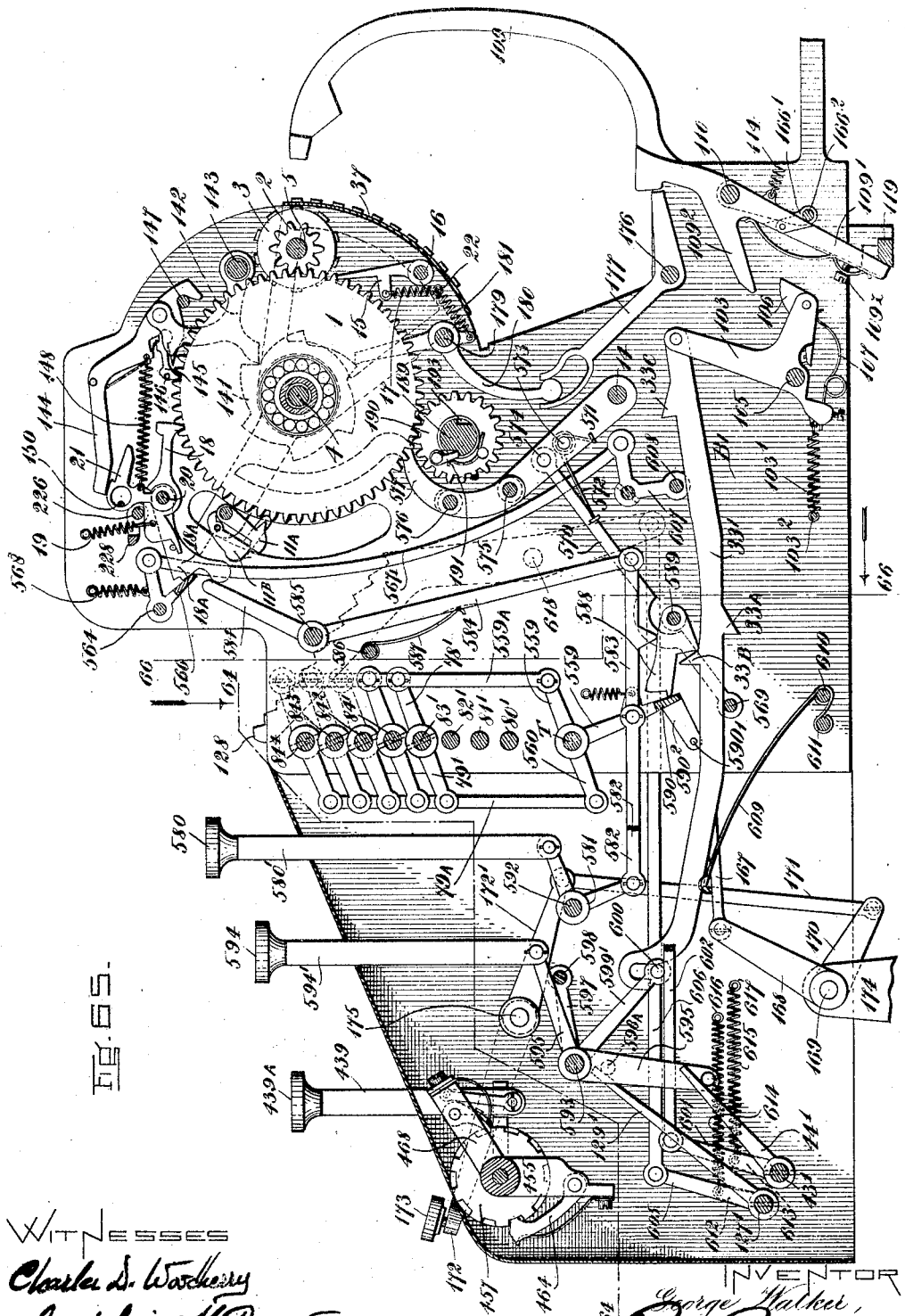

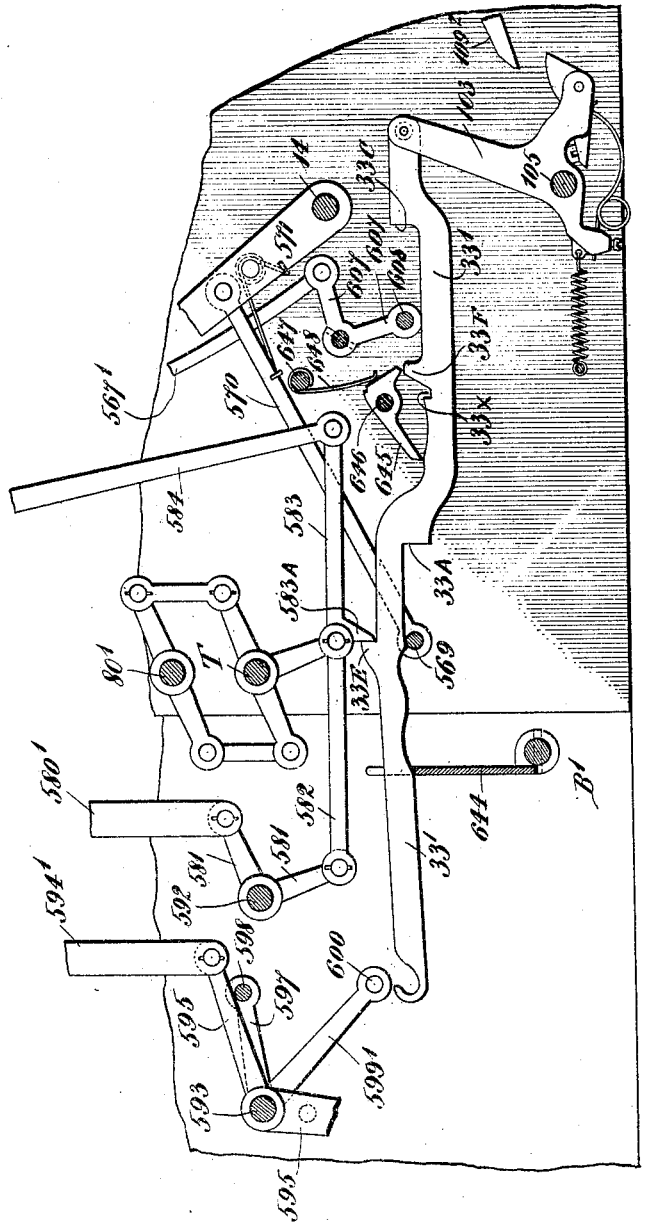

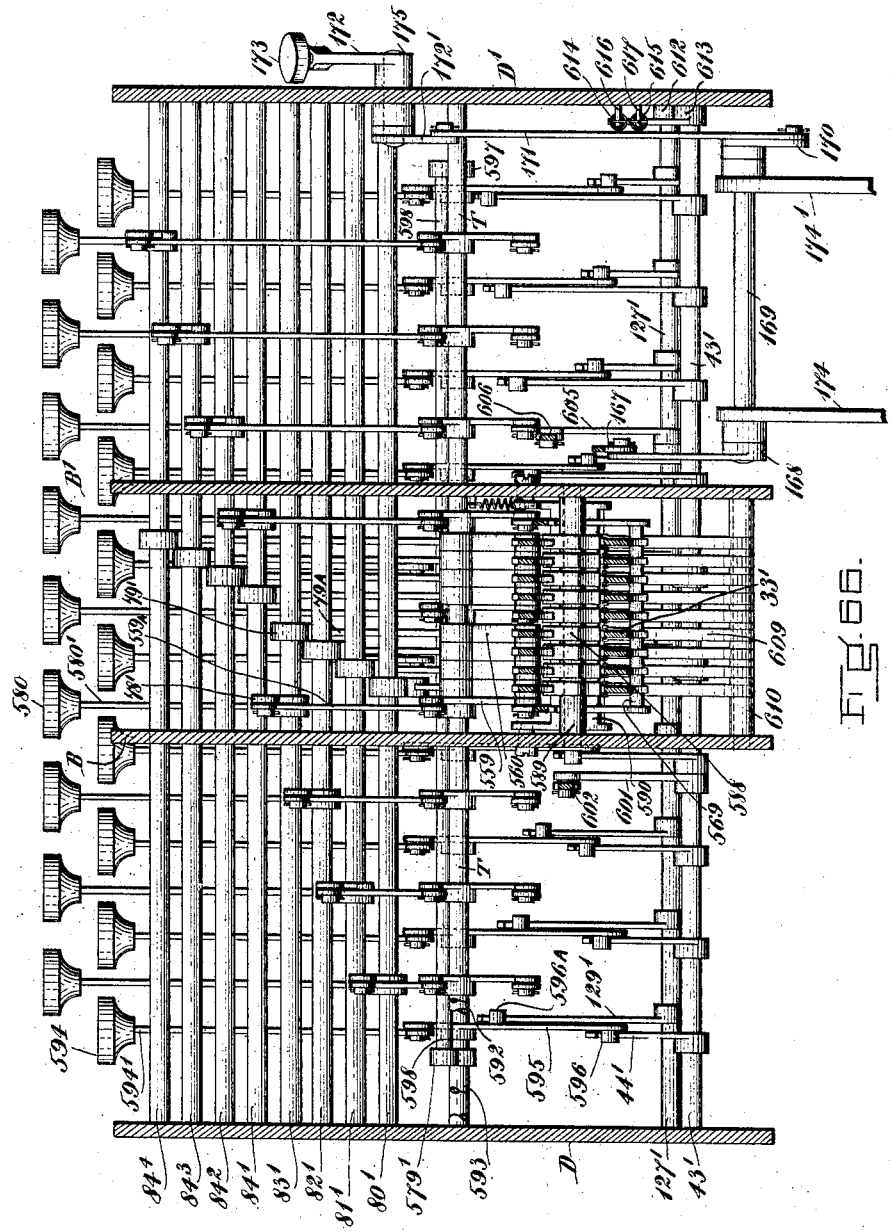

G. WALKER.
TYPOGRAPHICAL COMPUTING MACHINE.
APPLICATION FILED JAN. 17, 1910.
996,173.
Patented June 27, 1911.
42 SHEETS—SHEET 33.
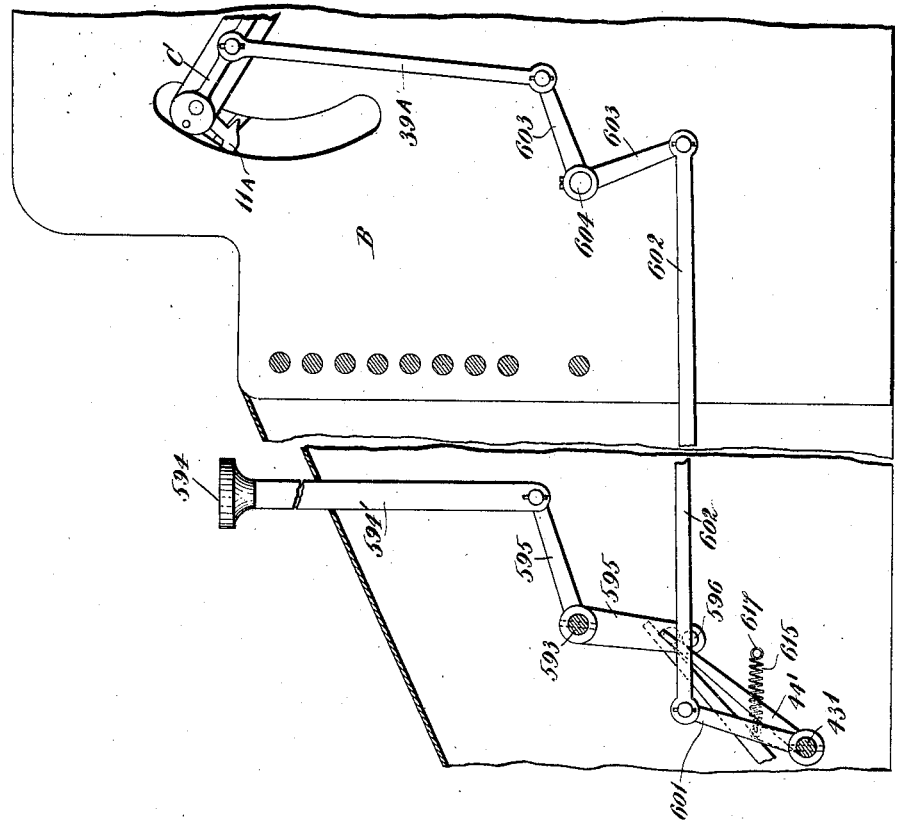
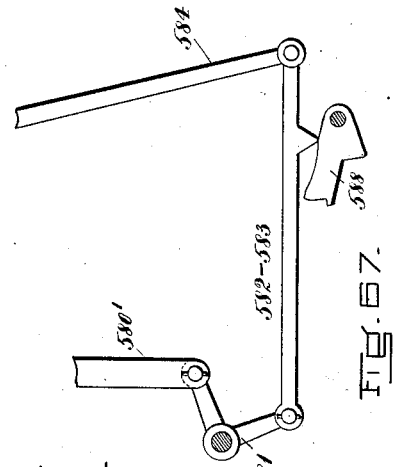
Witnesses
Charles S. Woodbury
Josephine H. Ryan
Inventor
George Walker,
By Roberts, Roberts & Cushman
Attorneys.

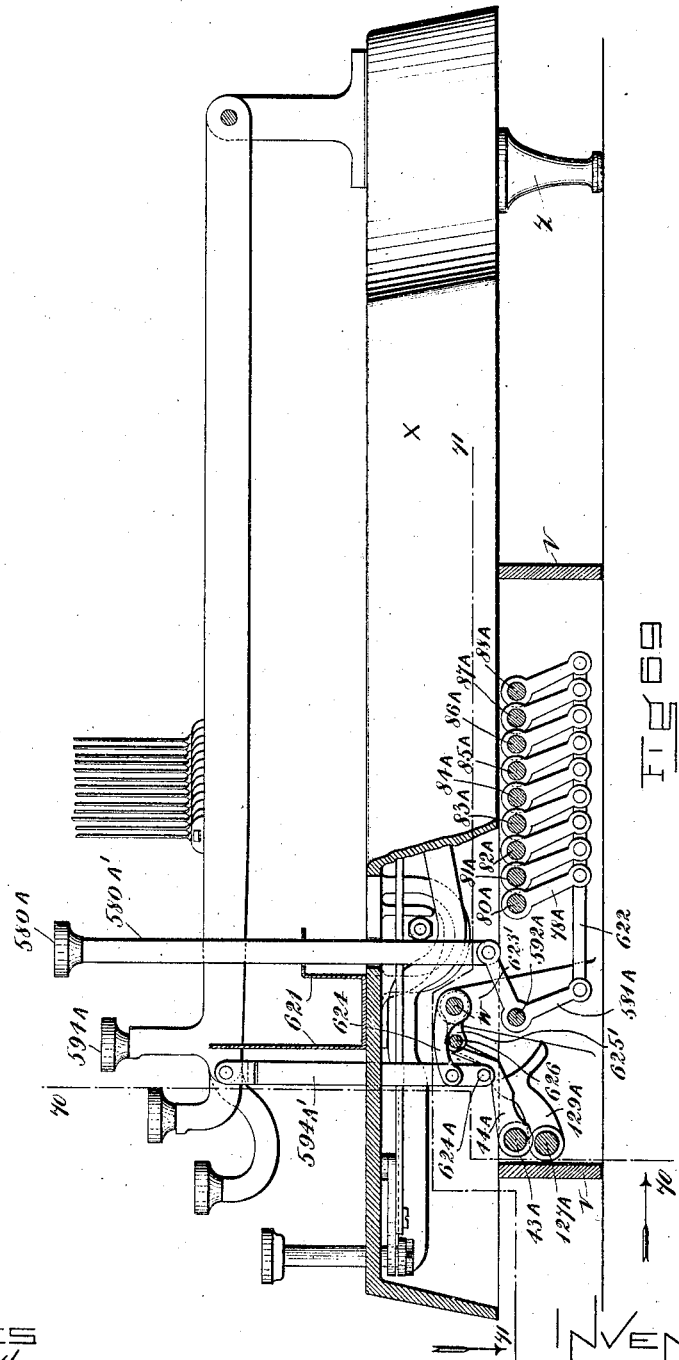

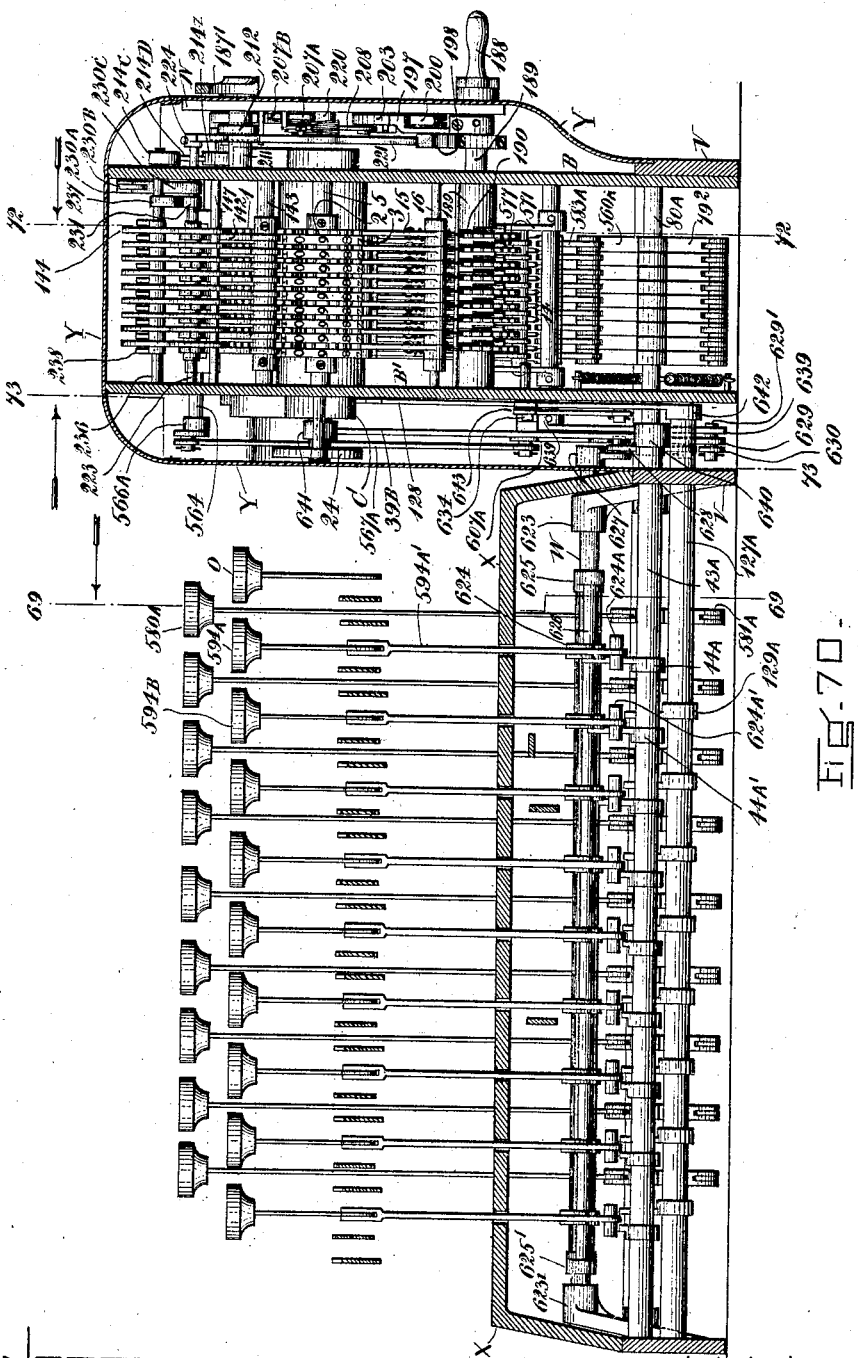

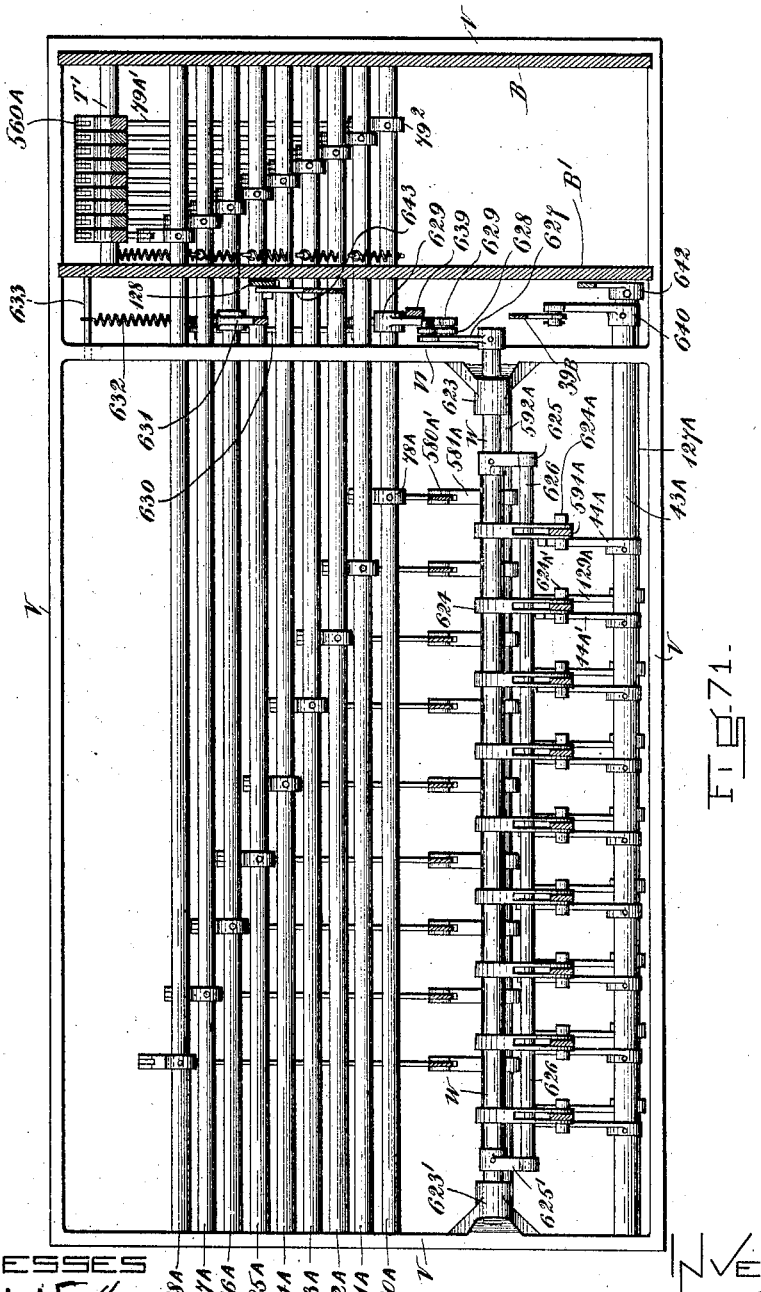

G. WALKER.
TYPOGRAPHICAL COMPUTING MACHINE.
APPLICATION FILED JAN. 17, 1910.
996,173.
Patented June 27, 1911.
42 SHEETS—SHEET 37.
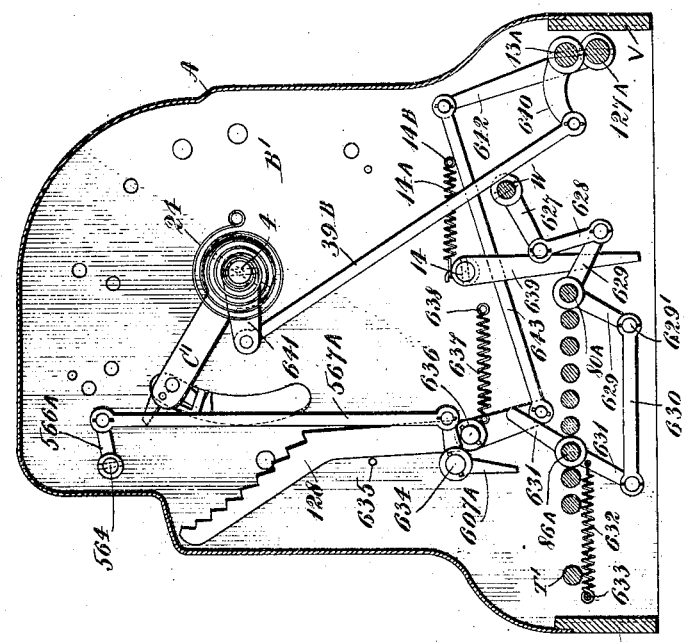
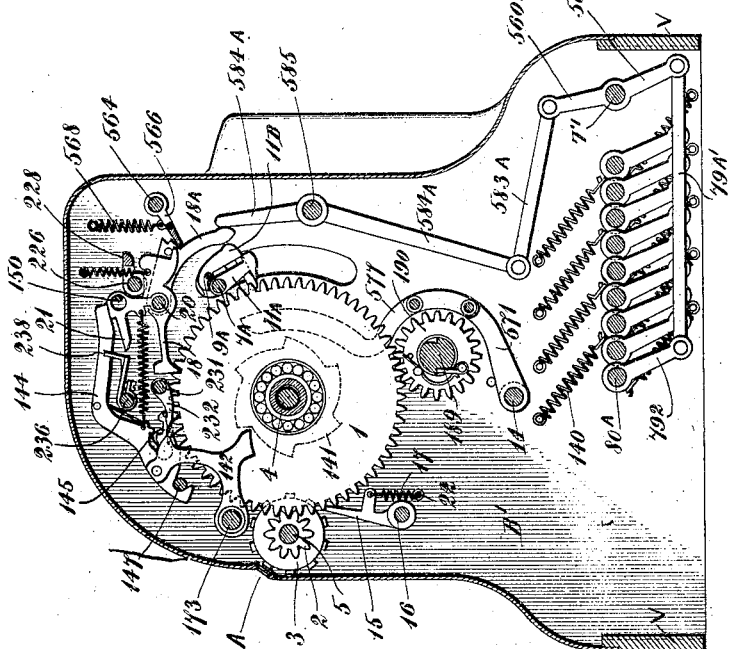

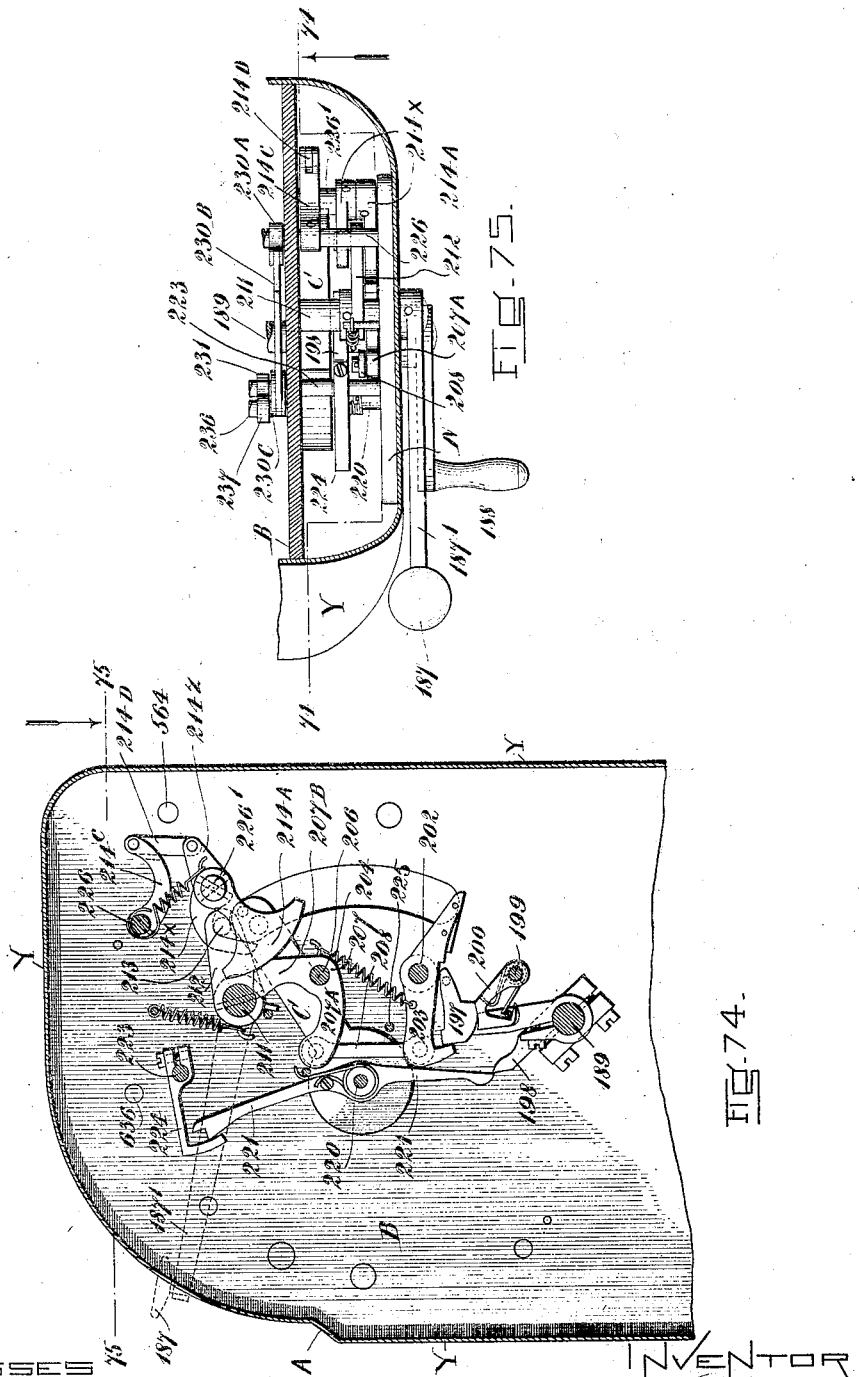

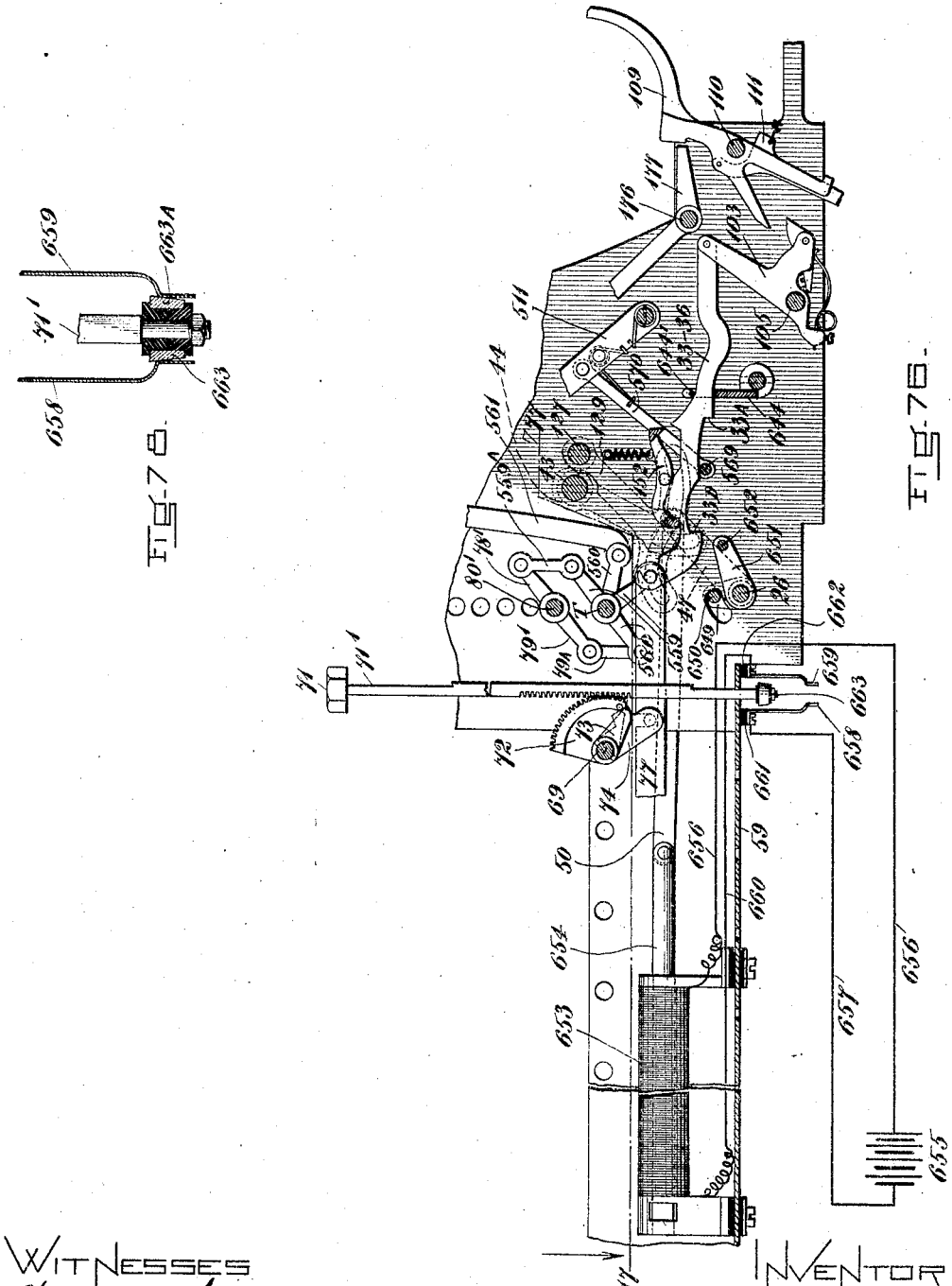

G. WALKER.
TYPOGRAPHICAL COMPUTING MACHINE.
APPLICATION FILED JAN. 17, 1910.
996,173.
Patented June 27, 1911.
42 SHEETS—SHEET 40.
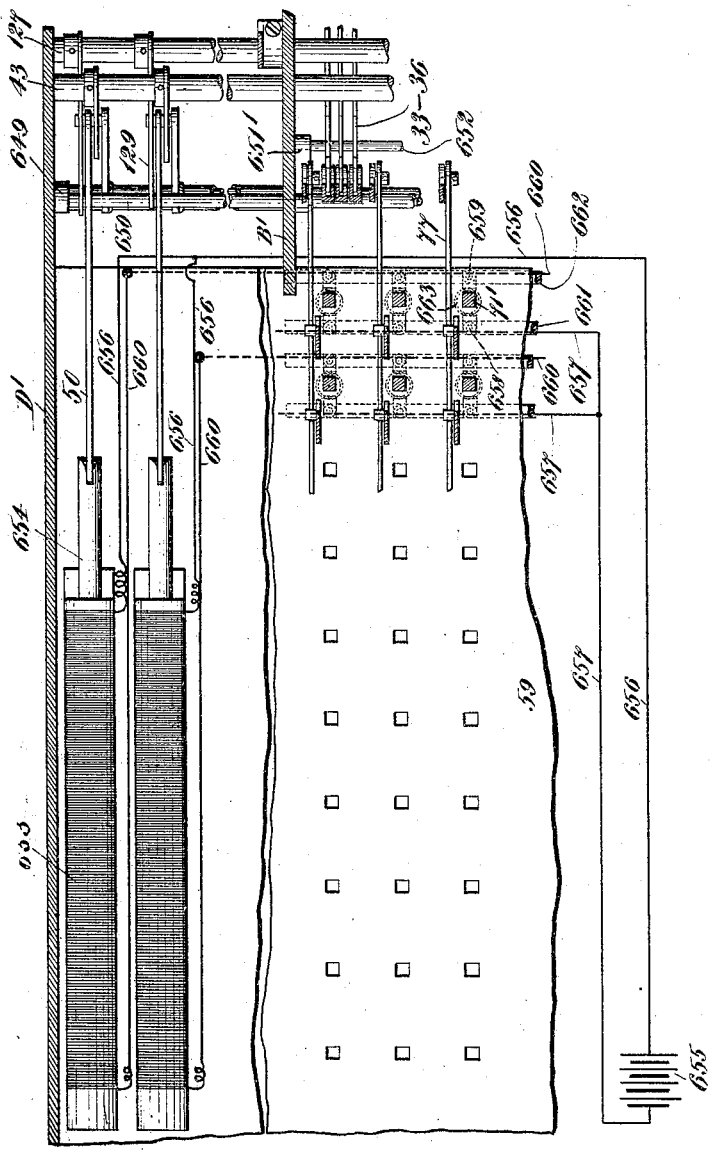

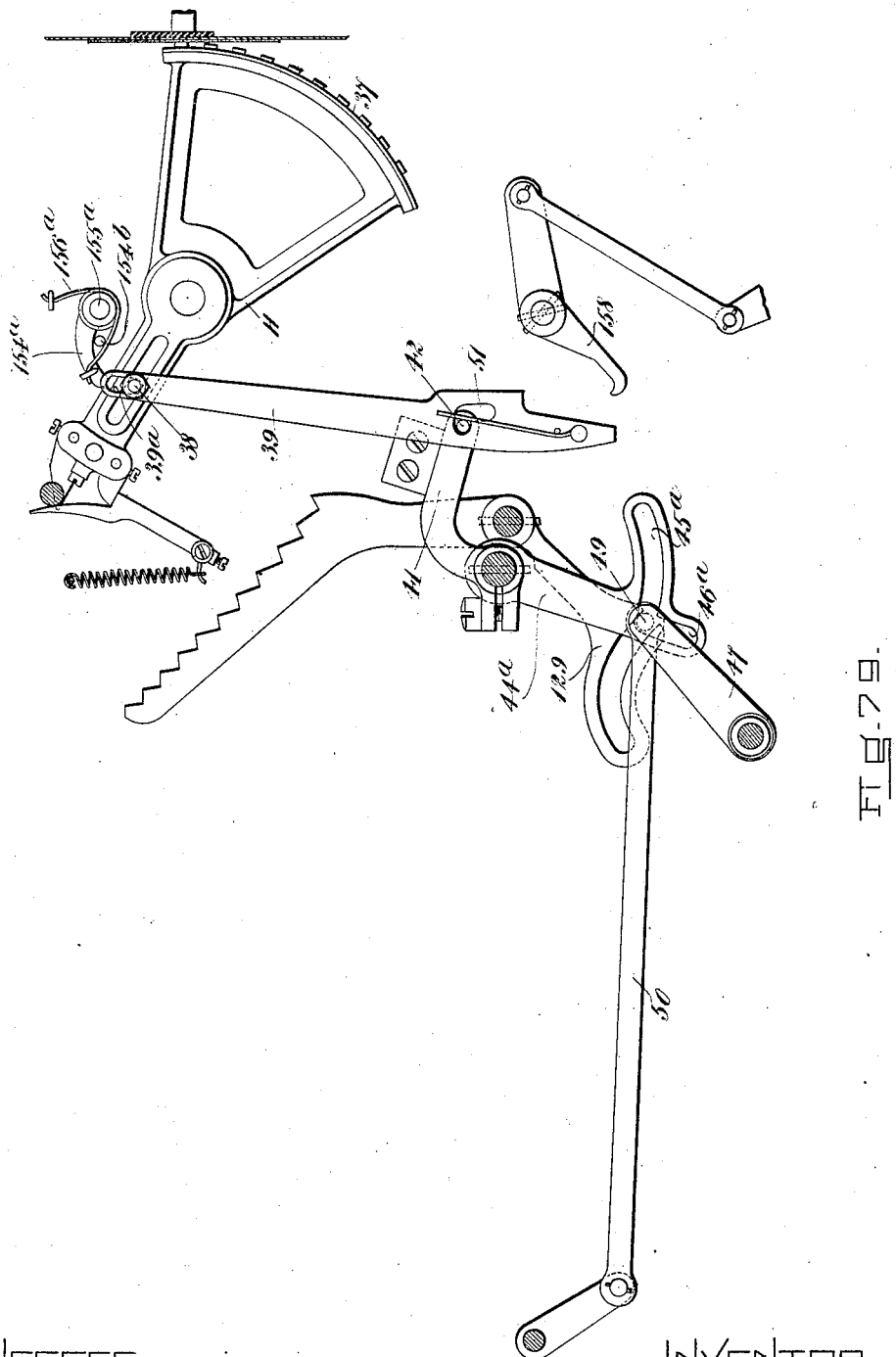

G. WALKER.
TYPOGRAPHICAL COMPUTING MACHINE.
APPLICATION FILED JAN. 17, 1910.

996,173.

Patented June 27, 1911.
42 SHEETS—SHEET 42.

Witnesses
Charles D. Woodbury
Josephine H. Ryan

Inventor
George Walker,
By Roberts, Roberts & Cushman,
Attorneys.

UNITED STATES PATENT OFFICE.

GEORGE WALKER, OF NEWTON, MASSACHUSETTS.

TYPOGRAPHICAL COMPUTING-MACHINE.

996,173.

Specification of Letters Patent.  Patented June 27, 1911.

Application filed January 17, 1910. Serial No. 538,476.

*To all whom it may concern:*

Be it known that I, GEORGE WALKER, a citizen of the United States, and resident of Newton, in the county of Middlesex and State of Massachusetts, have invented new and useful Improvements in Typographical Computing-Machines, of which the following is a specification.

This invention relates to a typographical calculating machine, and more particularly to such a machine adapted for adding, and for recording both the items which enter into the addition and the sum thereof.

While it is believed that the invention will find its chief utility in a machine adapted for adding, it will be understood that a great number of its features are equally applicable to machines adapted to other computations, and to other typographical machines than typographical computing machines, and such application to computing and typographical machines generally is within the scope of the invention and is contemplated by the claims. Nevertheless, since the invention may be admirably illustrated by embodiment in an adding and tabulating machine, I will for the purpose of illustration address the description to such embodiment, it being understood that such embodiment is merely illustrative of a much broader and more general application.

It is among the objects of the invention to provide mechanism for printing the individual items which enter into the computation from movable types operated by keys, which simultaneously operate the adding or number wheels, and for printing the sum directly from the number wheels, using the same set of hammers for printing the separate items and the sum; for operating the printing hammers individually from the keys to print the several items, and for operating all the hammers simultaneously to print the sum and preventing those hammers from printing the sum which correspond with columns of the adding mechanism which have not been operated; for providing operating means for the number wheels adapted to be actuated by a full set key board of several columns of keys each column containing a full series of numerals, or a two set key board having two rows of keys, one containing the series of digit numerals and the other row indicating the column in which the numerals of the first row are to be thrown; for utilizing the same duplicate operating parts for actuating the number wheels, the printing types and the tripping or carrying mechanism for varying systems of computations, such as the decimal system, the English money system, or systems of weights and measures; for bringing the number wheels, their operating devices and their tripping or carrying means into compact and self-contained form and arrangement applicable to various forms of computing machines and also to ordinary typewriting machines; for locking all the operating parts of the adding mechanism other than the keys against accidental movement until a key is depressed, and for locking all the other keys against operation, when any one key is depressed; for printing the items in vertical, horizontal or diagonal rows; printing the totals and subtotals from the same sum key at any time without disturbing the adding mechanism, printing in various colors, using paper of various sizes and shapes; for inserting and removing the paper carrier as a unit and substituting paper carriers of various forms all adapted to the same paper carrier actuating mechanism; to cause the paper carrier to travel endwise varying predetermined distances; for automatically reversing the movement of the printing ribbon, and for removing the ribbon, together with its spools, without touching the ribbon; for varying the strength of blow of the hammers for direct printing and manifolding; for resetting the number wheels to zero.

Other features will hereinafter be described and pointed out in the claims.

Figure 16:
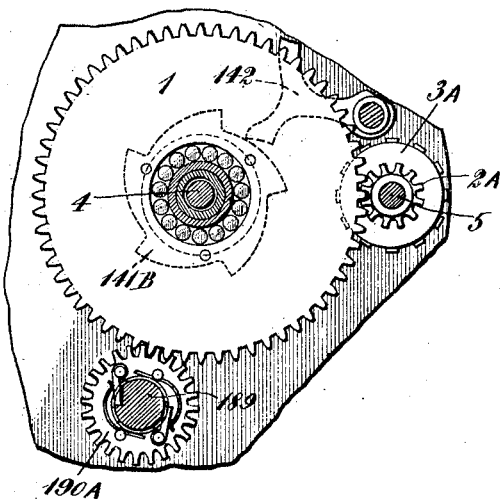
Figure 17:
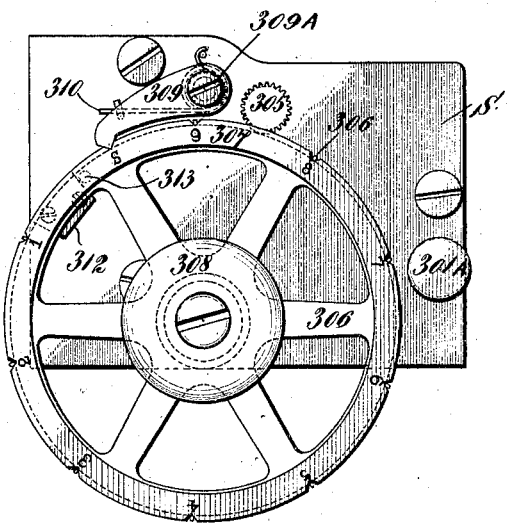
Figure 41:
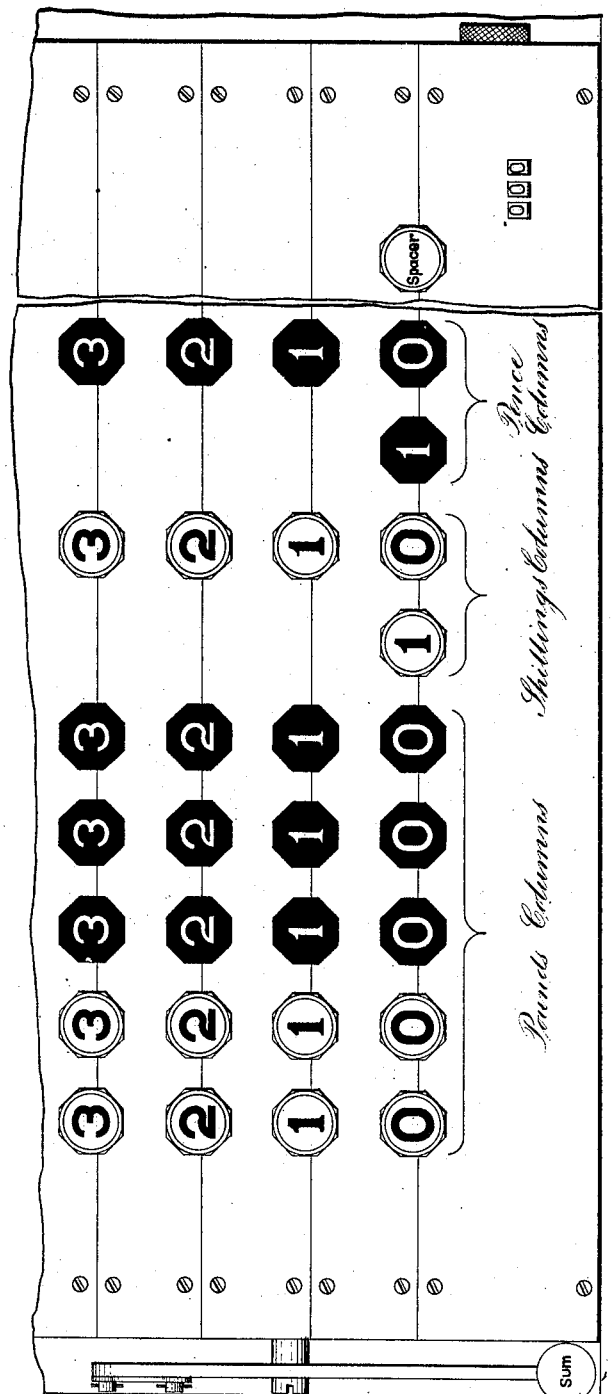
Figure 51:
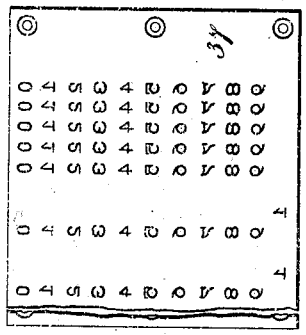
Figure 52:
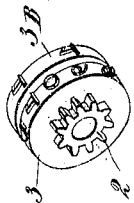
Figure 53:
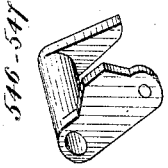
Figure 48:
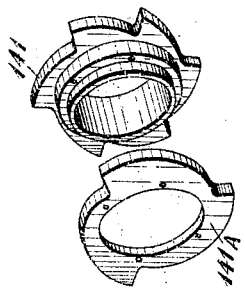
Figure 49:
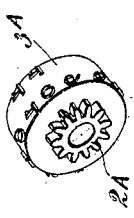
Figure 50:
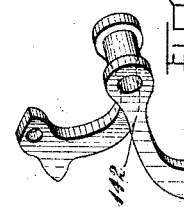
Figure 46:
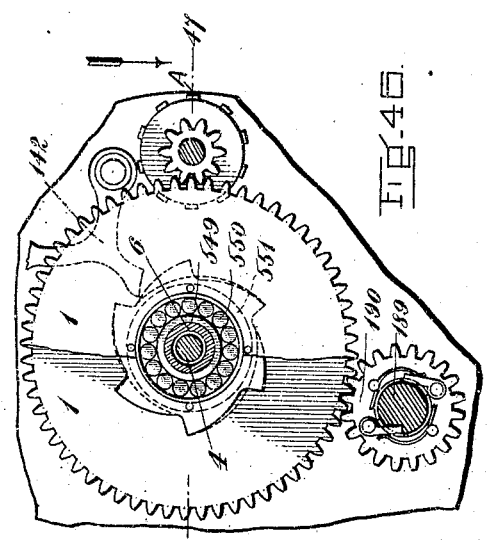
Figure 47:
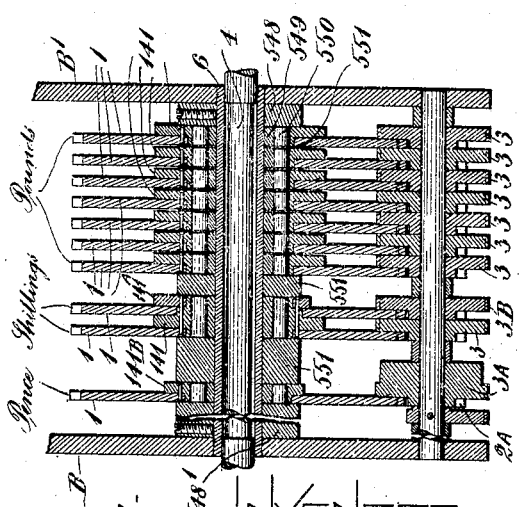
Figure 80:
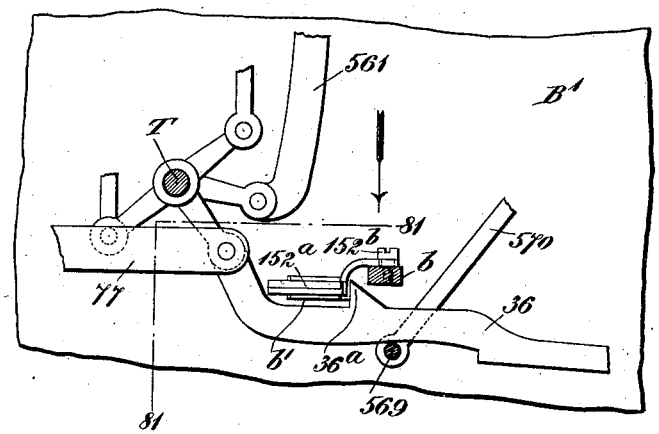
Figure 81:
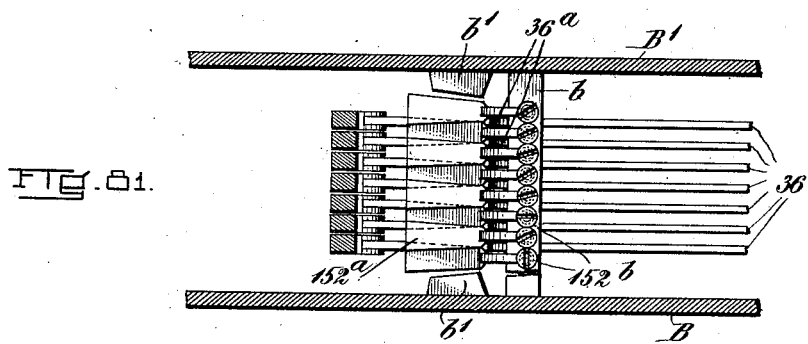
Figure 82:
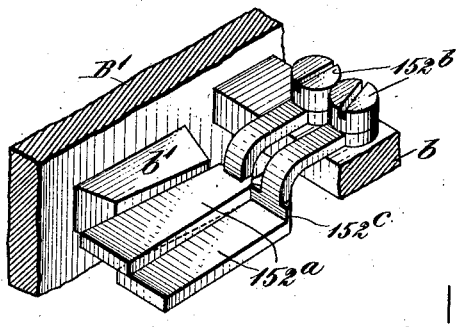

In the accompanying drawings which illustrate certain forms of my invention embodied in an adding and tabulating machine,—Figure 1 is a plan view of the machine with the key board and keys removed; Fig. 1A is a plan view of the key board of said machine on a somewhat larger scale; Fig. 2 is a vertical longitudinal section of the machine taken on line 2—2 of Fig. 1, looking in the direction of the arrow; Fig. 3 is a longitudinal sectional view similar to that shown in Fig. 2 and on a larger scale showing the train of connections and operating mechanism between one of the keys and the adding and printing devices in the position assumed when one side key is depressed; Fig. 3ᴬ is a detail view of the upper part of the mechanism shown in Fig. 3 with the parts in another position; Fig. 4 is a detail view showing in side elevation the type plate and certain of its operating connections; Fig. 5 is a side view of one of the printing hammers and the mechanism for operating the same actuated by the "sum" key; Fig. 5ᴬ is a detail view of parts of the hammer operating mechanism shown in Fig. 5, but in a different position; Fig. 6 is a side view of the frame containing the adding devices showing in elevation parts of the resetting mechanism; Fig. 7 is a vertical longitudinal section through the adding devices showing in elevation one of the adding wheels and its train of operating and resetting mechanisms; Fig. 8 is a detail view in elevation of parts of the resetting mechanism shown in Fig. 6, said parts being in a different position; Fig. 9 is a vertical longitudinal section through the adding devices showing in side elevation one of the adding wheels and parts of its operating and resetting mechanisms, similar to that shown in Fig. 7 but with the parts in different position; Fig. 10 is a rear elevation of the lower part of the machine with the printing hammers removed, showing certain details of a paper carrier and its operating mechanism, and the ribbon or inked tape operating mechanism; Fig. 11 is a horizontal section of part of the rear end of the machine on line 11—11 of Fig. 10; Fig. 12 is a vertical longitudinal section through the machine on a plane passing through the ribbon spool-supporting shaft 361, showing the "spacer" key and its connections; Fig. 12ᴬ is a detail view showing in elevation the counter actuated by the "spacer" key viewed from the right of Fig. 12; Figs. 13 and 14 are detail views of certain of the "adding arms" and associated parts; Fig. 15 is an elevation of the ribbon or inked tape operating mechanism; Fig. 16 is a detail view of a type wheel and its gear wheels appropriate to the pence column of an English money adding machine; Fig. 17 is a detail view in elevation of part of the mechanism for varying the spacing; Fig. 18 is a horizontal longitudinal section through the large paper carrier on line 18—18 of Fig. 21; Fig. 18ᴬ is a detail view in cross section of the stop shown in Fig. 18; Fig. 19 is an end view of said paper carrier looking from the left of Fig. 18; Fig. 20 is a detail view in side elevation of part of the paper carrier operating mechanism; Fig. 21 is a cross section of said paper carrier on line 21—21 of Fig. 18 viewed in the direction of the arrow; Fig. 22 is an elevation of the inked tape shield showing its relation to the type plate and type wheels; Fig. 23 is a detail view of one of the guide rollers for the inked tape; Fig. 24 is a vertical cross section through the counter shown in Fig. 12ᴬ on line 24—24 of Fig. 25; Fig. 25 is a longitudinal section through said counter on line 25—25 of Fig. 24; Fig. 26 is a detail view in elevation of the device for raising and lowering the inked tape to vary the color of the printing; Fig. 27 is a sectional view on line 27—27 of Fig. 26, looking in the direction of the arrow. [No Fig. 28 is shown.] Fig. 29 is a plan view of another form of paper carrier, certain parts shown in section on line 29—29 of Fig. 30; Fig. 30 shows said paper carrier in section on line 30—30 of Fig. 29, inserted in the machine, together with certain parts of the mechanism for operating it; Fig. 31 is a rear elevation of said paper carrier inserted in the machine, certain parts being shown in section on line 31—31 of Fig. 30; Fig. 32 is an end view of said paper carrier looking from the left of Fig. 29; Fig. 33 is a cross sectional view through said paper carrier on line 33—33 of Fig. 31; Fig. 34 is a rear elevation showing in detail the cutting off mechanism for the narrow strip of paper; Fig. 35 is a cross section on line 35—35 of Fig. 34; Fig. 36 is a side elevation of a modified form of large paper carrier; Fig. 37 is a cross section, enlarged, on line 37—37 of Fig. 36; Fig. 38 is a sectional view through the end of said paper carrier on line 38—38 of Fig. 39; Fig. 39 is a longitudinal section of one end of said paper carrier through line 39—39 of Fig. 38. [No. Fig. 40 is shown.] Fig. 41 is a plan view of the key board, partly broken away, for the machine when adapted to the English money system; Fig. 42 is a plan view of certain parts of the English money machine with the key board removed; Fig. 43 is a fragmentary view of one of the type wheels and its gear wheels, one of the hammers, said type wheel actuated by the tripping mechanism instead of directly by a key; Fig. 44 is a detail view of a modified form of the hammer rebound device; Fig. 45 is a rear elevation of the device shown in Fig. 44; Fig. 46 is a detail view in side elevation of the type wheels, gear wheels, and parts of the tripping mechanism, appropriate to the shillings column of an English money machine; Fig. 47 is a sectional view of the type wheels, gear wheels and tripping cams of the English money machine, on line 47—47 of Fig. 46; Fig. 48 is a detail perspective view of the double cam, separated into two parts, used in connection with the shillings column for tripping the pounds units column in the English money machine; Fig. 49 is a detail view in perspective of the pence type wheel; Fig. 50 is a detail view in perspective of the tripping dog used between the pence and shillings column and between the shillings and pounds column; Fig. 51 is an elevation of the type plate for the English money machine; Fig. 52 is a detail view in perspective of the shillings type wheels; Fig. 53 is a detail view in perspective of one of the pieces for actuating the column rods; Fig. 54 is a vertical, longitudinal, sectional view of a machine showing certain modifications of the mechanism for setting the pawls in the type wheel gears, and of the mechanism for blocking the hammers; Fig. 55 shows the position of certain of the parts shown in Fig. 54 when the key is depressed; Fig. 56 is a sectional view on the broken line in Fig. 54 looking in the direction of the arrow 56; Fig. 57 is a sectional view on the broken line in Fig. 54 looking in the direction of the arrow 57; Fig. 58 is a detail view in perspective of certain of the parts shown in Fig. 55; Fig. 59 is a detail view in side elevation of a self-locking pawl; Fig. 60 is an end elevation of the self-locking pawl shown in Fig. 59; Fig. 61 is a side elevation of a modified form of part 561 shown in Fig. 55; Fig. 62 is a fragmentary view in side elevation of certain of the parts for resetting the number wheels to zero; Fig. 63 is a plan of a two set key board; Fig. 64 is a sectional view of the machine adapted to a two set key board on line 64—64 of Fig. 65; Fig. 65 is a longitudinal section of said machine on line 65—65 of Fig. 64, looking in the direction of the arrow; Fig. 65½ is a side elevation of a modified form of certain of the parts shown in Fig. 65; Fig. 66 is a cross sectional view on line 66—66 of Fig. 65 looking in the direction of the arrow; Fig. 67 is a detail view in side elevation of one of the connections between an operating key and the pawl setting mechanism; Fig. 68 is a side elevation showing the connection between a key of the two set key board and the type plate; Fig. 69 is a sectional view on line 69—69 of Fig. 70, in direction of arrow, of certain parts of the mechanism of the adding machine applied to the key board of an ordinary typewriter; Fig. 70 is a sectional view of such typewriter key board on line 70—70 of Fig. 69 and of the adding machine connected therewith; Fig. 71 is a sectional view on line 71—71 of Fig. 69; Fig. 72 is a sectional view on line 72—72 of Fig. 70 in the direction of the arrow; Fig. 73 is a sectional view on line 73—73 of Fig. 70 in the direction of the arrow; Fig. 74 is a detail view in side elevation, partly in section, on line 74—74 of Fig. 75, of the re-setting mechanism adapted to the adding machine connected with the typewriter; Fig. 75 is a plan view, partly in section, on line 75—75 of Fig. 74; Fig. 76 is a fragmentary view, in side elevation, showing an electro-magnet for actuating the adding mechanism; Fig. 77 is a sectional view on line 77—77 of Fig. 76; Fig. 78 is a detail view, in section, of the circuit closer operated by a key, for an electrically actuated machine; Fig. 79 is a detail view showing in side elevation the type plate and a modified form of operating mechanism therefor; Fig. 80 is a detail view, in side elevation, of a modified form of locking device for the column rods; Fig. 81 is a section on line 81—81 of Fig. 80 showing said locking device in plan; and Fig. 82 is a fragmentary view in perspective, on an enlarged scale, of certain parts of said modified locking device.

Referring to the drawings, (see particularly Figs. 1, 2, 3, 6 and 7), B, B′ represent the side plates of a frame for supporting the adding devices and associate parts. A hollow stationary shaft 6 (see Figs. 3 and 7) connects the sides B, B′ of the frame, the ends resting in and flush with the outer faces of said side. A stationary shaft 5 also extends between the sides B and B′ of the frame and has its ends supported by said sides and flush with the outer sides thereof. The type wheels for effecting the addition are journaled on shaft 5 and the gear wheels for operating said type wheels are journaled on shaft 6.

*The type-wheels.*—I will now describe the operating mechanism for one of said type wheels or adding wheels which will apply to all.

1 is a gear wheel having 60 teeth, in the construction herein shown, and mounted to turn easily on the hollow shaft 6 which may be provided if desired with ball or roller bearings.

2 is a gear wheel meshing into gear wheel 1 and having, in the construction now being described, ten teeth. Gear wheel 2 is mounted to turn easily on shaft 5 and carries a type wheel or adding wheel 3 which is made fast thereto and turns therewith. At regular intervals on the periphery of type wheel 3 is arranged a series of numeral types which, in an adding machine for a decimal system such as is now being described, number consecutively from "0" to "9" inclusive. The "0" type occupies the position A in Fig. 7 when the machine is at rest and before it has been operated. The next higher type shown in the drawings is "1", the next "2", and so on consecutively around the periphery of the type wheel 3, to type "9" which is the type shown in the drawings immediately below the "0" type at A. The type wheel 3 is rotated clockwise as viewed from the right of the machine (*i. e.* as viewed in Figs. 2, 3 and 7) and the gear wheel 1 which operates the type wheel is rotated counter-clockwise. If the gear wheel 1 be rotated the distance of one tooth, gear wheel 2 will also be turned the distance of one tooth and type "1" will be in the position A, and 1 will have been added on the type wheel 3. In the same manner the several types of the type wheel up to "9" will be brought into position A as the gear wheel 1 is rotated a distance of from 1 to 9 teeth. Any number of similar gear wheels 1 may be mounted side by side on hollow shaft 6, and a corresponding number of gear and type wheels 2 and 3, mounted on shaft 5 to work with the gear wheels 1 respectively. Assuming that a number of these pairs of gear wheels are mounted respectively on shafts 6 and 5, then the first gear wheel 1 at the right of the machine and its type wheel will be used for the unit column of the addition, the next for the tens column, the next for the hundreds column, and so on toward the left for as many pairs of gear wheels as may be employed.

*The tripping mechanism.*—Each time the type wheel 3 of any column passes in its operation from "9" to "0", gear wheel 1 of the next higher column, that is, the column to the left, is automatically advanced one tooth, thus carrying the addition to the next higher column. The mechanism for accomplishing this I will now describe.

Referring particularly to Figs. 3 and 7, part 141 is a six tooth cam wheel fastened solidly to gear wheel 1 and turning therewith on hollow shaft 6. The cam wheel is made with six teeth in order to bear the ratio of 1 to 10 to the number of teeth on gear wheel 1, which is the same ratio between gear wheels 2 and 1. Each gear wheel 1 is provided with such a cam wheel 141. A stationary shaft 143 extends between the sides B and B' of the frame with its end resting in the frame. A dog 142 journaled on shaft 143 engages the cam wheel 141. The dog 142 has an upwardly projecting arm which carries a pin 149 to which is pivoted the arm 144. Arm 144 is provided with a drag pawl 145 pivotally connected with and forming a part of piece 144. Pin 146 projects from the said pawl 145 for the purpose hereinafter set forth. Latches 18, 18', etc., normally engage and lock gear wheels 1, 1', etc., against rotation. As all the tripping devices for the several type wheels are identical, I will for the sake of clearness describe the latch 18' which works in connection with the second gear wheel from the right, namely, gear wheel 1' appropriate to the tens column. Latch 18' (also the other similar latches) is mounted on shaft 20 which extends between the side plates B and B'. Latch operating piece 21' (21 being a similar piece appropriate to the units column) is also journaled on shaft 20 which passes through an enlarged opening in the body of the latch 18' as more clearly shown in Fig. 3ᴬ, so that a clearance is provided which will permit the latch 18' to move independently of the latch operating piece 21'. A spring 148 connects the piece 21' with its arm 144 as shown.

When in normal position as shown in Fig. 7, one wall of the opening in the body of the latch 18' engages the back of the stem of part 21' but is out of contact with the front of said stem. It will be seen therefore that latch 18' may be lifted without moving the part 21' but that if part 21' is swung backward on shaft 20, it will carry with it latch 18' thereby lifting said latch out of engagement with the teeth of gear 1'. In the upper part of piece 21' is an aperture through which passes a rod 150 extending between the sides B and B' of the frame. Said aperture is sufficiently large to afford the piece 21' considerable play but prevents the same from swinging farther forward on shaft 20 as shown in Figs. 7, 3 and 3ᴬ. Spring 148 normally tends to draw the parts 144 and 21' toward each other and also tends to swing the dog 142 pivoted to 144 downward. A rod 147 extending between the sides B and B' of the frame engages a notch in the rear end of arm 144 to limit the forward movement of the same under the influence of spring 148.

The operation of the tripping device as thus far described is as follows: When at rest and before the machine has been operated, the parts are in the positions shown in Fig. 7 with the notched tail part of arm 144 in engagement with the shaft 147, the other end of part 144 resting on the top of the latch operating piece 21', the tension of spring 148 holding the parts 144, 142 and 21' in the positions shown in Fig. 7, the latch 18' being normally held by the spring 19 attached to rod 19', (which runs between sides B and B' of the frame), in engagement with the gear wheel 1'. As the gear wheel 1' turns carrying with it the cam wheel 141, dog 142 is lifted by a cam tooth which pushes back the arm 144 carrying pawl 145. When the gear has been turned the distance of nine teeth so that type "9" of type wheel is in position A, the parts will have assumed the positions shown in Fig. 3, the end of pawl 145 having in the meantime passed over one of the gear teeth. As the gear wheel is being turned one more tooth, to move type wheel 3 to bring the type "0" into the position A, the parts will assume the position shown in Fig. 3ᴬ wherein the end of arm 144 has dropped into the shoulder at the top of part 21', and pawl 145 is in the position shown, and dog 142 is on the point of dropping off from the end of the tooth of the cam wheel 141. This results when the gear wheel has been turned a little less than the whole distance of one tooth to bring the type wheel from "9" to "0". The next instant in the movement of the gear wheel to complete its movement the distance of one tooth, the dog 142 drops off the end of the tooth of the cam wheel 141 and spring 148 draws arm 144 forward, the end thereof striking the shoulder of part 21' and throwing the same backward, thereby lifting the latch 18' which unlocks the gear wheel engaged by said latch. The next instant tripping pawl 145 strikes the tooth of gear wheel 1' in front of it turning the said gear wheel the distance of one tooth. Latch 18' in being lifted strikes against spring 148 as shown in dotted lines in Fig. 3, which momentarily increases the tension of said spring, checks the upward movement of latch 18', and assists to snap the latch 18' back into engagement with gear wheel 1'. Thus the gear wheel 1' is unlocked from latch 18' only long enough to permit a tooth of the gear wheel to clear the latch. As the part 21' is moved backward by the end of arm 144, the tongue of part 21' which extends under arm 144 lifts and knocks the arm 144 out of the shoulder in part 21' at a predetermined point in its movement, thus releasing part 21' and latch 18' so that springs 19 and 148 will snap part 21' and latch 18' back into normal position as shown in Fig. 7. By the above described movements, the type wheel will have been advanced the distance of one type and the next tooth of the cam wheel 141 will be ready again to operate dog 142 and its train of mechanism in the manner described. It will be understood that the dog 142 plays between two adjacent gear wheels as 1 and 1', working with gear wheel 1, and that the arm 144 is directly over the gear wheel 1'. Thus each gear wheel, as 1, by means of its cam wheel 141 operates a dog 142 which in turn operates an arm 144 immediately at the left thereof and thereby operates the gear wheel immediately at the left, or the next higher in order, as gear wheel 1'.

*The type plate.*—Before describing the mechanism for operating the type wheels, I will describe the type plate and its associated parts, from which the individual numbers to be added are printed, since both the type wheels and the type plates are operated simultaneously from the keys and in part by the same connecting mechanism. A shaft 4 passes through hollow shaft 6 and turns therein, both ends of the shaft 4 projecting beyond the sides B and B' of the frame. The segmental part C (Fig. 4) is secured fast to shaft 4 close to the side B of the frame and a similar segmental part C' (Fig. 3) is secured fast to the opposite end of shaft 4 close to the side B' of the frame. The peripheral extremities of these segmental parts are connected by a type plate 37 which is in close proximity to the type wheels 3. Fig. 22 shows a front view of the type plate. The parts C, C' and type plate 37 together may be termed a cradle and will be hereafter collectively referred to as the cradle H. On the side of the cradle opposite to the type plate is an arm at each side of the frame B, B', the opposed arms being connected by rods 7, 8 and 9 (see Figs. 3, 4 and 7) which pass through curved slots provided therefor in the sides B and B' of the frame. On rod 7 connecting these arms are pawls for the purposes hereinafter described, and the arms may, for convenience, be termed the pawl arms of the cradle. When at rest and before the machine has been operated, the cradle H is in the position shown in Figs. 2, 6 and 7 with the type plate 37 having its "0" types in position A. A spiral spring 24 (Fig. 1) the inner end of which is connected to shaft 4 and the outer end of which is connected with a projection 24' on the side of frame B' tends normally to throw the type plate 37 downward, and the pawl arms of the cradle H upward. The details and purpose of the type plate 37 will be hereinafter further described.

*Mechanism for actuating the type wheels and type plate.*—Referring now to the mechanism for operating the type wheels and the type plate from the keys, a pawl 11 (Fig. 7) is provided for each gear wheel 1, 1', etc. These pawls are pivoted on shaft 7 carried by the pawl arm of the cradle. Shaft 8 passes through an elongated hole in pawl 11 as most clearly shown in Figs. 3 and 7, which limits the movement of the pawl upon its pivot. A spring 10 (see Fig. 7) one end of which presses against pawl 11 and the other end of which presses against shaft 9, tends to throw the nose of the pawl clear of the teeth of the gear wheel 1. In operating the machine, if pawl 11 is moved into engagement with the teeth of gear wheel 1 and there held, and the pawl arms of the cradle H then depressed, gear wheel 1 will be rotated, and in turn will rotate its type wheel. In Fig. 3 the parts are shown in the position they will assume when pawl 11 and gear wheel 1 have been rotated a distance of nine teeth. Each gear wheel in the set is provided with a similar pawl and all are operated in a similar manner. It will be seen, therefore, that the addition will be performed in the desired column by engaging the pawl appropriate to the gear wheel of the desired column, and depressing the pawl arms of the cradle H the desired distance.

To lock the gear wheel 1 against reverse, a drag pawl 15 is provided swinging on shaft 16 which extends between the sides B and B' of the frame. One such drag wheel is provided for each gear wheel. A spring 17 connecting pawl 15 and rod 22, which also extends between the sides B and B' of the frame, holds the pawl 15 in engagement with the gear wheel 1, thus preventing the gear wheel 1 from turning backward. With the latch 18 which has already been described and the pawl 15 both set into the teeth of the gear wheel 1, the gear wheel will be locked against movement in either direction.

To operate pawl 11 to engage the gear wheel, and latch 18 to disengage the gear wheel, by using the keys of the machine, parts 12 and 13 in the form of bell crank levers are provided both swinging on shaft 14 which extends between the side plates B and B' of the frame. The lower arm of lever 12 is split or bifurcated as is also the ear at the upper end of lever 12, and the lever 13 is lodged and plays between the split parts of lever 12. A set screw 23 (Fig. 7) in the lower arm of lever 12 is used to adjust the levers 12 and 13 with relation to each other. When the lower arm of lever 13 is raised it carries with it the lower arm of lever 12. The trip of the upper arm of lever 13 presses down the tail of latch 18, thus lifting latch 18 out of engagement with the teeth of gear wheel 1. (See dotted lines in Fig. 3). Simultaneously with the lifting of latch 18 the upper end of lever 12 swings inward and presses pawl 11 into engagement with the teeth of gear wheel 1 and holds it there so long as the upper arm of lever 12 is swung forward no matter in what position pawl 11 may be, since, as will be seen from the drawings, the face of lever arm 12 describes the arc of a circle concentric with the axis on which pawl 11 swings. (See Fig. 3). It will be observed that latch 18 is being withdrawn from the gear teeth simultaneously with the movement of pawl 11 into the gear teeth so that there will be no instant when the gear wheel is not locked either by latch 18 or pawl 11. If, now, the pawl arms of cradle H, which carry pawl 11, are depressed for the distance say of nine teeth of the gear wheel 1, the parts will assume the position shown in Fig. 3 and the operation will have added nine on the type wheel, and at the same time will have moved the type plate into the position to print "9" as will be hereinafter more specifically described. At the moment pawl 11 reaches the position shown in Fig. 3, or such other position as constitutes the end of its stroke, the lever 13 is automatically released so that it returns to normal position as shown in Fig. 3, allowing the latch 18 to drop back into engagement with the gear wheel 1 locking the latter in the position to which it has been carried by pawl 11. At this instant both the latch 18 and pawl 11 will be locked into the teeth of the gear wheel 1 as shown in Fig. 3. These movements including the automatic release of latch 18, have been accomplished by depressing an operating key. The first part of the return movement of the operating key releases the lever 12 which drops back into the position shown in Fig. 7, allowing pawl 11 to spring away from the teeth of gear wheel 1, as hereinafter described. Cradle H carrying pawl 11 is then returned to its original position shown in Figs. 6 and 7 by means of the spring 24 operating on shaft 4 as already described.

Lever 13 is operated by a slide 27 mounted in an oscillating slideway 25 which swings on a stationary shaft 26 extending between the sides B and B' of the frame. The upper end of the slide 27 normally rests in a notch in the lower arm of lever 13 as shown in Figs. 2 and 7. A spring 28 (Fig. 3) tends normally to urge the slide 27 upward into engagement with the lower arm of lever 13. Pivotally connected with the oscillating piece 25 is a rod 36 (see Figs. 2 and 3). Upon the depression of the operating key presently to be described, rod 36 pulls part 25 to the left, as viewed in Figs. 2 and 3, which causes the end of slide 27 to ride up the side of the notch in lower arm of lever 13, thus lifting the same and operating the levers 12 and 13 as described above. The lower arm of lever 13 from the notch to the end of the arm is shaped so that when it is lifted to the point where slide 27 leaves the notch, its lower face will be in the arc of a circle described from the center of shaft 26. Thus it will be seen that the first part of the movement of slideway 25 will lift the levers 13 and 12 thereby operating the latch 18 and pawl 11, while the rest of the movement of the part 25 will merely hold the levers 13 and 12 in their operative position. (See dotted line position in Fig. 3).

To effect the automatic release of lever 13, and consequently the automatic release of latch 18, when pawl 11 reaches the end of its stroke, I provide a block 32 which extends between and is fast to the sides B and B' of the frame, said block carrying adjustable screws 31, one such screw being in line with each of the oscillating slideways 25, of which there is one for each gear wheel. A sliding lock or bolt 29 normally engages and holds the slide 27 in extended or elevated position. A spring 30 normally urges the lock 29 into its operative position under slide 27. As the oscillating slideway 25 swings to the left, the end of lock 29 strikes the end of screw 31 and is forced out of engagement with slide 27, thus releasing slide 27 and allowing it to be moved downward by the arm of lever 13. The upper end of lever 13 is forced backward by the tail of latch 18, under the influence of spring 19, thus restoring the latch 18 to its normal position in engagement with the gear wheel, lever 13 and slide 27 assuming the positions all as shown in Fig. 3.

In order that lever 12 however may not be restored to its normal position until the commencement of the return movement of the actuating key, the following mechanisms are provided: A rod 33 pivoted to the tail end of the oscillating block 25, is provided with a projection 34 on its upper side. Rod 33 follows the motion of block 25 and when the latter has reached the position shown in Fig. 3 the projection 34 will be under projection 35 on the lower arm of lever 12, thus holding lever 12 in place so that pawl 11 will not leave the teeth of the gear wheel 1. It will be remembered that the motion was imparted to 25 by the downward stroke of the operating key. When the parts are in the position shown in Fig. 3, the operating key is fully depressed. As the operating key is released block 25 together with rod 33 starts to return to its original position as shown in Fig. 2. The first part of this return movement carries the projection 34 out from under the projection 35 thus allowing lever 12 to drop off into its original position, releasing pawl 11, which together with the cradle H resumes its original position shown in Figs. 2, 6 and 7.

The mechanism for operating the cradle H is as follows: The pawl arm of the cradle is provided with a pin 38 to which is pivoted the link 39 (Figs. 4 and 6). Shaft 43 extends between the sides D and D′ of the keyboard frame and is rotatable in said frame. The lever arm 41 is made fast to the shaft 43 and is provided at its end with a pin 42 which projects into the right angled slot 51 provided in link 39. A spring 40 fastened to the link 39 normally confines the pin 42 in the upper part of the right angled slot 51. (Figs. 1, 4 and 6). When the machine is at rest and before being operated, these parts are in the positions shown in Fig. 6. To swing the cradle H on its axis, shaft 43 (which may be termed an adding shaft) is rotated in a direction with the hands of a clock which swings the arm 41 downward carrying with it link 39 and the pawl arm of the cradle H, thereby swinging the type plate of cradle H upward. The distance of the movement of the type plate 37 will be such as to bring the type numeral into printing position corresponding with the numeral added on the type wheels by the same stroke of the key as will be presently described.

Shaft 43 is rotated as above described by the lever 44 which is fastened solidly at one end to the shaft 43 (Figs. 1, 4 and 14). The other end of lever 44 is provided with an angularly shaped slot, one part of which is indicated at 45 and the other part at 46. 47 is a lever arm which swings on shaft 26 extending between the sides D and D′ of the keyboard frame. At the end of lever arm 47 is a pin 49 which projects into the slot 45, 46 and also serves as a pivotal connection between the end of lever arm 47 and the end of rod 50. When at rest and before the machine is operated, these parts are in the positions shown in Fig. 14 with pin 49 in the slot 45.

When the rod 50 is pulled backward by the downward stroke of the operating key as hereinafter described, pin 49 swings lever arm 47 on its shaft 26 until pin 49 comes in contact with the working face of slot 46. Thereupon the continued movement of pin 49 swings lever 44, thereby turning shaft 43 which operates the cradle as already described. The complete movement of rod 50 carries pin 49 to the end or bottom of slot 46 as shown in Fig. 4. The working face of slot 46 is so shaped that at the end of its movement, lever arm 44 has been lifted sufficiently to transmit through the intervening mechanism the movement necessary to accomplish the printing and addition of the member appropriate to the key by which said parts have been operated.

The lever arm 44 for convenience may be termed an adding arm. There are nine such adding arms for a decimal system adding machine, fixed solidly to shaft 43 indicated collectively at E in Fig. 1. One adding arm is provided for each numeral "1" to "9" inclusive. The slots of the several adding arms corresponding to slot 46 in adding arm 44 are so shaped in the several arms that when operated they will give the proper amount of motion to shaft 43 to move the adding wheels and the type plate the appropriate distance. Thus, if it is desired to add 1, the adding arm appropriate to the "1" key is used; if it is desired to add 2 the adding arm appropriate to the "2" key is used, and so on. The adding arm shown in Figs. 4 and 14 is the adding arm of the "9" key and when used 9 will be added in whatever column is being operated. Arm 52 in Fig. 13 is the adding arm appropriate to the "1" key; lever arm 53 in Fig. 13 corresponds to lever arm 47 (Fig. 4) and it will be understood that a similar lever arm is used for each adding arm. The lever arm 53 is operated by the rod 57 which corresponds with rod 50 shown in Figs. 4 and 14; said rods 50, 57 and the other similar rods may be termed the adding rods. A slot 56 (Fig. 13) corresponding with slot 46 in Figs. 4 and 14 is so shaped that the travel of the pin 54 corresponding to pin 49 will lift the adding arm only sufficiently to add 1 on the type wheel 3 of the column operated, and print "1" from the type plate. It will be understood that the intervening adding arms between the number 1 and number 9 adding arm will be provided with slots corresponding to slots 46 and 56 graded step by step between said two extreme forms. The working faces of said slots constitute cam surfaces acted upon by the pins. Slots 45 and 55 and the corresponding slots in all the other adding arms are precisely similar and describe arcs of circles from the center of shaft 43, for the purpose hereinafter described. Inasmuch as all nine adding arms are fastened solidly to shaft 43, it is evident that when any one of the adding arms is being operated, all the other adding arms will move with it, being carried by shaft 43.

The slots in the several adding arms corresponding to slots 45 and 55 already described form locks which when one adding arm is in use, lock all the other adding arms and prevent any other key than that corresponding to the adding arm in use from being depressed. To illustrate: Assume that the operating key which pulls rod 50 has been depressed for part of its stroke. Pin 49 will then have lifted adding arm 44 turning the shaft 43 part way toward the addition of the number corresponding with the adding arm, in this case the number "9". Under these conditions shaft 43 will have been partially turned, lever 52 (see Fig. 13) will have swung with shaft 43 and slot 55 will have been moved so that the pin 54, which has remained stationary, will be within the slot 55. It will thus be seen that when pin 54 tends to swing in the arc of a circle described through a center on shaft 26 it will strike against the top of slot 55 and therefore cannot be moved; and if an attempt is made to depress the corresponding operating key, namely, that which moves rod 57, said rod and key will be locked against movement by the pin 54.

*The printing mechanism.*—The type plate 37 extends between and is secured to the faces of the segments of cradle H (see particularly Figs. 3, 4, 5, 6, 7 and 22). This type plate is curved to conform to the arc of a circle described about the center of shaft 4. The type plate swings in close proximity with the type wheels 3, so that the same printing hammers may be used when printing from the type plate or from the adding wheels as hereinafter more fully described. On the face of the type plate 37 are a number of columns of types, ten types in each column from "0" to "9" inclusive as best shown in Fig. 22. A column of types is directly in line with each of the type wheels 3. When the machine is at rest and before it has been operated, the type plate 37 is in the position shown in Figs. 6, 7 and 22. The types then in line with position A are the "0" types, the next type below it is the "1" type and so on consecutively to the "9" type. When the pawl arms of the cradle H are swung downward, the type plate 37 will swing upward. The types upon the type plate 37 are spaced so that when the pawl arms of the cradle H are turned downward the distance to add 1 on the type wheels 3, the horizontal row "1's" on the type plate 37 will be opposite position A. If the pawl arms are depressed sufficiently to add 2 on the type wheels 3 then the horizontal row of "2's" on the type plate will be opposite position A and so on consecutively to 9. In Figs. 3 and 4 the type plate 37 is shown in the position occupied when 9 is being added on the type wheels 3.

Referring now to the printing hammers which print both from the type plate and from the adding wheels, and of which there is one for each vertical row of types, 109 represents one of said hammers pivoted to shaft 110 which extends between the side frames of the machine. Another shaft 105 also extending between the side frames B, B' and turning therein carries the part 103. The end of the upper arm of part 103 is slotted and provided with a pin 104 with which the hooked end of part 33 engages. The lower arm of part 103 is also made with a slot and in this slot latch 106 plays, pivoted on the pin 108. The tail end of latch 106 strikes against the head of adjusting screw 116 which limits the movement of the latch in that direction. A spring 107 holds the latch normally in the position shown in Fig. 3. There is a part 103 in alinement with each hammer 109. Each hammer 109 is provided with the downwardly extending arm 109' which is slotted, and in the slot the piece 111 plays pivoted on pin 112. One end of a coil spring 114 is fastened to piece 111 while the other end is fastened to an adjusting screw 115 mounted in a transverse block 113, (see Figs. 1 and 2), which extends between arm extensions of the sides of frame B and B', and is adjustable back and forth in slots 118 in said arm extensions. The screws 115 which pass through the block 113 may be used to adjust the tension of the several springs 114 individually. In order to move the block 113 in the slots 118 and thus vary the tension of all the springs simultaneously, I provide cam 117 which controls the movement of block 113. When in the position shown in the drawings with the handle of cam 117 thrown away from block 113, and block 113 thereby moved to the outer end of the slots, the tension of all the springs is increased. The force of the blows struck by the hammers will thereby be increased, as will be desirable when manifold printing is to be done on the machine. In order to reduce the tension of the springs, as when printing on a single sheet instead of manifolding, the handle of cam 117 is thrown downward or to the rear toward block 113, thus allowing the block 113 to slide back in slots 118 under the influence of the springs 114, the tension of which is thereby reduced.

The lower end of piece 111 of the hammer 109 rests against a block 119 which extends between and is solidly fastened to the sides of frame B and B' (see Fig. 2). When in the position shown in this figure it will be seen that the tension of springs 114 is exerted against pin 112 which is above the shaft 110 and therefore tends to throw the striking end of the hammers 109 away from the type plate 37. The lower end of arm 109' has a stop to limit the movement of the piece 111 in the slot provided in 109', thus holding the hammer 109 in the position shown in Figs. 2 and 3, with the latch 106 normally underneath the projection 109², as shown in Fig. 2. The vertical dotted lines in Figs. 3 and 4 between the type plate 37 and the striking ends of the hammers 109, represent the inked tape or ribbon and the paper, the ink tape being between the paper and the type plate 37, as will be hereinafter more fully described.

When the operating key for adding 9 in the unit column, for example, is depressed, rod 33 (Figs. 2 and 3) is drawn backward which swings part 103 on shaft 105 until latch 106 comes in contact with arm 109² of the hammer 109. Continued movement of the rod 33 lifts arm 109² which throws the striking end of the hammer away from the type plate 37, and also lifts the end of part 111 away from block 119. When the operating key is about to complete its stroke, parts 103 and 109 are in the positions shown by dotted lines in Fig. 3 with the end of latch 106 just about to move from under arms 109²; and the line of the "9" types on the type plate 37 just coming into position A. The next instant in the movement of the parts, arm 109² will drop off latch 106 allowing hammer 109 to fly forward against the paper, under the influence of springs 114, driving the paper and ink ribbon against type "9" on the type plate 37, thus printing "9" on the paper. The position of the hammer in the act of printing is shown in dotted lines in Fig. 3. When in its forward movement the end of hammer 109 reaches the position shown by full lines in Fig. 3, the end of piece 111 strikes against block 119 whereupon spring 114 exerts pressure through pin 112 upon hammer 109 in a direction opposite to its travel. The momentum of the hammer however is sufficient to overcome this reverse pressure and permit it to strike its printing blow on the ribbon. The pressure of piece 111 holds hammer 109 from striking a second blow retaining it in the position shown by full lines in Fig. 3. When the operating key is released the various parts resume their original position as shown in Fig. 2, and in so doing latch 106 yields as it passes the end of arm 109, and again is snapped back into place by spring 107.

In order positively to control the movements of the cradle H the following mechanism is provided: A block 126 (Figs. 4, 5 and 6) is fastened solidly to the outside of the side frame B and limits the upward movement of arm 41, so that when the cradle H falls back into its normal or inoperative position after the machine has been operated, arm 41 strikes block 126, and through link 39 stops the cradle in the same position each time it returns to normal position. On the end of pawl arm C is a projection 131 which coöperates with latch 125 made fast to the end of shaft 120, which passes through the sides B and B' of the frame. Latch 125 is close to the side B of the frame and in line with the projection 131. A pin 122 projects from shaft 120 and is connected by a spring 123 with a pin 124 on the side B of the frame, thus tending to throw the latch 125 in the direction of the nose 131 of the pawl arm.

In order to move the latch 125 to release the pawl arm, a lever 121 is provided (Figs. 4 and 7) consisting of a stiff wire or rod, the horizontal or transverse part of which extends across the machine between the levers 12 and 13 and the ends of which are bent up at right angles and are securely fastened into shaft 120.

When the operating key of the key board is depressed parts 12 and 13 are thrown forward lifting latch 18 and setting pawl 11, as already described. As part 13 moves forward it strikes the horizontal part of rod 121 thus rocking shaft 120, which throws latch 125 out from under projection 131. The lifting of latch 18, the setting of pawl 11 and the withdrawal of latch 125 from under projection 131, all occur simultaneously during the first part of the movement of the operating key. Further depression of the operating key causes the pawl arms of cradle H to move downward to the end of the stroke. As the pawl arms of the cradle H approach the end of their movement, as already described, part 13 will be released and will fall back into position shown in Fig. 7 out of engagement with lever 121 thereby permitting latch 125 to swing forward, the parts assuming the position shown in Fig. 4. It has been assumed that the "9" operating key was depressed. When the operating key is released the parts will be restored to their original positions as shown in Figs. 6 and 7. As cradle H swings back to the position shown in Fig. 6, the projection 131 strikes latch 125 deflecting the same until the cradle is brought to a stop by lever arm 41 striking block 126 when the latch 125 will drop under projection 131. Two results are thus accomplished; any rebound caused by the striking of arm 141 against block 126 will be prevented, and the machine will be locked fast when arm 41 rests against the block 126 and latch 125 is under projection 131. Shaft 226, hereinafter described, engages and limits the forward movement of latch 125.

The side of the slot in each adding arm, corresponding to slot 46 of arm 44, opposite to the cam surface of said slot, prevents the cam surface or working surface of the slot from leaving the pin corresponding to pin 49 during any part of the stroke, and positively arrests the movement of cradle H at the end of the stroke of the operating key. As an additional provision to arrest the movement of the cradle H, to prevent the possibility of any "throw-by", by reason of the wearing of the parts, or any looseness or play therebetween, and to insure perfect alinement of the printing, the following mechanism is provided: shaft 127 (see Figs. 1, 4 and 14) extends between and rotates in the sides D, D' of the frame. Lever 129 is fastened solidly to shaft 127, the slot at the free end of lever 129 engaging pin 49. A lever performing a similar function to 129 is provided for each adding arm carried by shaft 43. It will be understood therefore that there are nine parts corresponding to part 129 in a decimal system adding machine. Fastened solidly to shaft 127 at the side of the frame B' is a stop 128 which has a series of steps or notches adapted to engage and arrest the projection 132 secured to the end of the pawl arm of cradle H. When at rest and before the machine has been operated the stop 128 is in position shown in Fig. 2 with the lowermost step in the path of projection 132. When in the operation of the adding arm, as already described, pin 49 pulls down the pawl arms of cradle H to a point where "9" will be added on the type wheels 3 and the cradle will be elevated so as to print "9", the pin 49 operating on the working face of the slot in lever 129, will lift the latter, thereby rotating shaft 127 so as to throw stop 128 forward to a point where the projection 132 of the pawl arm will strike on the second notch or step from the bottom, thus positively arresting the movement of the cradle at exactly the right point and preventing any "throw-by" due to the momentum of the cradle or to lost motion in the parts between pin 49 and the pawl arm of the cradle.

Referring to Fig. 13, lever 130 represents the part corresponding to part 129 in Fig. 14 and is used in conjunction with adding arm 52. The pin 54 operating in slot 56 causes the cradle H to be depressed so as to add "1" on the type wheels 3, and at the same time causes stop 128 to be thrown forward so that the projection 132 of the pawl arm will strike on the top notch or step of the stop 128 so limiting the movement of cradle H as to bring "1" into alinement to be printed. In similar manner the several arms on shaft 127, coöperating with the other adding arms on shaft 43, are adapted respectively to move the stop 128 so as to arrest the movement of the cradle in the different positions corresponding with the numerals on the several keys.

*The keyboard and its connections.*—Referring now to the keyboard and its connections the decimal system machine shown in the drawings contains five columns of keys. It will be understood, however, that the machine can be made for adding any number of columns by simply duplicating the parts. Each vertical column contains ten keys (see Figs. 1ᴬ, 1 and 2). The tops of the keys are numbered in each column from front to back from "0" to "9" inclusive. The depression of any key causes the machine to add on type wheels 3 the amount indicated by the number on the key, in the column in which the key is located. Thus, starting with the adding wheels at zero, if the "5" key is depressed in the units column the type wheel of the units column will stand at 5. If the "2" key in the same column then is depressed, 2 will be added in the units column, and the unit type wheel will stand at "7". If then the "8" key of the same column is depressed 8 will be added and the unit type wheel will stand at "5" and the ten's type wheel at "1", the unit type wheel having passed from "9" to "0" and the ten's type wheel having been tripped once as already described, the two type wheels reading as a result "15". It will also be understood that the several figures which enter into the addition will be recorded by the printing device. The sum may also be printed and the items spaced and tabulated as presently to be described.

Referring to Figs. 1 and 2, shafts numbered 60 to 69 inclusive extend between and are mounted to turn easily in the sides of frame D, D'. These shafts may be termed numeral shafts. Springs 70 connected at one end with the frame and at the other end with the several numeral shafts, tend to rotate said shafts counter clockwise as viewed in Fig. 2. Fastened solidly to shaft 69 (Figs. 1 and 4) is a crank arm 85 having a pin 85' to which the end of rod 50 is pivoted. The connections at the other end of rod 50 have already been described and are illustrated in Fig. 4. It will be seen that the rotation of shaft 69 from the position shown in Figs. 1 and 2 to that shown in Fig. 4 will operate the parts so that 9 will have been added to some one of the type wheels. Similar crank arms 86 to 93 inclusive (Fig. 1) are secured to the other numeral shafts, and connected by rods 133 to 139 inclusive and rod 57, to the several pins which operate the several adding arms on shaft 43, and thereby operate the parts actuated by said adding arms. The rods 133 to 139 inclusive and 57 connect respectively the numeral shafts appropriate respectively to the "8", "7", "6", "5", "4", "3", "2" and "1" adding arms, with shaft 43.

The keys 94 to 102 inclusive and 71 form the unit column numbered from "0" to "9" (see Fig. 1ᴬ). Each column on the keyboard has a similar set of keys bearing similar characters, the unit column being indicated by G, (see Fig. 1ᴬ) the tens column by J, the hundreds column by K, the thousands column by L and the ten thousands column by M. The keys shown in Fig. 1ᴬ are appropriate for adding and printing figures in a decimal system, such as dollars and cents. Each key is mounted on a key shaft 71' (Figs. 2 and 3). The key shafts pass through suitable closely fitting holes in the roof 58 and floor 59 of the keyboard. A shoulder 71² (see Fig. 3) is provided on each key shaft 71' to limit the upward movement of the key by striking against the roof of the keyboard. Another shoulder 71³ limits the downward movement of the key shaft by striking against the floor of the keyboard. The several key shafts are made with teeth to form a rack as shown, and each such rack engages a gear segment 72 mounted to turn loosely on the numeral shafts 60 to 69 inclusive. Adjacent to each gear segment and fastened solidly to its numeral shaft are the arms 73, one for each key. A link 74 is also mounted beside each gear segment 72 on the side opposite the arms 73 and swings freely on the numeral shaft. Thus it will be seen that while the gear segments 72 and the links 74 are free to turn on the numeral shafts, arms 73 are fixed solidly on said shafts. Each gear segment carries a pin 75 projecting from the segment at each side and resting at its ends against arms 73 and links 74 when the keys are in normal position. Each link 74 is provided at its end with a pin 76 engaging a notch or recess in bar 77. A series of shafts 80 to 84 inclusive (Figs. 1 and 2) extend between the sides of the frame D, D' with their ends mounted to turn freely in said frame. These shafts may be termed offset shafts. Springs 140 connected at one end with said shafts and at the other end with the frame tend to rotate said shafts counter clockwise. A pair of arms is fastened solidly to each offset shaft, arms 78 and 79 on shaft 81 being sufficiently illustrative. It will be seen that arms 78 and 79 lie in the same plane and on the same side of the shaft 81. The ends of arms 78 and 79 are forked or slotted, and a pin 78' extends across the slot and through rod 77 serving as a pivot therefor. The front end of rod 77 is pivoted on pin 76', carried by the link 74' at the front of the machine (Fig. 2). A rod 77 of precisely similar construction is provided for each column of keys on the keyboard. These rods may be termed collectively the column rods. Arm 79 is pivotally connected to the end of rod 36 by the movement of which the adding and printing devices are actuated as already described.

Following through the operation which results from depressing a key: Suppose key 71 (the "9" key of the units column) is depressed; segment 72 will be swung downward, pin 75 carrying with it arm 73 and link 74; shaft 69 will be rotated by arm 73; column rod 77 pulled toward the left (Fig. 2) by the pin 76 in link 74; arm 78 will be swung in the same direction turning the offset rod 81 which swings arm 79 pulling with it rod 36 in the same direction; rod 36 swings part 25 on the shaft 26 (Fig. 3) which lifts the lower part of lever arm 13 carrying with it the lower part of arm 12, the upper part of arm 13 lifting latch 18 and also latch 125 (see Fig. 6). When part 13 lifts these two latches, arm 12 sets pawl 11. The movement of part 25 also pulls rod 33 which swings part 103 on its pivot, latch 106 approaching the arm 109² of the hammer. If the downward movement of the key 71 is arrested at the moment when the slide 27 leaves the notch in the lower arm of part 13, and when part 103 starts to lift arm 109² of the hammer 109, the shaft 69 will have moved arm 85 (Figs. 1, 2, 4 and 14) so as to pull rod 50 far enough to move pin 49 at the end of rod 50 into contact with the working face of slot 46 in the adding arm 44. Before continuing the downward movement of the key 71 and at the moment in question, the positions of the various parts are as follows: Levers 12 and 13 (Fig. 3) will have been moved forward lifting latches 18 and 125 and setting pawl 11. Latch 125 (Fig. 6) will therefore unlock cradle H. Cradle H and gear wheel 1 are therefore in position ready to be operated to add on the type wheel 3 and to print on the type plate 37. Slide 27 on part 25 is out of the notch in part 13, and part 103 is ready to operate hammer 109. Pin 49 at the end of rod 50 is in contact with the working face of slot 46 and ready to operate the adding arm 44, and the stop 128 on shaft 127 has started to swing forward.

Continuing the depression of key 71 to the point shown in dotted lines on Fig. 3, the lock 29 in part 25 will be pushed from under slide 27 allowing the latter to drop down releasing part 13 so that the latch 18 can drop into the teeth of gear 11 locking it and releasing latch 125. Gear wheel 1 will then have been revolved almost to the extent of 9 teeth, so that type "9" of type wheel is approaching position A, and type plate 37 has been raised to the point where the line of the "9" types is also approaching position A. Arm 109² of hammer 109 is just about to drop off the point of latch 106, and stop 128 has been moved into position to arrest the cradle H. The completion of the stroke of the key 71 releases the hammer 109 which strikes a blow to print "9" in the column operated (the unit column has been described for the purpose of illustration) and all the parts are in the positions shown by full lines in Fig. 3. When key 71 is released and allowed to resume its original position all the parts will return to the positions shown in Fig. 2, lever 12 and pawl 11 having been released at the beginning of the upward movement of the key and resuming their original positions as above described. "9" will have been added in the unit column and printed on the paper and the machine will be ready for the next operation. In a similar manner if any of the other keys 95 to 102 inclusive in the unit column be depressed, the column rod 77 will be operated as described with reference to key 71 and one of the shafts 61 to 68 inclusive will be rotated thereby working one of the adding arms on shaft 43, and the corresponding arm on shaft 127 appropriate to the key which is being used. In each instance the action of the machine will be the same as already described excepting that the pawl arms of the cradle H will be swung only to a sufficient extent to add the number on the type wheel 3 corresponding to the key which is depressed and to bring the line of figures on the type plate 37, corresponding to the key depressed, into position A. Inasmuch as shaft 60 has no connection with an adding arm on shaft 43, when key 94 is depressed it will operate column rod 77 which will operate hammer 109 but will not operate cradle H. Therefore "0" will be printed in the unit column but no addition will be made.

By referring to Fig. 1 it will be seen that on each of the offset shafts 80 to 84 inclusive there are fastened arms corresponding with arms 78 and 79 already described with reference to offset shaft 81. These arms are all identical. It will be seen that the column rod of the second or tens column is connected with the lever arm on offset shaft 82, which corresponds to the arm 78 on offset shaft 71, and that the other arm on offset shaft 72 which corresponds with the arm 79 on offset shaft 81, connects with the second rod, like rod 36, so as to work the second or tens type wheel 3' and the corresponding printing hammer. Similar connections are provided for each column of keys and the column rod for each column of the key works through its proper offset shaft and connections the type wheel and hammer for that column.

The depression of any key on the keyboard will leave all the other keys stationary and unaffected. For example: when key 71 (Fig. 2) is in use, although column rod 77 is swung backward carrying with it all the links corresponding with link 74 in the unit column, yet all shafts 60 to 68 inclusive will remain unaffected since the links 74 are loosely mounted thereon; and arms 73 will prevent the keys in the same column which are not being used from dropping. In a similar way the keys in the same horizontal as well as in the same vertical row with the key depressed will remain unaffected, because although the shaft 69, or one of the other similar shafts as the case may be, carries with it all the arms 73 nevertheless the column rods of the other vertical columns remain stationary and therefore the keys in the same horizontal row with the one depressed are held in place by the links 74.

*Locking the keys not in use.*—In order to lock the columns so that only one may be operated at a time I provide the following devices: A rocker 152 (Figs. 1, 2 and 3) is pivotally mounted between the sides of the frame B, B' on studs 153 and 153'. The front bar 152' of the rocker extends across the rods 36 and may be termed the nose of the rocker. The rear bar 152² of the rocker also extends across the bars 36 and may be termed the heel of the rocker. Each bar or rod 36 has an elevation or cam surface on its upper side as best shown in Fig. 3. A notch is provided at the inner end of this elevation. When at rest and before the machine is operated the parts are in the positions shown in Figs. 1 and 2 with all of said notches in alinement and the heel of the rocker behind the elevations. Should the heel 152² of the rocker be lifted the nose 152' would be thrown down into these notches, and every key on the keyboard would be positively locked against movement by the locking of the rods 36 in this manner. When, therefore, any one of the rods 36 is moved by the operation of a key, the elevation on that rod lifts the heel of the rocker, as shown in Fig. 3, and throws down the nose into the notches of the other rods. To illustrate: Suppose a key in the unit column is depressed; rod 36 in that column is thereby drawn backward and the elevation on said rod 36 lifts the heel and depresses the nose of the rocker, which settles into the notches on all of the rods excepting the rod 36 which is being operated. The notch in the latter rod will have been withdrawn from under the nose of the rocker. The surface of these elevations is of such shape that the heel 152² will be held up and the nose 152' will be held down during the full movement of the operating key. Thus, during that movement and until the column rod and its connected parts have returned to normal position all of the other columns will be securely locked against operation.

*Printing the sum.*—In order to print the sum, the printing devices having recorded the several numbers which enter into the addition and the adding wheels having added said amounts, the sum key 173 (Fig. 1^A) is depressed which causes the type plate 37 to drop down out of the path of the printing hammers 109 as shown in Fig. 5. At the same time all the hammers are drawn back and released together and as there is a hammer for each type wheel whatever the amount the type wheels show will be printed on the paper.

The mechanism for dropping the type plate 37 is as follows: Shaft 129 is a short shaft passing through the side of frame B (see especially Figs. 5, 6 and 7). Fastened to shaft 159 which turns in the frame is the finger 158 just outside of the frame B. On the other end of shaft 159 and inside of the frame B the lever 160 is solidly fastened and connected by a pin 160' with one end of link 161, the other end of which is connected by a pin 162' with the arm 162 which is fastened solidly on shaft 105 just inside of the frame B and directly underneath the arm 160. A spring 162² tends to lift arm 160 (Fig. 7).

163 is an arm fastened solidly to shaft 105 outside of the frame B' and is connected by pin 163² with link 167. The other end of link 167 is connected by a pin 168' with lever arm 168 which is fastened solidly to shaft 169 supported in a stand 174 mounted on the bed plate. Arm 170 is also fastened solidly to shaft 169 outside of the frame D' and is connected by a pin 170' with link 171, the other end of which is connected by a pin 172' with the lever 172. Lever 172 is mounted to swing on a stud 175, projecting from outside of the frame D' and having a screw 171' (see Figs. 1^A and 5) for holding the lever 172 on the stud. Lever 172 is provided at its free end with the sum key 173. When the sum key 173 is depressed as shown in Fig. 5, it will lift rod 171 and arm 170 thereby rocking the shaft 169 which, by means of arm 168, pulls rod 167 thereby rocking shaft 105 through the arm 163, in the same direction. The arm 162 carried by shaft 105 pulls down the link 161 and with it arm 160 thereby rocking shaft 159, which throws finger 158 upward. In the first part of the upward swing of finger 158 the point of the finger strikes against the upright face of part 39 thus forcing the lower end backward. The balance of the movement of finger 158 lifts part 39 thereby dropping the type plate 37 out of the path of the hammers as shown in Fig. 5.

To describe more in detail the action of the part 39: A presser arm 154 (see Figs. 5 and 6) is pivoted to stud 155 mounted on the outside of the frame B. A lug 154' projecting from the side of arm 154 normally rests on the block 126. Spring 156 which engages pin 154² at one end and 157 on the frame at the other end tends to depress the arm 154 to hold the lug 154' against block 126. A pin 39' projects from part 39 and engages the end of arm 154. As already described a spring 24 (Fig. 1) tends to rotate shaft 4 so as to throw type plate 37 downward. The tension of spring 24 is less than the tension of spring 156 so that when the two springs are acting one against the other, spring 156 overcomes spring 24. But when the sum key is depressed and operates the intervening parts as described, it will be seen that the resistance of spring 156 will be overcome, the part 39 lifted, and the type plate 37 consequently depressed. At the same time the printing hammers will be operated by the following mechanism: Part 163, which is similar to part 103 shown in Fig. 3 and heretofore described, carries a latch 164 pivoted thereto at 164² and yieldingly pressed forward by the spring 164'. Solidly fastened to shaft 110 outside of the frame B and in a line with part 163 is the arm 165. Part 166' is also fastened solidly to shaft 110 just inside of the frame B' and there is a duplicate part 166 fastened solidly on the shaft 110 just inside of the frame B. A rod 166² is fastened at its ends to parts 166 and 166' extending across the lower ends of all the hammers 109. When the sum key 173 is depressed the swinging of part 163 brings latch 164 into engagement with the arm 165 and lifts it thereby rotating shaft 110 which carries with it the arms 166 and 166' causing the rod 166² to operate the lower ends of hammers 109 throwing their striking faces away from type wheels 3. When the arm 165 drops off the end of latch 164, the type plate 37 will have moved to position shown in Fig. 5, and the hammers will fly forward together driving the paper and inked tape against the type wheels thus printing the sum exposed thereon. In Fig. 5^A there is illustrated the position of the parts at the moment when the arm 165 is about to drop off the end of latch 164. When the sum key 73 is again released the parts will resume their original position, spring 156 exerting a downward pressure on arm 154 thereby pulling down the piece 39 and lifting type plate 37 until the lug 154' strikes against block 126. Thereupon spring 40 acting against pin 42 in the end of arm 41 forces the lower end of part 39 forward so that pin 42 will rest in the upper part of the angular slot 51 as shown in Fig. 6.

*Cutting out the zeros at the left of the sum.*—Since the mechanism above described operates all the hammers, it will follow that unless provision is made to prevent it, whatever figures are shown on the type wheels in the position A (Fig. 7) will be printed. Therefore should the sum of the additions be, for example, "365," the printing would show "00365" since the thousands and ten thousands type wheels would not have been operated and would, therefore, show "0" in position A. In order to cut out all zeros to the left of the sum, I have provided the following mechanism: Shaft 176 (Figs. 2, 3 and 9) is stationary and extends between the sides of the frame B, B'. Mounted on shaft 176 are a series of hammer stops 177 one for each hammer. A spring 178, one end engaging a rod 178' extending between the sides of said frame, and the other end pressing against the upper arm of stop 177, urges said arm toward the left as viewed in Fig. 3. The stop 177 is provided with a lower arm 177$^A$ which normally abuts against the face 109$^3$ of the hammer and acts as a block to the hammer preventing it from striking a blow or printing either on the type plate 37 or on the type wheels 3, as shown in Fig. 2. If, therefore, before any of the keys on the keyboard have been operated, the sum key is depressed, all the hammers will be operated but the printing stroke of each hammer will be blocked by its stop arm 177$^A$, which will prevent its reaching the types. When, however, any type wheel is operated for adding the hammer in that column will be unblocked as follows: When any key in the unit column is depressed rod 33 swings arm 103 so that the end of rod 33 will engage and lift arm 177$^B$ of stop 177. This will move the stop arm 177$^A$ downward from in front of the face 109$^3$ of the hammer. At the same time the upper arm 177$^D$ will be thrown upward under the lower end of arm 180 which swings on shaft 179, running between the sides B and B' of the frame, lifting said arm so that the end of the upper arm of part 180 will swing away from cam wheel 141. It will be understood that there is a duplicate part 180 for each stop 177 of the machine. A spring 181 between rod 182, which extends from side frame to side frame of the machine, and the lower arm of part 180 normally tends to throw the upper arm of 180 against cam wheel 141, where it normally rests; the lower end of part 180 is normally in contact with arm 177$^C$ of stop 177 as shown in Fig. 2. A lock 184 swings on shaft 183 and works in connection with stop 177. A rod 186 extends between the sides of the frame B and B' and the spring 185 tends to depress the lower arm of lock 184. There is a similar lock for each stop 177. Before the machine has been operated the parts under discussion are in the position shown in Fig. 2. Continuing the movement whereby rod 33 lifts arm 177$^B$ of the stop, the lock 184 will drop down in front of the end of arm 177$^D$ thereby holding the parts in the positions shown in Fig. 5. This will permit the unit hammer 109 to strike its blow for printing and the lock 184 will hold the parts in position shown in Fig. 3 until the machine is reset to "0," whereupon the block will be reset as hereinafter described. Should the sum key be depressed after the operations just described, the sum shown on the type wheel which has been operated would be printed, while the zeros to the left of the sum, showing on the type wheels which have not been operated, would not be printed, since their respective hammers would remain blocked.

For illustration of the manner of unblocking the hammers when a number wheel is moved by the tripping mechanism instead of by a key in its own column, suppose the "9" key of the unit column is operated,— then the unit type wheel 3 will stand with type "9" in position A (Fig. 3), and stop 177, lever 180 and lock 184 of the unit column will be in the positions shown in Fig. 3. The duplicate parts in the tens and other columns will remain in the position shown in Fig. 2. If now the "9" key of the unit column be again depressed, type wheel 3 will show type "8" in position A, and the tens column gear wheel 1' will have been tripped one tooth so that type "1" on wheel 3 in the tens column will be in position A. When gear wheel 1' is tripped one tooth the following movements will occur through the action of spring 181 in the second or tens column: The point of the upper arm of part 180 will drop off the tooth of cam wheel 141 allowing part 180 to swing on its shaft 179 under the influence of spring 181. The end of the lower arm of part 180 will engage arm 177$^C$ of stop 177, swinging the latter on its shaft 176, thus throwing down the stop arm 177$^A$ which will unblock hammer 109 of that column. At the same time lock 184 will lock in front of arm 177$^D$ thus holding the hammer unblocked, and the parts will be in the position shown in Fig. 7, and will so remain until the machine is reset to "0." Thus, although only the unit column of keys has been used, the hammers of both the unit and tens columns will be unblocked. It will be seen therefore that when the type wheel of any column is turned either by the use of a key in that column or by the tripping device for carrying the sum forward to the next higher column, the hammer for that column will be unblocked and remain so until the machine is reset to "0," while the hammers of all the other columns will remain blocked, thus preventing the printing of the zeros in front of the sum.

*Resetting the machine to "0".*—In order to reset the machine to "0" after operating the number wheels and prepare it for a new set of additions, the following mechanism is provided: Key 187 (Fig. 1) is depressed and released, and then crank 188 is turned one revolution in the direction of the hands of a clock. These operations actuate the parts which reset the machine to "0". The depression of key 187 unlocks the mechanism which allows crank 188 to be turned, and the revolution of crank 188 turns all the type wheels to "0" and relocks the machine.

Shaft 189 on which crank 188 is mounted extends from outside of the frame B' through frames B and N. One end rests in and projects slightly beyond the frame B', and the other end extends clear of the frame to accommodate the crank 188. A gear wheel 190 (Figs. 7 and 9) made with twenty teeth (in a decimal system machine such as is being described) is mounted to turn easily on shaft 189 and meshes with gear wheel 1. There is a similar gear wheel 190 for each duplicate gear wheel 1. Pawls 191 and 191' are duplicates and are pivoted directly opposite to each other, to gear wheel 190 by pins 192 and 192'. Springs 194 and 194' press the pawls 191 and 191' against shaft 189. A notch or groove 193 in shaft 189 extends from side frame B to side frame B'. When at rest and before the machine has been operated the parts under discussion are in the positions shown in Fig. 2. Pawl 191' rests in notch 193 and all the duplicate parts are in the same position, all the type wheels standing at "0". If key 187 be now depressed and released and crank 188 then turned one revolution, shaft 189 will also be turned one revolution and gear wheels 190 will also be turned one revolution by means of the pawl 191', which engages notch 193, and gear wheels 1 will be turned twenty teeth, thus turning type wheels 3 two revolutions, which leaves "0" types in position A as in the beginning. Now suppose the "5" key of the keyboard in the unit column is depressed; gear wheel 1 will turn five teeth carrying type "5" of type wheel 3 into position A, and turning gear wheel 190 five teeth which is one-fourth of a revolution. The turning of gear wheel 190 carries pawl 191' out of notch 193 since shaft 189 is stationary. If key 187 is depressed under these conditions and the shaft 189 thereafter turned one revolution, it will be seen that at the end of the first quarter of the revolution of shaft 189, notch 193 will engage pawl 191'. In the meantime shaft 189 will have turned all the other type wheels so that, when it picks up pawl 191' all the type wheels will be in alinement and will show "5" in position A, and the remainder of the revolution of the shaft 189 will carry all the type wheels together to "0" position. A similar operation will occur with respect to any of the other type wheels in the other columns which have been turned out of "0" position, one or the other of pawls 191 or 191' being picked up during the rotation of shaft 189. The depression of the key 187 unlocks the mechanism and permits the turning of crank 188 in the following manner: Fastened solidly to shaft 189 is the part 197 (Figs. 6 and 8) between the sides N and B of the frame. A part 198 is also fastened solidly to shaft 189 between frame members N and B, and a stud projects from the inside of frame N, to which is pivoted latch 200 normally urged upward by spring 201. A stop pin 201' serves both to hold one end of the spring and also to limit the upward movement of latch 200. Mounted on stud 202 on the inside of frame N is part 203 which is in the same plane with part 197. A pin 225 on the inside of frame N limits the upward movement of part 203 which is pulled upward by spring 204. Part 207 swings on a stud 206 and is provided with a pin 209 which is connected by rod 208 with a pin 210 on part 203. A pin 205 projecting from the edge of part 207 engages the end of spring 204. A shaft 226 runs from the side of frame B' in which one end rests, through side frame B into side frame N, in which the other end rests. Solidly fastened to shaft 226 is the part 214 in line with part 207. Part 214 is provided with an arm 214^A having an enlarged end, the face of which is in the arc of a circle drawn from the center of shaft 226. A bar 228 (Fig. 7) is fastened solidly to shaft 226 and extends from a point close to side frame B' across the tails of all the latches 18, 18' etc. Finger 227 is also fastened solidly to shaft 226 between part 228 and the side B of the frame (Figs. 1 and 7). Shaft 211 (Figs. 6 and 8) extends from the side of frame B, in which one end is journaled, through the side of frame N. The key arm 187' is fastended solidly to the end of shaft 211 just outside of the frame N. Arm 212, fastened solidly to shaft 211 between the frame members B and N, is provided with a pin 213 with which the arm 214^B of part 214 engages (see Figs. 1, 6 and 8). Shaft 223 extends from side frame B' through side frame B into side frame N and turns in said frames. (Figs. 1, 6, 7, 8 and 9). Fastened solidly to shaft 223 between the frames B and N is the arm 224. Part 221 is mounted on stud 220 and is in the same plane with arm 224, and part 198. A spring 222 urges the upper arm of part 221 against the bent end of arm 224. A finger 231 (Figs. 7 and 9) is fastened solidly to shaft 223 just inside of frame B, and close beside the finger 231 is fastened solidly on shaft 223 the crooked arm 230. A comb 232, also solidly fastened to shaft 223, extends over all the gear wheels 1. A tooth of this comb 232 projects under pin 146 on pawl 145. Comb 232 has one tooth to work each pawl of the machine corresponding to pawl 145. When shaft 223 is rotated counter-clockwise the teeth of comb 232 lift all the pawls 145 free of the teeth of gear wheels 1, at the same time lifting arm 224.

236 is a shaft running between the sides B and B' and turning therein. Fastened solidly thereto is finger 237 in line with finger 231. A comb 238 is fastened solidly to shaft 236 and extends under all the parts 144. That portion of comb 238 which projects from shaft 236 under the parts 144 is solid. The teeth turn upward at right angles to the solid part, parts 144 playing between the teeth. These teeth act as guides for parts 144. When shaft 236 is rotated in the direction of the hands of a clock the solid part of comb 238 lifts all of the parts 144 so that they cannot operate on the parts 21, 21' etc. A spring 234 connects the arm 230 with stud 233 on the inside of the frame B, and a spring 235 connects the stud 233 with a projection on finger 237.

When the machine is at rest and before it has been operated the parts under discussion are in the positions shown in Figs. 6 and 7; that is, the nose of part 203 engages the top of arm 197 preventing movement thereof toward the right, and latch 200 prevents movement of part 197 in the opposite direction; thus arm 197 and shaft 189 are locked immovably in place. Arm 207$^B$ of part 207 rests against the curved face 214$^A$ of part 214 holding parts 207, and consequently part 203, firmly in place. Pin 213 rests against part 214$^B$. When the resetting key 187 and the resetting key lever 187' is depressed it turns shaft 211 which carries with it arm 212 thus pressing down 214$^B$ and swinging arm 214$^A$ upward until arm 207$^B$, actuated by spring 204, drops underneath arm 214$^A$ as shown in Fig. 8. The part 203 is therefore lifted by link 208 unlocking the arm 197 and permitting shaft 189 to be turned. The movement of parts 203 and 207 is limited by pin 225. An arm 207$^B$ holds part 214 in place so that when the key arm 187' is released and returns to its original position by the action of spring 215 stretched between pin 216 and arm 212, it does not affect the parts which it has actuated. The rotation of shaft 226 as just described moves the bar 228 downward depressing the tail parts of all the latches 18, 18' etc. thereby lifting said latches out of the teeth of gear wheels 1, 1' etc. as shown in Fig. 9. All of said gear wheels are therefore unlocked and can be operated by the gears 190. Shaft 226 also carries with it finger 227 which, being in engagement with the hooked end of the arm 230, depresses the latter and rocks shaft 223. The movement of shaft 223 lifts comb 232 thereby lifting all the pawls 145 out of engagement with the gear wheels 1, 1', etc. At the same time the rotation of shaft 223 swings finger 231 against finger 237 thereby turning the shaft 226. This causes the comb 238 to lift the parts 144 so that they will not operate the parts corresponding with 21. On releasing the key 187 the key lever 187', arm 212 and shaft 211 all resume their original positions; the other parts remain set as described and locked by parts 214 and 207. If under these conditions crank 188 (Fig. 1) is turned thereby turning shaft 189, the arm 198 which engages the lower end of part 221 will release the same allowing the upper arm of part 221 to swing under the bent end of arm 224 as shown in Fig. 8. During the first half of its revolution shaft 189 will pick up all of the gear wheels 190 as previously described and at the end of its movement leave all of the type wheels set at "0". Figs. 8 and 9 show the parts in the position assumed when shaft 189 has been turned somewhat more than half of a revolution. As part 197 swings around with shaft 189 the forward part thereof passes underneath and past the tail end of part 203. The rear part of 197 strikes and lifts the tail end of part 203 thereby depressing the nose part of 203 into its original position to stop and hold part 197. At the same time the head of part 197 depresses latch 200. When the nose of part 203 is depressed it causes part 207 also to swing on its pivot so as to withdraw the arm 207$^B$ from underneath arm 214$^A$ thereby allowing spring 217 to restore the part 214 to its original position. Shaft 226 carrying parts 227 and 228 (Fig. 9) also assumes its original position together with part 214 thus allowing all the latches 18, 18', etc., to drop into engagement with their respective gear wheels 1, 1', etc. It will be seen that part 214 is released just before part 197 strikes the nose of part 203 so that the various parts fall into their initial positions in the following sequence: First latches 18, 18', etc., drop into place. At this moment the bent arm 224 is resting on part 221 as shown in Fig. 8 which prevents shaft 223 from turning and shaft 223 holds the combs 232 and 238 in position. As latches 18, 18', etc., drop into place in the gear wheels 1, 1', etc., parts 142 drop off the ends of cam teeth 141, and parts 144 fly forward but are checked by combs 232 and 238 so as not to operate parts 21 or gear wheels 1. Thereupon part 198 strikes the lower arm of part 221, releasing the bent arm 224, which allows the parts 144 and pawls 145 to drop into place. Simultaneously with the release of arms 224 part 197 strikes the nose of part 203 and latch 200 snaps into place. The machine is now reset to "0", there locked, and ready for another operation.

The revolution of shaft 189 to reset the machine to "0" as just described also resets the blocks which prevent the hammers from reaching the types. The mechanism for accomplishing this is as follows: In Fig. 7 the hammer stopping lever 177 and the parts 180 and 184 are in the positions in which they are left after the column in which they operate has been tripped one tooth, and in Fig. 3 said parts are in the positions shown after the column has been actuated directly by a key.

196 (Fig. 6) is a cam fastened solidly to shaft 189 just outside of frame B. A similar cam is provided just outside of frame B'. The two cams are identical and work in unison and it will be sufficient to describe one of them. A bell crank lever 195 is mounted on the end of shaft 179 just outside of the frame B and in line with the cam 196. A duplicate of part 195 is secured in like manner to the other end of shaft 179 and is operated by the duplicate cam 196. These levers 195 are connected by rods 239 and 240 which pass through slots in the side frames B and B'. Rod 239 as shown in Fig. 7 passes across all of the parts 180, and rod 240 as shown in Fig. 7 passes across all of the parts 184. When the machine is at rest and before it has been operated the parts under discussion are in the position shown in Figs. 6 and 7 with the upper end of bell crank lever 195 resting on cam 196. When the shaft 189 is rotated cam 196 moves the upper end of the lever 195 thereby swinging rod 239 forward and the rod 240 backward as shown in Figs. 8 and 9. Rod 240 lifts all the latches corresponding to latch 184, and rod 239 swings all of the parts 180 to the position shown in Fig. 9, thereby allowing springs 178 (Figs. 7 and 9) to swing the stop levers 177 back into position where the arm 177$^A$ blocks the hammers 109. The cam 196 is so shaped that it will not operate the end of lever 195 until all the cam wheels 141 have been brought into alinement, and thereafter it will move levers 195 so that the upper arms of parts 180 will not hit the teeth of cam wheels 141. The latter part of the revolution of cam 196 lowers the end of the upper arm of levers 195, and brings all the parts back to their original positions with the upper ends of parts 180 against the teeth of cam wheels 141, and latches 184 resting on arms 177$^D$ of the stop levers 177 as shown in Fig. 2.

*The paper carriers and their operating mechanism.*—The machine is provided with two removable paper carriers one for carrying sheets of paper of any convenient size, and the other for carrying a roll of narrow paper such as is used for bank slips. The carrier for the individual sheets of paper may be of any desired length within reasonable limits and may be readily and easily put into or removed from the machine. It may be operated automatically to slide in the machine lengthwise so as to print a row of figures horizontally across the paper, the sum to be printed at the right hand end, or it may be held stationary against endwise movement and the paper turned upward so as to print the numbers in a vertical column with the sum at the bottom, or the two movements may be combined so as to print the figures in a diagonal row from an upper left hand to a lower right hand part of the paper with the sum in the same diagonal row. It is also possible with this paper carrier to print subtotals at any desired intervals along the row of figures, either in the same row or offset therefrom. I have made provision further so that the machine will print in three colors whereby the main row of figures to be added may be in one color, the subtotals in another color and the final sum in still another color. From the foregoing it will be seen that it is possible to perform various kinds of tabulations upon the machine. Provision is made for slipping this paper carrier out of the machine by simply pressing a button, after which it may be replaced by the other carrier for a roll of narrow paper. For convenience, the former carrier will be termed the large paper carrier and the latter the small paper carrier. The small paper carrier is designed to receive the figures in a vertical column with the addition at the bottom on narrow strips which may be drawn from the roll and torn off in whatever lengths desired.

*The larger paper carrier.*—Referring first to the large paper carrier, Figs. 18, 19, 20 and 21 illustrate various views of the carrier, and Figs. 1, 2, 10 and 12 show the carrier in the machine. The paper carrier frame is made up of the end pieces 241 and 241$^A$ connected by the side bars 242 and 242$^A$ which form tracks on which the paper carrier runs as hereinafter described. A rack 243 is also fastened to the end pieces at the bottom of the paper carrier to form the base of the carrier. A hollow cylinder 244 is held between the end pieces 241 and 241$^A$ and is provided with the cylinder heads 244$^A$ and 244$^B$ which are mounted to rotate respectively in the end pieces 241 and 241$^A$. Collars 244$^D$ and 244$^C$, the latter made with a milled head, are secured to the ends of the said cylinder heads outside of the end pieces of the carrier frame and prevent endwise movement of the cylinder in the carrier frame. A brace 273 in the form of a semicircular rib is fastened to the tracks 242 and 242$^A$ and to the rack 243 for stiffening the frame. There may be as many such braces used as desired. Within the hollow cylinder 244 is a rod 245 mounted at its ends to turn within the cylinder heads. A clip 246 is fastened solidly to rod 245 and protrudes through a slot in the cylinder 244. The part of the clip outside of the cylinder conforms to the curve of the cylinder and presses against the outer surface thereof as shown in Fig. 21. There are a number of such clips arranged at intervals along the cylinder. When rod 245 is rotated clockwise viewed from the left hand end of Fig. 18, clips 246 will be turned away from the surface of cylinder 244, and when rod 245 is turned back again, clips 246 will pinch against the surface of cylinder 244. Rod 245 is turned by part 247 fastened solidly thereto (Figs. 18 and 21) which is operated by part 248 on the end of rod 248$^A$ which extends through the cylinder head. Rod 248$^A$ is provided, outside of the cylinder head and outside of the milled head 244$^C$, with a small lever 251. (Figs. 10, 18 and 19). Springs 249 and 250 contained within the cylinder coöperate with part 247 so as to yieldingly hold the clips 246 in their extreme position to which they may be thrown by lever 251, namely, either pinched against the cylinder or thrown clear of the cylinder. The cylinder 244 may be rotated by the milled head 244$^C$. The neck of the head 244$^C$ is provided with a notch 244$^E$ (Fig. 19) with which a projection on part 252 engages. Part 252 is pivotally fastened to the outside of the end piece 241 of the frame, and is yieldingly held by a spring 253 either in the retracted position shown in Fig. 19 or in operative position shown by dotted lines in Fig. 19. When in the latter position the tooth projecting from lever 252 engages the notch 244$^E$ in the head 244$^C$ thus holding the cylinder stationary. The purpose of holding the cylinder stationary is to facilitate inserting the paper.

257 represents a small roller extending between and turning in the end pieces 241 and 241$^A$ of the frame. The ends of roller 257 project beyond said end pieces (Figs. 1, 12, 19 and 21). A milled head 257$^B$ is fastened solidly to one end of the shaft 257, and the milled head 257$^C$ to the other end of said shaft (Figs. 10 and 19). These two heads are used to rotate the shaft and also prevent any movement thereof lengthwise. A ratchet wheel 258 (Figs. 21 and 12) is fastened to shaft 257 just inside of the end piece 241 and a similar ratchet wheel 258$^A$ is fastened just inside of end piece 241$^A$. At intervals along shaft 257 are sections of rubber tubing 257$^A$ (Fig. 1). Engaging the ratchet 258$^A$ is a drag pawl 267 (Fig. 12) mounted on the end piece 241$^A$. A spring 268 presses pawl 267 against the ratchet wheel. Pawl 261 pivoted to the upper end of arm 260 by screw 262 moves the ratchet wheel 258 step by step (Fig. 21). The arm 260 is pivoted to the end piece of the frame by a screw 266. A spring 263 fastened to arm 260 by screw 264 presses pawl 261 against the ratchet wheel, the other end of said spring resting on pin 265. Projecting from the upper end of arm 260 is a pin 274 which limits the upward movement of pawl 261. A similar arm 260$^A$ (Fig. 12) is provided at the opposite end of the carrier and operates pawl 261$^A$ which engages ratchet wheel 258$^A$. At the bottom of the paper carrier, shaft 259 (Figs. 12, 18 and 21) extends between the lower ends of arms 260 and 260$^A$. It will be seen that by swinging shaft 259, hung on the supporting arms 260 and 260$^A$, the pawls 261 and 261$^A$ will operate the ratchet wheels and turn shaft 258. Shaft 254 is mounted to turn in the end pieces 241 and 241$^A$ (Figs. 10, 12, 18 19 and 21) and is provided with arms 255 and 255$^A$ fastened thereto just inside of the end pieces 241 and 241$^A$. Shaft 256 extends between and turns easily in the upper ends of the arms 255 and 255$^A$. At intervals along shaft 256 are sections of rubber tubing 256$^A$ similar to and working with the sections of tubing on shaft 257. Shaft 256 and its rubber rollers is yieldingly pressed against shaft 257 and its rubber rollers by a pin 270 which passes through the end piece 241 and is provided with a rounded head which presses against the back of arm 255. A spring 269 fastened to the outside of end piece 241 presses pin 270 inward. A similar pin 270$^A$ and spring 269$^A$ are provided in the end piece 241$^A$, and press against the back of arm 255$^A$. When arms 255 and 255$^A$ are thrown back into the position shown in dotted lines in Fig. 21, the rounded pins 270 and 270$^A$ press against the other side of said arms holding them in the last named position, and thereby holding open the rollers 256 and 257. A pin 272 projects from the lower part of end piece 241, and a pin 275 projects from the track 241. 276 is an adjustable and removable block which slides on part 242, and 277 is a thumb screw in said block by which it may be secured at the desired point of adjustment.

To place the paper in the paper carrier, the lever 252 is thrown downward to dotted line position (Fig. 19) and the cylinder 244 is revolved by means of the milled head 244$^C$ until the tooth of the lever 252 drops into the notch 244$^E$. The clips 246 (Figs. 18 and 21) are then opened by means of the lever 251. The roller 256 is then thrown away from the roller 257 into dotted line position shown in Fig. 21. The paper is then inserted between the rollers 256 and 257 with its edge resting on the open clips 246 between the clips and the cylinder. The clips are then snapped into place so as to pinch the edge of the paper against the cylinder, the latch 252 is lifted, and the milled head 244$^C$ turned so as to roll the paper up on the cylinder 244. Roller 256 is then thrown back so as to clamp the paper between the rubber surfaces of rollers 256 and 257. If under these conditions shaft 259 is oscillated, roller 257 will be turned to feed the paper upward the space of one tooth each time the shaft is oscillated. Should it be desired to draw the paper up without using shaft 259, this may be done by manually turning the milled heads 257$^B$ or 257$^C$ (Figs. 10 and 19) at the ends of the roller 257. Should it be desired to roll the paper back again upon the cylinder 244, this may be done by turning the milled head 244$^C$. The paper may be removed from the carrier by merely pulling it outward from the top. Thus, the paper may be inserted into or removed from the paper carrier, whether the carrier is in or out of the machine.

*Mechanism for operating the large paper carrier in the machine.*—Standards 278 and 279 (Figs. 1, 10 and 12) rise from the bed plate of the machine and each has two branching arms, 278$^A$ and 278$^B$, and 279$^A$ and 279$^B$. A side bar 280 extends between and is fastened to arms 278$^A$ and 279$^A$. The side bar 280 is provided with two sets of rollers P as shown. Side bar 281 (Figs. 1 and 22) is a duplicate of side bar 280 and is secured opposite thereto on arms 278$^B$ and 279$^B$. It is provided with similar sets of rollers P'. The paper carrier is inserted within the holder thus provided by placing the ends of the rails 242 and 242$^A$ of the paper carrier between the rollers P, P, and P', P', respectively at the right hand side of the machine viewed in Fig. 10, and then sliding the carrier into the holder, the bars 242 and 242$^A$ running upon and between the rollers as shown in Figs. 1, 2, 10 and 12.

A standard 282 consisting of a front plate and a back plate, as best shown in Fig. 12, rises from the bed plate of the machine and carries between its two parts a drum 285 pivoted on shaft 286. Drum 285 is made hollow and contains a coil spring (not shown) which tends to rotate it in a clockwise direction as viewed in Fig. 10. The left hand plate of the standard 282 as viewed in Fig. 12 extends upward only far enough to support shaft 286. The other plate of standard 282 has an arm extending above shaft 286 as clearly shown in Figs. 10 and 12 and carries at the top a stud 283' which extends across the face of the drum 285. A roller 283 turns on said stud 283'. An angular plate 284 is also fastened to this extension of standard 282, one arm of which extends across the face of drum 285, and forked branches 284$^A$ extend from said arm over roller 283. Around drum 285 is wound a metal tape 287 one end of which is fastened to the drum and the other end of which is provided with a catch 288 (Figs. 10 and 20). When the paper carrier is not in the machine the tape 287 will be wound up on drum 285 until the catch 288 is caught between the roller 283 and the horizontal arm of plate 284 and between the forks 284$^A$, projecting from the horizontal arm, as shown in Fig. 20. The upturned end of catch 288 is provided with a hole to engage the projecting pin 272 on the end piece 241 of the paper carrier.

When the paper carrier is inserted in the machine as described, the pin 272 will enter the hole in catch 288, and as the carrier slides into its support will unwind tape 287 from drum 285. The coil spring in drum 285 normally tends to slide the paper carrier back out of the machine. A shaft 289 extends between and turns in the frame members B and S (Figs. 10, 11, 12). Arms 290 and 291 are fastened solidly to the shaft 289 and extend upward between and close to the frames S and B. Rods 293 and 294 connect the upper ends of said arms and carry a slide 295 mounted thereon. A spring 296 connected at one end to slide 295 by pin 297, and at the other end to arm 290 by pin 298, tends to throw slide 295 in the direction of arm 291. A pawl 299 pivoted to arm 290 by a screw 299' engages the teeth on the rack 243 of the paper carrier (Fig. 10), and is provided with a downwardly extending arm 299$^A$ to which is attached one end of spring 300, the other end of which is attached to arm 291, thus normally urging the pawl 299 against the rack 243. Shaft 289 is rocked by a lever 292 fastened solidly thereto. When lever 292 is lifted the arms 290 and 291 and all parts carried thereby will be swung to the right as viewed in Fig. 12. Hereafter the shaft 289, arms 290 and 291, and rods 293 and 294 will collectively be referred to as the rocker R. A worm screw 304 extends between side frames B and S in which it is mounted to turn, the left hand end as viewed in Fig. 10 projecting through frame S. A small gear wheel 305 is secured to the end of worm 304. Block 311 interiorly threaded is mounted on worm 304 and is provided with a forked arm 311$^A$ between the branches of which passes rod 293 which prevents the block from turning. Arm 311$^A$ acts as a stop for the block 295 as the latter slides toward arm 291, and the spring 296 normally holds slide 295 in engagement with arm 311$^A$ of block 311. It will be seen that block 311 is adjustable in either direction by turning the worm screw 304. Pawl 299 (Fig. 10) acts as a drag pawl on rack 243; the arm 299$^A$ of said pawl is rearwardly bent (as best shown in Fig. 12) into the path of rod 301 which passes through sleeve 303, and is provided at its outer end with a head 301$^A$, the spring 302 normally tending to thrust the rod 301 outward away from arm 299$^A$. A collar 301$^B$ is fastened to rod 301 and limits its outward movement. When the paper carrier is pushed into the machine rack 243 runs over pawl 299 which engages the teeth of the rack at any desired point to prevent the spring in drum 285 from drawing the paper carriage back. By pressing the head 301ᴬ, rod 301 acting against arm 299ᴬ will swing the pawl 299 away from the rack 243 and allow the paper carrier to be retracted the distance desired or to be removed from the machine.

The upper side of slide 295 is provided with a tooth shaped to fit the rack 243 (Fig. 10). It will be seen that the tooth on slide 295 and the pawl 299 are offset from each other (see Figs. 10 and 12) so that they will engage the rack one at a time.

Block 311 is so set that the tooth on slide 295 is in advance of pawl 299 the distance of at least one tooth of rack 243. Pawl 299 normally engages said rack while the tooth on 295 is normally out of engagement with the rack. If, now, lever 292 is raised the rocker R will carry pawl 299 out of the rack and simultaneously carry the tooth on slide 295 into engagement with the rack. The instant pawl 299 leaves the rack the spring in drum 285 will move the paper carriage (overcoming spring 296) until slide 295 strikes against arm 290 which will be the distance of one tooth of rack 243, when the parts are set as shown in Fig. 10. If lever 292 be now released the rocker R will spring back again moving tooth on 295 out of engagement and pawl 299 into engagement with the teeth of the rack, whereupon spring 296 will again throw the slide 295 back again against block 311. Thus the paper carrier will have been shifted one space and the mechanism reset ready to repeat the operation.

If worm screw 304 be turned so as to move block 311 toward arm 291 a distance corresponding with a larger number of teeth on the rack, the slide 295 will move a corresponding distance in the same direction, whereupon by repeating the operation already described, the paper carrier will automatically move the distance corresponding to the adjusted position of the slide 295. The distance between the faces of the teeth on rack 243 corresponds with the distance on centers between the type wheels 3 and also between the columns on the type plate 37. By appropriately adjusting the stop 295 the paper carriage may be made automatically to travel any number of spaces from 1 to 9. The worm screw 304 is operated to its desired position by means of the large gear wheel 306 which meshes with gear wheel 305 and is mounted to turn on a stud projecting from frame S.

An indicator rim 307 (Figs. 11 and 17) is fastened to the outer side of gear wheel 306 and provided on its periphery with ten notches numbered consecutively as best shown in Fig. 17. Pawl 309 pivoted on screw 309ᴬ to the frame S, and normally pressed downward by a spring 310, engages the notches of rim 307. A block 312 fastened to frame S acts as a stop, by engaging pin 313 projecting from the inside of gear wheel 306. A milled head 308 (Figs. 11 and 17) is provided for manually turning the gear wheel 306. When pawl 309 rests in the notch marked "S" in the periphery of the rim 307 as shown in Fig. 17 the tooth on slide 295 will be in the position shown in Fig. 10 and the operation of the spacer key hereafter described will move the paper carrier one space, or the distance of one tooth of the rack. If the milled head 308 be turned so that pawl 307 rests in notch number "1" on the rim 307 then block 311 will be moved so that the tooth on slide 295 will engage the second tooth of the rack from pawl 299; and so on as pawl 309 drops into the successive notches on rim 307. When pawl 309 rests in notch number "9" on the rim, pin 313 will strike against the block 312 and prevent the further movement of the block in that direction. By this mechanism it is possible to tabulate the figures to be added in columns and to space the columns apart from each other the distance desired.

Referring to Figs. 18 and 19 a pin 275 projecting from the track 242 limits the distance that the paper carrier may be pushed into the machine by striking against the end of the side 281 (Fig. 1). A block 276 provided with an adjusting screw 277 slides on track 242 and acts as an adjustable stop for the paper carrier. On the side of track 242 toward the keyboard is marked a scale (not shown). A pointer 281' (Figs. 1 and 22) on the side 281 is provided, by observing which the paper carrier may be set to any desired position. If it be desired to set the paper carrier repeatedly to a certain position, block 276 may be fastened to track 242 at the desired point to stop the paper carrier at that point instead of using the scale and pointer. The movement of the paper carrier in response to the depression of the spacing key is so rapid that ordinarily it will not be possible to release it and cause the rocker to fly back until the action is completed. In order to prevent the possibility however of the spacing key being released before the paper carrier has traveled its full distance, thus permitting the rocker R to fly back throwing the tooth 295 out of mesh and pawl 299 into mesh with the rack, thus arresting the carrier before it has traveled its full distance, I have provided an automatic lock (Figs. 10, 11 and 12). In the top of arm 290 is a notch 290ᴬ. A headed pin 337 (Fig. 11) passes through the top of arm 290 with its head resting in notch 290ᴬ, the other end projecting beyond the face of arm 290. If pin 337 is pushed inward until its end is flush with the face of arm 290, the head of pin 337 will touch but not press against the side of the frame B. A headed pin 335 passes through the frame B, it inner end resting against arm 290 and its outer end pressed by spring 336. When the rocker R is swung over by the depression of the spacing key, pin 335 will drop into notch 290 thus preventing the rocker from swinging back again. The end of pin 335 will strike against the head of pin 337 forcing the latter outward. In the meantime pawl 299 will have been thrown out of mesh and tooth on 295 into mesh with the rack, and the paper carrier will move the slide 295 toward arm 290. When slide 295 approaches arm 290 it will drive pin 337 inward, thus moving the pin 335 out of the notch and so releasing or unlocking the rocker. Thus it will be seen that when the rocker is swung over by the operation of the spacing key it will be held in that position until it is released by the paper carrier at the end of its travel. It will also be seen that if the spacing key be depressed when the paper carrier is not in the machine the rocker R will be thrown over and locked and it would be expected that the paper carrier could not be put into the machine since the teeth of rack 243 would strike against the tooth of slide 295. To prevent this latter result I have made the following provision: It will be seen (Figs. 12 and 21) that only about half of the face of the rack 243 is provided with teeth, the other half being plain or smooth. A latch 333 is fastened to the inside of frame B by a screw 334, and pressed upward by a spring 338 secured to the frame by screw 338ᴬ. Pin 338ᴮ engages the other end of the spring 338. When the paper carrier is in the machine the end of latch 333 rests against the plane body of rack 243 as shown in Fig. 12. At all times when the spacing key is not depressed the rocker R is in the position shown in Fig. 11, and the pin 335 is thrown backward with its head clear of the frame B. When the paper carrier is moved out of the machine, as the last tooth of the rack passes over pawl 299 the nose of latch 333 drops off the end of the plane body of the rack 243 thus allowing latch 333 to fly upward. The latch 333 is shaped so as to fit between the head of the pin 335 (Fig. 11) and the side of frame B thus holding pin 335 from dropping into the notch 290ᴬ to lock the rocker. If the spacing key be now depressed the rocker R will simply swing back and forth as the key is depressed and released, without locking the same, and when the paper carrier is again slid into the machine the plain body of the rack 243 again depresses latch 333 and pin 335 is again permitted to act.

As already stated, the rocker R is actuated by lever 292. The mechanism for operating lever 292 is as follows: Directly underneath shaft 60 at the front of the keyboard (Figs. 1 and 12) is a short shaft 341 extending between the frame B and an upright standard mounted on the bed plate of the machine. A gear segment 340 is solidly fastened to shaft 341 and is operated by the key shaft 339 made with a rack engaging the gear segment as best shown in Fig. 12 and having the spacing key 339ᴬ at its top. An arm 342 secured to shaft 341 is pivoted at 343 to rod 320, which rod is also pivoted at 322 to the arm 321 which swings on shaft 323, the ends of which are mounted to turn in the sides of frame D and D'. The arm 321 slides on shaft 323. In the end of rod 320 are the pins 318 and 319, the former extending in the direction of the side frame D' and the latter projecting in the direction of the side frame D. Rod 325 (Fig. 11) slides in sleeve 326 which is fastened solidly to the frame D and is provided with a slot 326ᴬ. An indicator 327 fastened to rod 325 projects through slot 326ᴬ and shows through the sleeve as seen in Fig. 1. Said rod is provided with a head 325ᴬ. A block 324 is fastened to the inner end of rod 325 and made with a double fork, two tines of which embrace shaft 323 at one side of block 321, and the other two tines of which embrace said shaft at the other side of the block 321. Thus the movement of block 324 controls the lateral movement of the block 321 on shaft 323. Mounted on the bed plate of the machine is a standard 314 (Figs. 10, 12 and 15) to which part 316 is pivoted at 315. A pin 317 projects from the lower arm of part 316 and passes between the tines of the forked end of lever 292. If the rod 325 is pushed inward by its head the indicator 327 will point to "S" to indicate that the operation of the spacing key will cause the paper carrier to move sidewise. The inward movement of rod 325 will slide block 324 along shaft 323 so that the pin 318 on rod 320 will be in line with the end of the upper arm of part 316. If the spacing key 339ᴬ be depressed with the parts in this position, pin 318 on rod 320 will draw back the upper arm of part 316, the lower arm of which will lift the lever 292 thereby swinging the cradle H and operating the paper carrier as already described.

To turn the paper up in the paper carrier instead of shifting the paper carrier sidewise the following mechanism is brought into play: Sleeves 329ᴬ and 329ᴮ (Fig. 11) are fastened to the sides of frame B and B', the shaft 329 extending therethrough. An arm 328 is fastened solidly to the end of shaft 329, and another arm 330 is similarly fastened to the shaft close to the sleeve 329ᴬ. Arm 330ᴬ is a duplicate of 330 secured to the shaft 329 close to the sleeve 329ᴮ. The end of arm 330 is slotted and engages a pin 331' (see Fig. 12) which projects from the lower arm of part 331 pivoted at 332, to the side frame B. Secured to the side frame B' in line with the pivoted screw 332 is a stud 344. Part 331ᴬ is a duplicate of part 331 and is pivoted to the end of a stud 344 by a screw 345. Pin 331ᴬ' projects from the lower part of 331ᴬ through a slot in the end of arm 330ᴬ. A coil spring 346 secured at one end to pin 348 on stud 344, and at the other end to pin 347 on part 331ᴬ, tends to throw the lower arm of part 331ᴬ upward, which rotates shaft 329 and carries parts 330 and 331 in the same direction. When the paper carrier is pushed into the machine the shaft 259 thereon, passes over and close to the upper arms of parts 331 and 331ᴬ. Suppose now the rod 325 to be pulled outward so that the indicator will point to "U" indicating that the spacing is to be upward; block 324 will move block 321 along shaft 323 thus swinging rod 320 sidewise until pin 318 is disengaged from part 316, and pin 319 is thrown into line with arm 328. If the spacing key 339ᴬ be now depressed, pin 319 will draw back arm 328 thereby rocking the shaft 329 and swing arms 330 and 330ᴬ downward, carrying with them the lower arms of parts 331 and 331ᴬ, which will swing their upper parts upward thereby lifting shaft 259 to the paper carrier and feeding the paper upward as already described.

*The signal bell.*—Mounted on shaft 254 of the paper carrier is a slide 432 provided with a pin (Figs. 10, 18 and 18ᴬ). A bell 433 is secured to side piece 280, to which is also secured a plate 434. Block 435 is pivoted by screw 436 to plate 434. From the upper end of part 435 is the arm 438' provided at its end with the hammer 438.

435' is a horizontal arm projecting from plate 434 and provided with a latch 439. A pin 434ᴬ projects from the lower part of plate 434 engaging the lower end of block 435, and a spring 437 tends to throw arm 435' downward. When during the movement of the paper carrier by drum 285 the pin on 432 strikes latch 439 the arm 435' will be lifted, thereby lifting also the hammer 438. When the latch 439 drops off said pin the hammer 438 will fall and strike the bell, the arm 438' being sufficiently resilient to allow the hammer 438 to fly past its normal position which is out of contact with the bell. The part 432 is made to slide on shaft 254 so that it may be set to ring the bell at any desired point in the travel of the paper carrier. The latch 439 is made to swing freely to the left as viewed in Fig. 10 so that when the paper carrier is pushed into the machine, the latch rides over the pin on 432 without operating the hammer.

*The small paper carrier.*—The paper carrier for the narrow strip of paper is illustrated in Figs. 29 to 33 inclusive. The frame is made up of end plates 480 and 481 connected by the side rails 482 and 483. These side rails project beyond the end plates 480 and 481 as shown in the drawings. Shaft 484 extends from end plate 481 through end plate 480 and through a collar 513, and is provided at its end with a milled head 484ᴮ. A ratchet wheel 485 is secured to shaft 484 close to end plate 481, and a similar ratchet wheel 486 is similarly mounted close to the plate 480. A rubber tubing 484ᴬ affords a frictional covering for the shaft 484. Lever 487 (Fig. 30) is a duplicate of lever 260 shown in Fig. 21 and is fastened to end plate 481 by screw 488 on which it swings. Pawl 489 pivoted to the upper end of lever 487 is urged by spring 492, held under compression by pins 493 and 494, into engagement with ratchet 485. A pin 491 limits the upward movement of the pawl 489, and pin 495 on the end plate 481 limits the movement of lever 487. When the lower arm of lever 487 is drawn backward it will cause the pawl and ratchet to turn shaft 484, the upper end of lever 487 striking a tooth of the ratchet wheel and thereby limiting the movement of the pawl and of the ratchet wheel. A pawl 524 (Fig. 33) pivoted to end plate 480 by screw 524ᴬ acts as a drag pawl on ratchet wheel 486 preventing the accidental movement of shaft 484. Pawl 524 is normally pressed upward by the spring 525 held under compression by pins 526 and 527. Arm 498 (Fig. 33) is pivoted to side plate 480 by screw 499, and rod 500 extends between arm 498 and lever 487. Shaft 501 extends between and is mounted to turn in end plates 480 and 481, and carries a pair of arms 502 and 503 solidly fastened thereto just inside of the end plates. Connecting the upper ends of arms 502 and 503 is a shaft 504, the ends of which are journaled in the arms. 504ᴬ represents a section of rubber tubing on shaft 504. Working in the end plates 480 and 481 are the round ended pins 507 and 506 (Fig. 29) against which the springs 507ᴬ supported by screw 507ᴮ, and 506ᴬ supported by screw 506ᴮ, respectively, press. The pins 506 and 507 normally press on the outer edges of arms 503 and 502 so as to urge the rubber rollers together as shown in Fig. 29. When arms 502 and 503 are thrown back as shown in dotted lines in Fig. 33, said pins normally hold them in that position by pressing against their inner faces.

A paper guide 508 made of thin metal such as tin is supported by the carrier as shown in Figs. 29, 31 and 32. The intake end of the paper guide is made flaring as best shown in Figs. 29 and 32 and the body of the guide is made with a pair of inturned flanges for holding and guiding the paper strip. Braces 509, 510, 511 and 512 support the end of the paper guide on the rails 482 and 483 and also support the collar 513.

The paper guide passes through end plate 480 and is turned upward between end plates 480 and 481 as best shown in Fig. 31 so as to feed the paper between the rollers 484$^A$ and 504$^A$.

To the outer end of rail 483 is solidly fastened block 514, which strikes against the arm 278$^B$ of the standard 278 and acts as a stop for the paper carrier when pushed into the machine. A headed pin 515 supported in a cavity in block 514 is normally pressed by spring 516 through the end of block 514. The spring is held within the block by plug 517. A headed pin 520 passes through arm 278$^B$ and side piece 281, the hole in the latter being countersunk to receive the head of the pin. A button 521 is secured to the end of pin 520. A headed pin 518 provided with a bevel end and a slotted head as shown extends through track 483. The end of spring 519 rests in the slot of the headed pin 518 pressing said pin through the track 483. A large spool or drum 522 carries a roll of narrow paper and is supported on a standard 523 shown in dotted lines in Fig. 31, said standard being movable to any desired position.

The operation of the small paper carrier is as follows: While the carrier is out of the machine the rubber roller 504$^A$ is turned back as shown in dotted lines in Fig. 33. The paper strip is passed from the paper roll through the paper guide 508 until the end of the paper projects above rollers 484$^A$ and 504$^A$. Roller 504$^A$ is then snapped back so as to pinch the paper between it and roller 484$^A$. The carrier is then placed in the machine by sliding tracks 482 and 483 between the rollers of side rails 280 and 281 from the left hand end of the machine as viewed in Fig. 29. Rod 500 will pass over and close to the upper arms of levers 331 and 331$^A$. Pin 515 strikes against arm 278$^B$, compressing spring 516, and pin 518 snaps into the hole in the side rail 281 and locks the carrier in place in the machine. Each time the spacing key is depressed as already described with reference to the large paper carrier, it will lift the upper arms of levers 331 and 331$^A$ thereby operating the roller 484$^A$ through the ratchet and pawl mechanism, feeding the paper upward. When the printing and adding of the column on the paper strip has been completed, the strip may be drawn out by hand sufficiently far to clear the printing and cut off against the knife 473. (Fig. 30). If it be desired to turn the paper up without using the spacing key this may be done by turning the milled head 284$^B$. To remove the carrier from the machine, press button 521 which will cause pin 520 to force the pin 518 out of the hole in side piece 281, whereupon spring 516 acting on plunger pin 515 will start the carrier out of the machine. It may then be withdrawn from the machine by hand. When the small carrier has been removed from the machine the paper may be left in it and the carrier together with the standard supporting the paper roll may be set aside without disconnecting the paper, thus leaving it in condition for instant use whenever desired.

*The inked ribbon or tape.*—The machine is provided with an inked ribbon or tape which runs between the types and the paper in the path of the printing hammers. The tape itself in its general character is similar to that commonly used in typewriting machines. I have however, provided a tape for printing in three colors by dividing the tape into three breadths or bands; the upper breadth being in one color, for example, black; the middle breadth of another color, for example purple; and the lower breadth of a third color, for example, red. By operating a lever either one of the three desired colors may be brought into position to print. The tape is carried by two rotatable spools removably supported on the machine, but in such manner that it is not necessary to touch the tape with the hands when inserting or removing the tape. Furthermore, after the tape has been placed in the machine the operator has no further concern with it until it has been worn out and has to be replaced, since it will automatically wind itself first on one spool and then on the other without any attention on the part of the operator. The tape is fed step by step from one spool to the other whenever the spacing key is depressed.

The mechanism for carrying and operating the ribbon or tape is illustrated particularly in Figs. 1, 2, 10, 11 and 12, 15, 22 and 23. Fastened solidly to the side bar 281 and rising therefrom (Figs. 1, 10 and 22) is a pair of arms 418 and 419, by the upper ends of which is supported the frame 420 of thin sheet metal. Said frame has an opening opposite the type wheels of the machine as best shown in Fig. 22. A pin 423 rises from an ear 418′ which projects at right angles from arm 418 (Figs. 10 and 22) and a similar pin 424 rises from a similar ear 419′ projecting from arm 419. Rollers 421 and 422 are mounted to turn and to slide up and down on said pins. At the base of each roller 421 and 422 is a groove (Fig. 23). Standards 349 and 249$^A$ rise from the bed plate of the machine and support between them the rotatable shaft 350 (Figs. 10, 11, 12, 15). Fastened solidly to the shaft 350 is the ratchet wheel 352. Another ratchet wheel 353 and the bevel gear 351 fastened solidly together, turn as one piece on shaft 350. The ratchet wheel 352$^A$ is fastened to shaft 350 at the opposite end, and the ratchet wheel 353$^A$ and bevel gear 351$^A$ are mounted to turn together on said shaft. Ratchet wheel 353$^A$ carries pawl 354^A (Fig. 2) mounted on screw 355^A. A spring 356^A is fastened to ratchet wheel 353^A by screw 357^A. One end of spring 356^A rests against pin 358^A and the other end presses pawl 354^A against the ratchet wheel 352^A. If ratchet wheel 353^A is turned in one direction bevel gear 351^A and the shaft 350 will turn with it. But if shaft 350 is turned in the other direction said ratchet wheel and bevel gear will not be operated. The ratchet wheels and the bevel gear at the opposite end of the shaft operate in the same manner. Pawl 354 (Fig. 10) is a duplicate of pawl 354^A (Fig. 2) and is fastened to the ratchet wheel 353 by a screw 355 on which it swings; a spring 356 is mounted on ratchet wheel 353 by screw 357 and presses said pawl against the ratchet wheel 352.

Shafts 361 and 361^A (Figs. 12 and 15) pass through the hollow columns of standards 349 and 349^A. The bevel gear 360 meshes with bevel gear 351, and bevel gear 360^A meshes with gear 351^A. Sleeve 364 slides up and down on shaft 361 and is provided with a downwardly extending arm 365, and similar parts 364^A and 365^A are provided for shaft 361^A: An elongated hole 366 (Fig. 12) is provided in the lower part of arm 365, and a sleeve 363 (Figs. 11, 12, and 15) is fastened solidly to the standard 349 and acts as a guide to arm 365. Shaft 361 turns in standard 349 and sleeve 364. A sleeve 367 slides up and down on the upper part of shaft 361. A key way 362 is cut in the upper part of shaft 361 (Fig. 12), and a pin 368 secured to sleeve 367 projects into said key way, causing sleeve 367 to turn with shaft 361. In the lower part of sleeve 367 is a groove, best shown in Figs. 12 and 15, which is engaged by a pair of inwardly turned fingers which rise from the top of part 364. Thus parts 364 and 367 will slide up and down on shaft 361 as one piece, and part 367 will turn with shaft 361 while part 364 will not rotate. The upper end of sleeve 367 is threaded and provided with a nut 371. The sleeve 367 carries spool 369 (Figs. 1 and 12) on which the tape or ribbon is wound. It is held in place by nut 371 which, when screwed down, clamps the spool between the nut and the shoulder at the base of sleeve 367. An arm 425 extends from part 364 to roller 421 (Figs. 10, 15 and 23). The end of arm 425 is forked, the tines of the fork engaging a groove in the bottom of roller 421 so that when part 364 is raised or lowered, roller 421 will be raised or lowered with it. Parts 360^A, 361^A, 363^A, 364^A, 365^A, 367^A are duplicates of the parts having the same reference numerals without the character A, and parts 370 and 372 are duplicates of parts 369 and 371. Arm 426 is a duplicate of arm 425 and operates roller 422 in connection with part 364^A.

Rising from the bed plate of the machine are two similar standards 397 and 400 (Figs. 2, 12 and 15). A bell crank lever 404 is pivoted to standard 397 and 403 and provided at its upper end with pawl 407 pivoted at 406. A lug 407' projects from pawl 407. Pins 398 and 399 project from standard 397 to limit the movement of lever 404. At the opposite side of the machine lever 408 is a duplicate of lever 404 and is pivoted to standard 400 at 409. A pawl 412 is pivoted to the upper end of lever 408 at 411 and said pawl is provided with a lug 412'. Connecting the lower ends of levers 404 and 408 is a rod 405. The pawl 407 operates ratchet wheel 353, and pawl 412 operates a similar ratchet wheel 353^A. Standards 413 and 413^A (Figs. 2, 11 and 12) mounted on the bed plate of the machine support shaft 414 whose ends turn in said standards. Arm 415 is fastened solidly to shaft 414, the upper end thereof being slotted to embrace rod 320, and each side of said slotted part being forked to engage pin 417 which projects from each side of rod 320 (Figs. 11 and 12). Arm 416 is also fastened solidly to shaft 414 its end being forked to engage rod 405.

The operation of the inked tape or ribbon is as follows: It is wound on spool 370 (Fig. 1) with its other end attached to spool 369. The spools are then held one in each hand and the tape slipped between the rollers 421 and 422 and the plate 420 as shown in dotted lines in Fig. 1. The spools are then drawn back and slipped on to sleeves 367 and 367^A, and after the tape is drawn taut the spools are clamped in position by nuts 371 and 372. It will be seen that the tape now passes from spool 370 over rollers 422 and 421 to spool 369 as indicated by dotted lines in Fig. 1. The thin metal plate 420 acts as a shield to keep the paper from being smutched by rubbing against the ribbon. The aperture in the plate 420 allows the ends of the hammers to pass through and carry the paper and tape against the type. Assuming now that pawl 412 (Fig. 2) has been lifted so as not to operate ratchet wheel 353^A, every time the spacing key 339^A is depressed rod 320 will move backward swinging arm 415 in the same direction, thus turning shaft 414 and swinging arm 416 upward. Arm 416 acting upon rod 405 will lift the lever 404 throwing the upper end thereof carrying pawl 407 forward, thus turning the ratchet wheel 353 and bevel gear 351. As ratchet wheel 353 turns, pawl 354 will engage the teeth of ratchet 352 and turn shaft 350. The rotation of bevel gear 351 will turn bevel gear 360 and shaft 361 thus rotating the spool 369 and winding the tape from spool 370 on to spool 369. When by the repeated use of spacing key 339^A all the tape has been wound from spool 370 on to spool 369, pawl 407 (Figs. 12 and 15) will be automatically lifted, so that during its forward swing it will not engage the teeth of its ratchet wheel, and simultaneously pawl 412 (Figs. 2 and 15) will be dropped so as to engage the teeth of ratchet wheel 353$^A$, thus causing the tape with each operation of the spacing key to be wound again upon spool 370 from spool 369. The mechanism for lifting and dropping the pawls 407 and 412, is best shown in Figs. 2, 10, 11, 12 and 15. A worm 359 is fastened solidly to shaft 350. A worm wheel 377 operated by said worm is supported by a standard 376, which rises from the bed plate of the machine, and a gear wheel 379 is rigidly connected by a neck 378 with said worm wheel 377, and all are fastened solidly to shaft 376′ which turns in standard 376. Gear wheel 374 secured to shaft 373′, mounted to turn in standard 373, engages gear 379. A pin 375 projects from the upper side of gear wheel 374. A bracket 380 is fastened solidly to standard 349 and a similar bracket 381 to standard 349$^A$; and a bridge piece 382 is supported by said brackets 380 and carries blocks 383 and 384 through which are square holes. A rod 385 slides in said blocks and supports collars 387 and 388 rigidly secured thereto. Both ends of the rod 385 are beveled. Block 386 slides on rod 385 and has two downwardly projecting ears which engage pin 375 on gear 374. Coil springs 389 and 390 encircle rod 385 between block 386 and the collars 387 and 388. Latches 391 and 393 pivoted to the cross piece 382, at 392 and 394 respectively, are pressed by a spring 396 toward collars 387 and 388. Said spring is secured to the cross piece by screw 395. When the parts are in the position shown in Fig. 15 one end of the rod 385 is under lug 412′, thereby holding the pawl 412 lifted, so that it does not operate ratchet wheel 353$^A$. The other end of rod 385 is retracted from lug 407′, leaving the pawl 407 in operative engagement with its ratchet wheel. Shaft 350 will be rotated in the same direction whether it is turned by pawl 407 or pawl 412. Each time the spacing key is depressed, said pawls are thrown forward, pawl 412 working idly, and pawl 407 working ratchet 353, shaft 350, worm 359, worm wheel 377, gear wheel 379, and gear wheel 374. As the latter gear wheel turns the pin 375 carries block 386 toward collar 388 compressing spring 390. When block 386 has moved far enough to engage the lower arm of latch 391, the nose of said latch is lifted, and frees the collar 388, allowing spring 390 to force the collar against block 383. This causes the rod 385 to be thrust toward the right as viewed in Fig. 15, its bevel end engaging lug 407′ and lifting pawl 407 out of engagement with its ratchet wheel, while the other end of rod 385 is retracted so as to permit pawl 412 to engage ratchet wheel 353$^A$. Latch 393 at the same time drops behind collar 387 holding the rod 385 in its shifted position. The tape is of such length that at this point in the operation it will have been substantially fully wound upon spool 369. The mechanism at the opposite side of the machine by which the tape is rewound on spool 370, is precisely similar to that already described. Thus the tape will automatically be wound from one spool to the other and back again indefinitely.

As has already been explained, the tape may be made with breadths or bands of several different colors. For the purpose of illustration we will assume that the tape carries black, purple and red ink. An arm 427 is fastened solidly to shaft 323. Projecting from arm 427 is a pin 428 which extends into the elongated hole 366 in the lower part of arm 365 (Figs. 12 and 15). The arm 429 is a duplicate of arm 427 and is similarly fastened to shaft 323. Pin 430 is a counterpart of pin 428 and projects from arm 429 into the slot in the lower part of arm 365$^A$ (Figs. 15, 26 and 27). A lever 431 (Fig. 26) is fastened solidly to the end of shaft 323 just outside of the frame D′. Projecting from the end of said lever is a boss 431$^A$ within which a pin 431$^C$ is mounted to slide. This pin is provided with a milled head 431$^B$ and a shoulder 431$^D$. A spring 431$^E$ tends to throw the pin into holes provided therefor in frame D′. On such hole is marked "B" on the side of the frame. Two other similar holes are provided in the frame D′ marked "P" and "R." Hole "P" is below "B" and hole "R" is below "P." When the pin is in hole "P" the middle band of color, that is purple under the conditions assumed, is in position for printing. To print black the pin 431 is pulled out of hole "P" by the milled head and swung upward until the pin snaps into hole "B," indicating black, as shown in Fig. 26. The swinging of lever 431 turns shaft 423 which causes arms 427 and 429 to swing downward. These arms pull down the arms 365′ and 365$^A$, which carry with them sleeves 364 and 364$^A$, on which the spools are mounted. At the same time the rollers 421 and 422 over which the tape passes are pulled down by arms 426 and 425. Thus all the tape carrying parts are lowered and the upper or black breadth of the tape is brought into position for printing. In the same way if it is desired to print from the lower breadth of the tape, in this instance red, the lever 431 is thrown downward until pin 431$^C$ snaps into the hole "R" indicating red. This raises the tape carrying parts until the lower section of the tape is in position for printing.

*Cushions for hammers, and mechanism for*

*throwing back hammers to allow insertion of paper.*—Standards 440 and 441, which are duplicates, rise from the side frame 280 (Figs. 1, 10, 30, 34 and 35). A shaft 442 runs between the ends of said standards and is provided at one end with a thumb lever 446. Arms 443 and 444 are fastened solidly to shaft 442 and support rod 445. A knob 448 projects from arm 443 and a spring 447 fastened to standard 440 is pressed into engagement with knob 448. (Figs. 10 and 34.) On arm 441 is a pin 452 (Fig. 10) which projects between pins 453 and 454 on arm 444. A pin 449 projects from arm 443, and a similar pin 450 from arm 444. A strip of suitable elastic material, such as rubber or leather, 451 extends between and over the faces of the upper ends of arms 443 and 444, and is held in place by hooking its ends on pins 449 and 450. When the parts are in the positions shown in Figs. 1, 2, 30, 34 and 35, they are held by a spring 447, and the rubber strip 451 acts as a cushion between the hammers and the paper. When it is desired to throw back the cushion 451 and the striking ends of the hammers to make space for inserting the paper, the rod 442 is turned by means of thumb lever 446 thus swinging the arms 443 and 444 and the cushion strip 451, and at the same time swinging the cross rod 445, which will strike against all the hammers swinging them back with it. The parts are held in this open position by spring 447 which now presses against the other side of knob 448 as shown in Figs. 10 and 12. After the paper has been inserted the thumb lever 446 is again turned throwing the parts back to the positions shown in Fig. 2. Pins 452, 453 and 454 limit the extent of the movement of the thumb lever 446 and consequently the parts controlled by it.

Figs. 30, 34 and 35 show the details of the cutting-off mechanism for severing the strip of narrow paper coming from the paper roll. A shaft 474, extending between the arms 443 and 444, is provided with collars 474' and 474² just inside of said arms. A small boss projects from the under side of said collar 474' as shown in Fig. 35. A knife 473 is fastened solidly to shaft 474 and extends upward to the point where the paper is to be severed. Latch 475 secured to arm 443 by screw 476 may be pressed downward by a button 475'. A notch in latch 475 receives the boss on collar 474'. Spring 477 fastened to the arm 443 at 478 presses the latch upward, the lower end of the spring engaging pin 479. The knife is normally held in this position by latch 475 and the paper may be cut off at the desired length by drawing it across the edge of the teeth at the top of the knife. When knife 473 is not in use it may be turned down out of the way into the position shown by dotted lines in Fig. 35 by pressing down button 475', which removes the latch and permits the shaft 474 and the knife 473, to be swung down to said dotted line position.

*The counter.*—In order to show the number of items entering into the addition, a counter of any suitable form may be attached to the machine and operated by the spacing key which is depressed after each amount or item is printed. I have herein shown however an improved counter of my own invention. Referring particularly to Figs. 1, 12, 12ᴀ, 24 and 25, a frame 455 is fastened solidly to the side frame D. Said frame comprises a sleeve 455' which projects through and beyond the side frame D. A shaft 456 runs through sleeve 455' and through said frame 455 and is provided with a milled head 456' at the outer end. A collar 456ᴮ secured to the other end of the shaft by pin 456ᶜ holds spring 456ᴬ between said collar and the side of frame 455. Said spring tends to thrust the shaft 456 so that the milled head presses against sleeve 455'. A pin 473 projecting from shaft 455' enters a hole provided in the milled head when the parts are in the positions shown in the drawings. When the pin 473 engages the milled head the shaft 456 will be held rigidly against rotation. A groove 462 is cut in said shaft as shown in Fig. 25. An indicator wheel 457 turns on said shaft and is provided on its circumference with a series of ten types numbered consecutively from "0" to "9" with notches between said characters. A disk 457ᴬ is fastened to the indicator wheel 457, the two turning as one part. A notch corresponding to the notches between the 6 and 7 types on indicator wheel 457 is cut in disk 457ᴬ. Pawl 457ᶜ is fastened to the indicator wheel 457 by pin 457ᴮ and is pressed by spring 457ᴰ against shaft 456. A recess is provided in the disk 457ᴬ as shown in Fig. 24, in which the pawl 457ᶜ is lodged. As shown in Fig. 1ᴬ there is a series of openings in the top 58 of the keyboard so that the numbers on the indicator wheels may be seen. When "0" shows in said openings the pawl 457ᶜ rests in groove 462. Any number of indicator wheels each with its disk similar to 457 and 457ᴬ may be mounted on shaft 456. In Figs. 12 and 12ᴬ and 1ᴬ I have shown three such indicator wheels, while in Figs. 1 and 25 two are shown. Shaft 463 extends between the sides of frame 455 and carries a pawl 464 which is pressed by spring 464' fastened to the frame. This pawl is a drag pawl to prevent the indicator wheel from moving accidentally. Similar pawls 465 and 466 pressed by springs 465' and 466' are provided for each indicator wheel. A rack 468 swings on shaft 456 and is connected to the key shaft 339 by a rod 472 (Fig. 12). Shaft 470 extends between the sides of rack 468, and pawl 469 hung on said shaft works in the notches of the indicator wheels 457. A spring 471 presses pawl 469 against the indicator wheel. Each indicator wheel is provided with a pawl similar to 469. These pawls are duplicates save that the unit pawl works only in the notches of the unit indicator wheel, while pawl 369' works in the notches of the second or tens indicator wheel, and also overlaps the disk 457$^A$ of the unit wheel, so that when the spacer key is depressed pawl 469' will ride over indicator wheel 458, excepting when the notch in disk 457$^A$ allows the pawl to drop and engage the indicator wheel 458. In a similar way pawl 469$^2$ which operates indicator wheel 459 overlaps disk 458$^A$. The latter pawl has an ear 469$^A$ which projects over pawl 469', so that pawl 469$^2$ can work indicator wheel 459, only when the notch in disk 458 is in position to allow pawl 469' to drop. Additional pawls for additional indicator wheels may be provided and will be duplicates of pawl 469$^2$.

Assuming that all the indicator wheels show "0" through the openings of the keyboard the operation of the counter is as follows: Pawl 469 rests in the notch between types "7" and "8" of the unit indicator wheel 457. When all the types of the indicator wheels are in alinement showing "0," the notches of all the disks will be in alinement with each other, and with the notch between types "6" and "7" of all the indicator wheels. When the spacer key 339$^A$ is depressed the key shaft 339 carries rod 472 with it, which swings the rack 468 downward, thus moving pawls 469, 469', 469$^2$ etc. Pawl 469 turns the unit indicator wheel one space from "0" to "1." As the other pawls rest on the disks they do not turn their respective indicator wheels. Each time the spacer key is depressed the unit indicator wheel will be advanced one space. The drawings illustrate the position when the spacer key has been depressed eight times and "8" shows in the unit opening. If the spacer key be again depressed so that "9" will show in the unit opening, the release of the spacer key will cause the pawl 469' to drop into the notch of disk 457$^A$, and into a notch of the indicator wheel 458. The next depression of the spacer key will turn both the unit indicator wheel and the tens indicator wheel, and the openings in the keyboard will show "0—1—0." Thus, each time the unit indicator wheel passes from "9" to "0," the tens indicator wheel will be turned one space. When the counter has been operated until it shows "0—8—9," pawl 469' will rest in the notch of disk 457$^A$, and the next depression of the spacer key will cause the counter to read 0—9—0. At this moment the notch in disk 458$^A$ will be in position to allow pawl 469$^2$ to drop into it and turn the indicator wheel 459. But since pawl 469' is resting on disk 457$^A$, and ear 469$^A$ is resting on pawl 469'; the pawl 469$^2$ will be prevented from dropping into the notch of disk 458$^A$. Suppose, now, the spacer key has been operated until the counter reads "0—9—9." At this point the pawl 469' drops into the notch of disk 457$^A$ allowing pawl 469$^2$ to drop into the notch of disk 458$^A$, and the next depression of the spacer key will cause the counter to read "1—0—0." To reset the indicator wheels to "0," the milled head 456' is pulled out until it is freed from pin 473, after which it is turned one revolution in a clockwise direction. Groove 462 in shaft 456 will then pick up all the pawls of the indicator wheels and turn said wheels back to "0" position, whereupon the hole in the head 456' will come opposite pin 473, and the milled head will snap back and be locked in its original position.

The subject matter of the aforesaid counter, apart from its relation to the adding machine, is reserved for a separate application and therefore will not be claimed herein.

*Modifications of the large paper carrier.*—Instead of the paper carrier heretofore described and illustrated with reference to Figs. 10, 18 and 21, a large paper carrier may be constructed as illustrated in Figs. 36, 37, 38 and 39. On shaft 254 are mounted arms 530 which are not fixed to the shaft but swing thereon, pins 532 projecting from the shaft 254 through elongated holes in the hubs of arms 530 limiting the swing of said arms. Rollers 530$^A$ provided with rubber tubing are carried by the upper ends of the arms. Springs 531 fastened to shaft 254 tend to throw the rollers 530$^A$ against sections of rubber tubing provided on shaft 257. At the end of shaft 254 is a lever 533. When lever 533 is thrown into the position shown in dotted lines in Fig. 38, shaft 254 will be rocked and pins 532 will swing arms 530 carrying rollers 530$^A$ away from shaft 257 thus leaving a space for inserting the paper. The carrier will be operated in the machine as hereinbefore described. I have also shown in Figs. 36 to 39 inclusive a modified form of mechanism for winding the paper upon the large roller of the carrier. The roller 528 corresponds to roller 244 shown in Figs. 10 and 18. Roller 528 is a hollow cylinder into each end of which is fastened a plug 528$^A$. Shafts project from said plugs through the end pieces 241 and 241$^A$ turning therein. The end piece 241 is provided with a neck 241', in which a groove is cut. The milled head 529 turns on the neck 241', the screws 529$^D$ projecting into the groove of the neck. The ratchet wheel 528$^B$ is fastened to the end of shaft 528$^A$ and is engaged by a pawl 529$^A$ fastened by screw 529$^B$ to the interior of the milled head. A spring 529$^C$ presses this pawl against the ratchet wheel. On shaft 254 are link arms 535. Pins 537 project from shaft 254 through elongated holes in the hubs of said link arms. Links 538, 539 and 540 and link arm 535, are pivoted together by pins 541, carrying rollers 542, forming a structure similar to a sprocket chain. Springs 543 tend to press the links tightly around the cylinder 528 so that the rollers 542 bear thereon, and springs 536 passing through the shaft 254 press link arms 535 toward the cylinder. Link 538 is made with an upwardly projecting arm 538$^A$, which acts as a guide for the paper while being inserted in the carrier. A tongue 540$^A$ made of thin metal is fastened to link 540 to act as a guide for the paper, both while being inserted and while it is coming from between the last of the rollers 542 and the cylinder 528, as it is being wound upon the cylinder.

To place the paper in the carrier, lever 533 is thrown to dotted line position (Fig. 38) which throws back roller 530$^A$ and link arms 535. The edge of the paper is then inserted between rollers 530$^A$ and shaft 257 until the edge comes between rollers on the link arms and the cylinder 528. Lever 533 is then returned to its normal position whereupon the paper will be pinched between rollers 530$^A$ and shaft 257, and also between the rollers on the link arms 535 and cylinder 528. The milled head 529 is then turned to wind the paper on the cylinder. The paper carrier is placed in the machine and operated as already described. If it is desired to turn the paper upward without using the spacer key this may be done by turning the milled head 257$^B$ as before described.

*English money machine.*—The machine as above described is adapted to addition in a decimal system. The invention however is not restricted to such system but may be adapted to other systems such as to the addition of pounds, shillings and pence in the English money system. This is accomplished mainly by making the number of teeth on gear wheel 1 and the gear wheel 2 of proper ratio. Certain other changes are also necessary to adapt the machine to the changed system which will hereinafter be described in detail. In the following description I will also show certain other modifications which are not peculiar to the English money machine but are applicable to the machine when used for various systems but may conveniently be described in connection with the English money machine.

A keyboard for the English money machine is shown partly broken away in Fig. 41. Referring to Fig. 47, showing a cross section through the gear wheels and type wheels of the English money machine, 6 represents a stationary hollow shaft extending between the sides B, B' of the frame. A collar 548 is fastened solidly to hollow shaft 6, and a collar 549 on said hollow shaft, abuts against collar 548. Rollers 550 turn between collar 549 and cam 141 which carries gear wheel 1. Spacing washers 551 separate the several collars 549. Collar 549 is sufficiently thick to allow rollers 550 and gear wheel 1 to turn freely. When all the gear wheels 1 have thus been assembled on hollow shaft 6, collar 548' is fastened to said hollow shaft clamping said gear wheels in place. Each gear wheel 1 and its cam 141, 141$^A$ or 141$^B$ is thus separated from the adjacent gear wheels and turns freely on its own rollers. The shaft 4 turns in hollow shaft 6 as already described.

The pounds columns are the same in all respects as the columns described in the decimal machine. There may be as many such columns as desired and I have shown in the drawings five pounds columns with keys, with two extra type wheels and the associated parts to carry the same two columns higher. There may, of course, be as many such extra type wheels as desired. In Fig. 43, showing only the parts necessary for tripping the gear wheels to carry the sum forward and for resetting the machine to "0" and printing the sum, the type wheels are indicated at 3 and the gear wheels at 1 and 2. The unit gear wheel 1 of the shillings column has 60 teeth and is like the gear wheels 1 of the pounds column. Since twenty shillings make a pound, each time the addition in the shillings column passes from "19" to "20", the shillings column will show "0" and the unit column of the pounds type wheels will be advanced one unit. This is accomplished by the following mechanism: To the unit gear wheel 1 of the shillings column is fastened a double cam wheel shown in detail in Fig. 48, consisting of two cams fastened together, cam 141 having six teeth and being a duplicate of cam 141 of the pounds column, and cam 141$^A$ having three teeth. When assembled, the tens gear wheel 1 turns freely between the two cams which are fastened solidly to the unit gear wheel 1 as shown in Figs. 46 and 47, with the six tooth cam next to the unit gear wheel 1. There is an arm 142 which has already been described and the other necessary parts for tripping the wheels and carrying forward the sum, one such arm for each cam 141 and 141$^A$. The unit type wheel 3 of the shillings column is a duplicate of type wheels 3 of the pounds column. The tens type wheel 3$^D$ of the shillings column, has five types all "1's" spaced at equal distances apart upon its periphery as shown in Fig. 52. The unit column of keys for the shillings is a duplicate of the pounds column of keys, (Fig. 41) and the column rod 77 (Fig. 42) for the unit shillings column operates, through offset rod 553, the mechanism which controls the adding and printing in the shillings column. Only the unit gear wheel 1 of the shillings column is operated from the keys, and there is a single double faced hammer 109$^B$ for printing the shillings. Part 547 (Figs. 42 and 53) turns freely on shaft 60, one arm of which is operated by pin 75 of the zero key of the units shillings column and is a duplicate of part 74 shown in Figs. 1, 2 and 3. When said key is depressed column rod 77 will be pulled back. The other arm of part 547 is operated upon by pin 75 of the tens shillings column. Parts 73 and 545 are fastened solidly to shaft 60 the latter pulling rod 544 which operates the adding arm E on shaft 43. This adding arm is so shaped as to cause gear wheel 1 of the column operated, to be turned ten teeth adding ten to the units type wheel.

Assuming that the units type wheel shows "0" in position A (Fig. 46) the several "1" types of the tens type wheel will be in line with types "1," "3," "5," "7" and "9" of the units type wheel. (See Fig. 52.) Therefore, a blank space on the tens type wheel is in position A, and if the sum key be depressed the printing in the shillings column under these circumstances show "0" in the units column and no impression in the tens column. Now suppose the unit gear wheel 1 and type wheel 3 of the shillings column be operated until said type wheel 3 passes from "9" to "0." Bearing in mind that the gear wheel 1 has sixty teeth, gear wheel 2 ten teeth and the cam 141 six teeth, it will be seen that during one complete revolution of the type wheel, the gear wheel 1 will have turned one-sixth of a revolution, and the dog 142 will drop off one of the teeth of the cam 141 thus tripping the gear wheel 1 of the tens column one tooth, thereby turning a type "1" of the type wheel 3$^D$ into position A. At this point the dog 142, engaging the three toothed cam 141$^A$, will have ridden only one-half way to the end of its cam tooth. When by the further operation of the shillings units column the type wheel 3 again passes from "9" to "0," gear wheel 1 of the tens column will again be tripped carrying the tens type wheel from "1" to a blank space, leaving the shillings wheels reading, "blank," "0." Gear wheel 1 will then have moved a distance of 20 teeth, that is, one-third of a revolution and the dog 142 which engages cam 141$^A$ will drop off the end of its cam tooth in unison with the dog 142 which operates with cam 141 of units column, thereby tripping gear wheel 1 in the pounds units column one tooth, and the type wheels will read 1 pound, no shillings. It will be understood that the spacer key is depressed after the printing of each item of the addition. If the one key in the shillings tens column be operated instead of the keys of the units column, pin 75 (Fig. 42) in the shillings tens column will operate part 73 and 547, the latter operating the units column through rod 77 of the units column, so as to set the mechanism to throw the addition into that column. Part 73 turns shaft 60, thus swinging part 545 and operating rod 544 to swing arm E and actuate the mechanism to add 10 in the units column. Therefore, the shillings units type wheel will be turned one complete revolution still showing "0" in position A (Fig. 46), and the shillings tens column type wheel will have been tripped up to "1." At the same time type plate 37 bearing types appropriate to the English money system as shown in Fig. 51 will be swung in the manner already described to bring the appropriate types opposite the hammers. If the "0" key of the shillings units column be depressed, pin 75 of that column will turn part 547, which is loose on shaft 60, and the hammer will be operated without making any addition on the type wheels, thus printing "0" in the units column. As all the types on the type wheel 3$^B$ in the shillings tens column are "1" and as they are alternated with blank spaces, it will be seen that each time the shillings units column passes from "9" to "0," "1" on the shillings tens column will be turned to position A, and each time the shillings wheels pass from "19" to "0," a blank space on type wheel 3$^B$ will be turned to position A.

Referring now to the pence column, part 546 is a duplicate of part 547 and turns freely on shaft 60 (Fig. 42). Part 73 of the pence tens column is a duplicate of parts 73 of the shillings column and is fastened solidly to shaft 60. Accordingly, when the "0" key of the pence units column is depressed "0" will be printed therein but no addition made; and when any other key of the pence unit column is depressed the amount indicated thereon will be added and printed. When the "1" key of the pence tens column is used, 10 will be added to the pence type wheel and printed. The pence type wheel 3$^A$ shown in detail in Fig. 49 contains 12 types from "0" to "11" inclusive. Thus one complete revolution thereof will add 12 pence, or one shilling. In Fig. 16 is shown a gear wheel 1 which contains 60 teeth as before, and its cam wheel 141$^B$ which contains five teeth. Accordingly, the units shillings wheel will be tripped or advanced one tooth by the dog 142 which coöperates with cam 141$^B$, each time the gear wheel 1 of the pence column has been advanced twelve teeth or one-fifth of a revolution. Gear wheel 2$^A$ has twelve teeth corresponding with the twelve types on type wheel 3$^A$. Gear wheel 190$^A$ on shaft 189 of the resetting mechanism has 24 teeth. Fig. 50 shows in detail the dog 142 which coöperates with the five tooth cam wheel 141ᴮ of the pence column to trip the unit wheel of the shillings column. This dog is like the similar parts 142 already described, except that the two arms are offset as shown, in order to span the space between gear wheel 1 of the pence column, and the unit gear wheel 1 of the shillings column. A similar offset part 142 is used to operate the units pounds gear wheel from the shillings tens cam wheel. The hammer 109ᴬ of the pence column is made with a broad or double striking face as shown in Fig. 42. As there are sixty teeth on the gear wheel of the pence column and five teeth in its cam wheel 141ᴮ it will be seen that each time gear wheel 1 is turned 12 teeth or one-fifth of a revolution, the dog 142 will trip unit type wheel of the shillings column.

The English money machine is reset to "0" in the same manner as already described with reference to the decimal system machine.

Excepting as above indicated the English money machine is identical part for part with the machine for the decimal system heretofore described; and attention is particularly called to the fact that shafts 4, 5 and 189 (Fig. 16) have the same distances between centers as in the decimal system machine; and gear wheel 1 is a duplicate of gear wheels 1 of the decimal system machine, and gear wheels 2ᴬ and 190ᴬ differ from the corresponding gear wheels of the decimal machine in the number and shape of the teeth. Therefore, it will be seen that by suitably changing the ratios between gear wheel 1 and gear wheels 2 and 190, the machine may readily be adapted to various systems of irregular computation.

*Modification of hammer rebound mechanism.*—Instead of the device shown in Fig. 43 and Figs. 2 and 3 to cause the hammers to rebound away from the types after striking their printing blow, which has already been described, the device illustrated in Figs. 44, 45 and 65 may be used. Instead of part 111 (Fig. 43) the lower end of arm 109' of the hammers 109 may be made in two parts hinged together. A spring 109ᶜ is fastened to arm 109', below the hinged joint and presses against the arm 109' above the hinge. Thus, when hammer 109 strikes its blow the lower end of arm 109' comes in contact with block 119, and the momentum of the hammer overcomes the resistance of spring 109ᶜ behind the arm 109' at its joint, but upon the rebound of the hammer spring 109ᶜ will hold the hammer clear of the types in the position shown in Fig. 65. The tension of the spring 109ᶜ may be regulated by adjusting the screw 109ˣ which passes therethrough.

*Modified form of mechanism for actuating the type wheel gears.*—Instead of pawl 11 (Fig. 3) for rotating the gear wheels 1, a self-locking pawl 11ᴬ, 11ᴮ, may be used (Figs. 54, 55, 59 and 60). Shaft 7ᴬ corresponds with shaft 7 of Fig. 3, and supports a similar pawl 11ᴬ for each gear wheel 1 of the machine. Shaft 9ᴬ corresponds with shaft 9 (Fig. 3) and supports a latch 11ᴮ for each pawl 11ᴬ. Spring 10ᴬ encircles shaft 7ᴬ within a recess in pawl 11ᴬ, one end of which spring tends to press pawl 11ᴬ away from gear wheel 1, and the other end of which spring tends to press latch 11ᴮ against pawl 11ᴬ. The tension of the spring is so adjusted that the pressure against pawl 11ᴬ will overcome that against latch 11ᴮ. The operative end of pawl 11ᴬ is but half the thickness of the body and the nose of latch 11ᴮ is but half the thickness of its body as shown in Fig. 60. The head of pawl 11ᴬ projects rearwardly to form a notch to engage pawl 11ᴮ as shown in Fig. 59. The pawl 11ᴬ, latch 11ᴮ are normally in the position shown in Fig. 54 with the end of the latch resting on the head of the pawl. To set the pawl into the teeth of gear wheel 1, pressure is exerted on the latch 11ᴮ which presses the pawl against the teeth of the gear wheel and at the same time latch 11ᴮ drops into the notch behind the head of the pawl as shown in Fig. 59 thus securely locking the pawl into the gear wheel. If under these conditions cradle H be rocked as already described, gear wheel 1 will be turned the same as by pawl 11 described in connection with Fig. 3. At the end of the stroke the face of the latch 11ᴮ is thrown back away from the shoulder of 11ᴬ thus allowing the pawl 11ᴬ to withdraw from the gear wheel 1 and the cradle to return to its original position. The tail piece of latch 11ᴮ acts as a stop to limit the movement of these two members by striking against pawl 11ᴬ. Mechanism for operating the pawl 11ᴬ as above set forth is as follows: Latch 18 is provided with a tail piece of somewhat different form from that shown in Fig. 3, as best shown in Figs. 54 and 55. Part 18ᴬ is hung on shaft 20 adjacent to latch 18. A pin 18ᴮ projects from the upper arm of part 18ᴬ over the tail part of latch 18; and the lower arm of part 18ᴬ is in line with the latch 11ᴮ. Therefore, a downward pressure on the upper arm of part 18ᴬ will lift the latch 18 from the gear wheel 1, and will set pawl 11ᴬ against gear wheel 1.

Referring particularly to Figs. 54, 55 and 57, shaft 564 extends between and is supported at its ends in side frames B and B'. A cross bar 566 swings on shaft 564, and rods 567 and 567' extend downwardly from the end of cross bar 566. Shaft 567ᴬ runs between the lower ends of rods 567 and 567'. A spring 568 is attached at one end to pin 568' projecting from frame B' and at the other end to projection from the upper part of rod 567. Said spring tends to lift cross bar 566 and to swing shaft 567ᴬ against parts 561, hereinafter described. The end of the lower arm of part 18ᴬ is notched, and when pressure is exerted on the upper arm of part 18ᴬ, thereby lifting latch 18 and setting pawl 11ᴬ, cross bar 566 drops into said notch, thus locking part 18ᴬ in that position and holding latch 18 up until cross bar 566 releases part 18ᴬ.

The mechanism for releasing pawl 11ᴬ from the teeth of gear wheel 1 at the end of each addition, is as follows: Arms 571 and 571′ (Figs. 54, 55 and 56) swing on shaft 14 and carry rods 575 and 576, which extend between and pass through said arms and through the spacing collars 578 and 579 which are between arms 577. There is an arm 577 in line with the nose of each latch 11ᴮ. Arms 577 being fastened solidly to arms 571 and 571′ by means of rods 575 and 576 and collars 578 and 579, will work with said arms 571 and 571′ as one part. Therefore, whenever arms 571 and 571′ are thrown forward, arms 577 will move with them striking the nose of any latch 11ᴮ which may have been pressed into the notch or detent of its pawl 11ᴬ, thus releasing said pawl 11ᴬ from the teeth of its gear wheel 1. Links 570 and 570′ are pivoted to arms 571 and 571′ by screws 574 and 574′ and are connected at their lower ends by rods 569. Springs 572 and 572′ fastened to arms 571 and 571′ by screws 573 and 573′ and acting on said links and arms tend to press the rod 569 upward against rods 33 to 36. In the same horizontal plane with shaft 69 operated by the keys and the other adding shafts is a shaft T which is stationary and runs between the sides of frame B and B′. A two-armed bell crank lever 559 swings on shaft T, the lower arm provided with a pin which passes through a hole in the end of column rod 77 (Figs. 54 and 58). A duplicate bell crank lever 559 is connected with each column rod of the machine. Offset shafts 80′, 81′, 82′ and 83′ extend between the side frames B and B′ turning easily therein and are arranged in the same vertical plane with the shaft T. These offset shafts perform similar functions to the offset shafts 80, 81, 82, 83, shown in Fig. 2. A crank 78′ is fastened solidly to offset shaft 80′ and is in line with bell crank lever 559. Link 559ᴬ connects the crank 78′ with the upper arm of bell crank 559. Another crank 79′ is fastened solidly to offset shaft 80′ and is in line with part 18ᴬ. The three-armed bell crank lever 560 is mounted to swing easily on shaft T and is in line with crank 79′. Link 79ᴬ connects crank 79′ to an arm of bell crank 560. Parts 561 and 33-36 are connected to arms of bell crank 560. Shaft T and the offset shafts with the connections above described are clearly shown in perspective in Fig. 58. Part 33–36 connects bell crank 560 with lever 103. The parts 561 are guided between shaft 564 and a shaft 565 supported between the sides of frame B and B′. Said shafts are provided with spacing collars against which parts 561 work. At the upper end of each part 561 is hung the part 562 which is pressed by a spring 563 away from part 561. The foot of part 562 is directly over the upper arm of part 18ᴬ. A finger 561′ projects from part 561 as shown.

To operate the parts above described, assume for example that any key of the unit column is depressed. Column rod 77 is then drawn backward, turning bell crank 559 and shaft T. This will rotate offset shaft 80′, the turning of which swings crank 79′ upward, thereby swinging bell crank 560 which pulls down part 561, carrying part 562, the latter depressing the upper arm of part 18ᴬ, thus setting pawl 11ᴬ as previously described. The turning of bell crank 560 also pulls back part 33 to 36 operating lever 103 which actuates the printing hammers as previously described. It will also be understood that the adding mechanism is the same as previously described. The full lines in Fig. 55 show the positions of the parts at the end of the stroke of the key 71, and the dotted lines show the position of the parts just as the releasing mechanism is about to work for resetting the parts. When the part 561 moves downward, finger 561′ strikes and presses rod 567ᴬ, carrying with it arms 567 and 567′ thus swinging down the cross bar 566 and releasing latch 18. The shoulder or notch 33ᴬ on the under side of part 33 to 36 strikes rod 569 carrying it forward together with arms 570 and 570′, thereby swinging arms 577 which strike the nose of latch 11ᴮ and releasing pawl 11ᴬ. Cradle H will then fly back into its original position. There is an offset shaft and its connecting part for each column of the machine.

The modification above described in the mechanism for throwing the addition into the proper column necessitates a slight change in the mechanism for resetting the machine to zero. Referring to Figs. 54 and 62, it will be seen that the position of shaft 226 has to be changed. Arms 230ᴬ fastened solidly to shaft 226 take the place of arms 227 of Fig. 7. Arm 230ᶜ fastened solidly to shaft 223, and link 230ᴮ take the place of part 230 Fig. 7. Gear segments 237 and 231 take the places of part 237 and 231 respectively of Fig. 7. Shaft 226′ (Fig. 62) is in the same position previously occupied by shaft 226 and runs from the side of frame B to the side of frame N, its ends turning easily therein. Part 214 is fastened solidly to shaft 226′. Arm 214ᴱ is fastened solidly to shaft 226′ (Figs. 56 and 62). Arm 214ᶜ is fastened solidly to shaft 226. Link 214ᴅ connects arms 214ᶜ and 214ᴱ. With these structural changes the operation of resetting the machine to zero will be the same as previously described.

*Modifications of mechanism for unblocking the hammers.*—In Figs. 54 and 55 is shown a simplified form of a mechanism for unblocking the hammers 109. By referring to Fig. 3 in connection with these figures, it will be seen that the locations of shafts 179 and 239 and of spring 181 have been somewhat changed; also that the shape of parts 180 and 177 have been changed, and that shafts 183, 240, rods 178′, 182, 186, springs 178, 185, and part 184, have been omitted. When a gear wheel 1 (Fig. 54) is turned either by a key or by the trip mechanism, the block or hammer 109 in that column will be removed by the action of spring 181 and parts 180 and 177. Fig. 55 shows the position of the parts under discussion when such movement of the gear wheel 1 has taken place. When the machine is reset to zero the parts 180 and 177 will also be reset to the position shown in Fig. 54 in the manner previously described. There is also a slight modification shown in connection with gear wheel 190 and resetting shaft 189. In Fig. 54 only one pawl 191 on gear wheel 190 is shown, and two slots 193 and 193′ are provided in shaft 189. Such use of two slots and one pawl will accomplish the same result as that accomplished by the two pawls and one slot shown in Fig. 4.

In Fig. 61 I have shown another form of part 561. Shaft 565 and spring 563 and the depending part 562 shown in Fig. 54 are omitted. The projecting nose of part 561 (Fig. 61) takes the place of part 562, and spring 561ᴅ stretched between the finger 561′ and a projecting arm on bell crank 560 holds the part 561 against the guide rod 564, at the same time permitting the necessary throwback of the upper end of part 561 when the parts return to place after operation. Rod 567ᴮ acts as a guide to arms 567 and 567′.

*Two set keyboard machine.*—Instead of providing the machine with a full set of keys, one key for each digit in each column, it may be provided with a keyboard having two rows or two sets of keys, one of which may be termed the " column keys " and the other the " digit keys." The depression of a column key determines the column in which the addition is to be made, and the depression of a digit key determines the amount to be added in said column. The keyboard will also be provided with the spacer key and the sum key and the indicator as previously described. Fig. 63 is a plan view of such two set keyboard, the upper row of keys 580 representing the column keys and the lower row, 594, the digit keys.

Referring to Figs. 64, 65 and 66, 592 represents a stationary shaft running between the side frames D and D′. A bell crank 581 swings on shaft 592, the upper end of which is connected with key-shaft 580′. There is a duplicate of bell crank 581 for each column key. Shaft T is a stationary shaft running between the sides of frame D and D′. Bell crank lever 559 swings on shaft T and is in line with bell crank 581. A rod 582 connects said bell cranks. Offset rods 80′ to 84¹ inclusive, run between the side frames D and D′ with their ends turning easily therein. Offset rod 83′ is provided with a crank 78′ in line with bell crank 559 and connected therewith by link 559ᴬ. Another crank 79′ fastened solidly to said offset shaft 83′ is in line with link 584. Bell crank 560 swings on shaft T and is in line with crank 79′ and connected therewith by link 79ᴬ. As viewed in Fig. 65, the lower arm of bell crank 559 is directly in front of and conceals the lower arm of bell crank 560. Lever 584 swings on shaft 585, which is stationary and extends between the sides of frame B and B′. Lever 584 at its upper end is in line with part 18ᴬ. A rod 583 connects the bell crank 560 with part 584. There is a similar part 584 for each column of the machine, and there is also an offset rod and parts corresponding with 78′, 79′, 79ᴬ, 559ᴬ, 559, 582, 560 and 583, for each column of the machine, excepting the fifth or middle column (see Figs. 64, 66 and 67). Inasmuch as the column keys of said fifth or middle column are in line with part 584 of that column, the bell crank 581 of that column may be connected directly to part 584 by rod 582–583, as shown in Fig. 67, without the use of an offset rod.

Shaft 593 runs between the sides of frame D and D′, its ends turning therein, and bell crank 595 swings thereon, its upper arm being connected with the key shaft 594′. There is a duplicate bell crank 595 on shaft 593 for each digit key. Pins 596 and 596ᴬ project from either side of the lower arm of bell crank 595. The position of these pins determines the amount of movement imparted to the adding arm 44′ and to the arms 129′ controlling part 128. Therefore the location of said pins in the several arms of the bell crank levers 595 differs. The pin 596 operating the " 9 " adding arm 44′ is near the end of the bell crank arm, as shown in Fig. 65, therefore, providing sufficient swing to shaft 43′ to add 9. Pins 596 on the bell crank arm for the 1 digit key is near the hub, thus imparting a relatively short movement to the " 1 " adding arm sufficient only to add 1. The positions of the pins between these two extremes are graded progressively. Arms 597 and 597′ are fastened solidly to shaft 593 and are connected by rod 598. Arms 599 and 599′ are also fastened solidly to shaft 593 and are connected by rod 600.

One end of rod 33' is made with a hook which engages rod 600, the other end being connected with lever 103. There is a duplicate of rod 33' for each column of the machine. A spring 103' on rod $103^2$, which extends between the side frames B and B', is connected to each lever 103. A spring 609 carried on rods 610 and 611, which extend between the side frames B and B', tend to lift rod 33'; a duplicate of spring 609 is provided for each rod 33'. Shaft 43' extends between the sides of frame D and D' with its ends turning therein. This shaft corresponds with shaft 43 of Figs. 2 and 4. Adding arm 44' is fastened solidly to shaft 43' in line with pin 596, and a similar adding arm is provided for each digit key excepting the zero key. Arm 601 is also fastened solidly to shaft 43, and rod 602 connects arm 601 with bell crank lever 603, which swings on a stud 604 projecting from the side frame B. Rod $39^A$ connects bell crank 603 with arm C of the cradle H. Solidly fastened to shaft 43' is also an arm 613, connected by a spring 615 with pin 617, projecting from the side of frame D'; said spring holds the adding arms 44' against pins 596.

Shaft 127' extends between side frames D and D', its ends turning therein. This shaft corresponds to shaft 127 in Figs. 2 and 4. Arm 129' is fastened solidly on shaft 127' in line with pin $596^A$. There is a duplicate of arm 129' for each digit key excepting the zero key. Arm 605 is also fastened solidly on shaft 127'.

Part 128 swings on stud 618 projecting from side frame B', and a rod 606 connects part 128 with arm 605. Shaft 620 extends between the side frames B and B' with its ends turning therein, and supports bell crank 607 which is solid thereon just inside of side frame B'. A crank 607', corresponding with the lower arm of bell crank 607, is fastened solidly to shaft 620 just inside of the frame B. Rod 608 runs between bell crank 607 and crank 607'. Link 567' corresponding with 567 of Fig. 55 connects latch 566 with bell crank 607. Shaft 589 is stationary and runs between the side frames B and B'. Part 588 swings on shaft 589, and there is a similar part 588 to operate between each pair of rods 583 and 33' of the machine. Studs 619 and 619' (Fig. 64) project through the sides of frame B and B', and a cross bar latch 590 is hung on said studs. From the side pieces of cross bar 590 project ears 590' and $590^2$ just inside of the frames B and B'. Rod 591 runs between said ears and is fastened solidly thereto. The other parts of the machine are substantially the same as shown in the other drawings and previously described.

To operate the machine, assume for example, that the fourth column key from the right (Fig. 63) is depressed. Its key shaft 580' will then turn bell crank 581 which swings loosely on shaft 592, and bell crank 581 pulls back rod 582. Rod 582 swings bell crank 559 on shaft T. Bell crank 559 pulls down rod $559^A$, thereby swinging crank 78' and rotating the shaft 83', which lifts crank 79'. Crank 79' acting through rods $79^A$ and bell crank 560 pulls rod 583, thus swinging lever 584, throwing the upper end thereof forward. The upper end of rod 584 presses down part $18^A$, lifting latch 18 and setting pawl $11^A$, as previously described, and latch 566 drops into the notch in part $18^A$, holding it down until subsequently released. When rod 583 is drawn backward the projection on the lower side thereof depresses the part 588, which in turn depresses rod 33', so that its hook engages shaft 600. Latch 590, which is adjacent to part 588, drops into a notch in the end of part 588, thus holding the same and thereby the rod 33' depressed. Column key 580 is now released, and one of the digit keys, for example, the "9" digit key 594, is depressed. The key shaft 594' swings bell-crank 595 on shaft 593, and pin 596 in the lower end of said bellcrank lifts the adding arm 44', thereby turning shaft 43'. As shaft 43' turns it carries with it arm 601, which pulls back rod 602. Rod 602 (Figs. 64–68) swings bellcrank 603 on stud 604 and pulls down rod $39^A$. Rod $39^A$ in turn pulls down the arm C of the cradle H, and 9 is added in the column operated. Upon the depression of said "9" digit key the upper arm of bellcrank 595 strikes rod 598 thus depressing arms 597 and 597' turning shaft 593 and swinging arms 599 and 599' connected by rod 600. Rod 600 pulls back rod 33', thus operating lever 103, and thereby the hammers 109, which print "9" on the paper. Upon the depression of said "9" digit key pin $596^A$ swings arm 129', turning shaft 127' and swinging arm 605, which pulls back rod 606. Rod 606 operates part 128 as previously described. As the digit key nears the end of its stroke, the various parts will be released as follows by the projections on rod 33': Projection $33^c$ strikes rod 608, and acting through bell-crank 607 and rod 567' swings latch 566 back again, thus releasing the part $18^A$ and the latch 18. Projection $33^A$ strikes rod 569 thereby pulling rods 570 and 570', which throws arms 577 forward unlocking or releasing the pawl $11^A$ as previously described. Projection 33 strikes rod 591 and releases latch 590, allowing parts 588 to fly upward so that the hooked end of the rod 33' may lift away from rod 600. The parts are now reset for the next operation. The machine may be reset to zero after it has been operated as previously described.

In Fig. 65½ there is shown another method of operating the rod 33' to hook it on to rod 600. The shape of rod 33' in this figure is somewhat modified and the position and shape of projection 583^A on rod 583 is changed, as shown in the drawings. Projection 33^E rises from the rod 33' in front of projection 583^A. Shaft 646 is a stationary shaft running between the sides of frame B and B' and latch 645 swings on said shaft. There is a similar latch 645 for each rod 33'. Shaft 647 is a stationary shaft running between the side frames B and B' having fastened thereto springs 648 which press against latches 645. A guide-comb 644 extends between the side frames B and B' and is fastened solidly thereto, the teeth of the comb separating rods 33'. When key 580 and key shaft 580' are depressed, projection 583^A engaging projection 33^E pulls back the rod 33 until the latch 645 drops into the notch 33^x on rod 33'. The guide-comb 644 holds the rod 33' from dropping away from said latch. Key 580 is then released and the digit key 594 is depressed. Rod 600 catches the hook at the end of rod 33' and completes the movement of rod 33' to operate the hammer 109. As rod 33' is moved by a rod 600 the projection 33^F strikes and lifts latch 645, and the spring 648 holds the latch in lifted position, resting in a small notch in the back of the latch. Projections 33^C and 33^A operate against rods 608 and 569 as previously described. Upon releasing key 594, rod 33' resumes its original position. In so doing, after notch 33^x has passed by the nose of latch 645, projection 33^F strikes the tail of the latch, thus dropping the nose of the latch into the position shown in Fig. 65½.

*The adding machine attached to a typewriter.*—The adding mechanism of my machine may be attached to typewriters of ordinary construction. For the purpose of illustration I have herein shown the adding mechanism as attached to a typewriter of the form commercially known as the "Oliver" typewriter, only such parts of the typewriter being shown as are necessary to illustrate the connections between the keyboard of the typewriter and the adding mechanism.

The frame X of the typewriter rests on frame V which carries the working parts of the adding mechanism, the rear end of the typewriter frame X being supported by legs Z. Figs. 69, 70 and 71 show the connecting parts between the typewriter keyboard and the adding machine. The typewriter keyboard is provided with an extra set of keys 580^A, which will be termed "column keys". Nine such column keys are herein shown which will carry the addition into the millions dollars column, assuming that a decimal monetary system is being used. When the column keys are not operated the depression of any of the digit keys of the typewriter machine will perform the printing upon the typewriter but will not perform any addition on the adding machine. When a column key is depressed, and then a digit key, the amount represented by the digit key will be not only printed on the typewriter but also added on the adding machine in the column represented by the column key used. The sum of the additions appears on the number or indicator wheels viewed through a slot in the casing at position A (Figs. 72 and 73).

Describing the mechanism more in detail and referring first to Figs. 69, 70 and 71, the frame members V and V' are provided with suitable brackets 623 and 623' which support the ends of a stationary shaft 592^A. A bell crank lever 581^A swings on shaft 592^A the upper arm thereof being connected with the key shaft 580^A' on which is mounted a key 580^A of the units cents column. Shaft 592^A carries a similar bell crank 581^A for each column key. Offset shafts 80^A to 88^A inclusive, run from the side of frame V to the side of frame B. Frames B and B' are fastened solidly to the frame V. Said offset shafts turn in said frames, and there is one for each column key. Offset shaft 80^A carries a crank 78^A fastened solidly thereto and connected by rod 622 with the lower end of bellcrank 581^A. There is a duplicate of crank 78^A on each offset shaft in line with and connected with its respective bell crank 581^A. Crank 79² (Figs. 70, 71 and 72) is fastened solidly to offset shaft 80^A and a similar crank is provided on each of the other offset shafts. Shaft T' is a stationary shaft running between the side frames B and B' and supporting bellcrank 560^A which swings thereon. There is a duplicate of bellcrank 560^A on shaft T' for each column of the machine. Bellcrank 560^A is connected by rod 79^A' with crank 79² and the other cranks corresponding with 79² are similarly connected with their respective bellcranks like 560^A. Shaft 585 (Fig. 72) is a stationary shaft supported by the side frames B and B'. Lever 584^A swings on shaft 585 and is in line with part 18^A. There is a similar lever 584^A for each column of the machine. Lever 584^A is connected with bell crank 560^A by a link 583^A, and all the other levers 584^A are similarly connected to their respective bell cranks 560^A. Lever 584^A corresponds to part 584 (Fig. 65) and performs a similar function. Comb 621 (Figs. 69 and 70) runs the width of the machine and takes the place of the usual comb in the typewriter acting as a guide both for the digit keys and the column keys. Shaft W (Figs. 69, 70, 71 and 73) runs from the support 623' through the support 623 and the frame X extending slightly beyond the side of the frame V'. Shaft W turns in its supports 623 and 623' and arm 624 swings on shaft W. Digit key 594^A is connected by rod 594^A' with arm 624, and extends below said arm. Arm 624 acts as a guide to the movement of rod 594^A'. There is a duplicate arm 624 on shaft W connected with each digit key of the typewriter by a rod 594^A' excepting the zero key. A pin 624^A projects from both sides of the end of rod 594^A'. Arms 625 and 625' are fastened solidly to shaft W and connected by a rod 626 which extends under arm 624. A crank 627 (Figs. 70, 71 and 73) is fastened solidly on the end of shaft W and a bellcrank 629 swings on shaft 80^A in line with crank 627. Link 628 connects crank 627 with bell crank 629. Bellcrank 629 is connected by a link 630 with part 631 which swings on shaft 86^A. In line with part 631 is the part 607^A which swings on stud 634 projecting from the side frame B'. Part 607^A is connected by rod 567^A with crank 566^A fastened solidly on shaft 564. Shaft 43^A (Figs. 69, 70, 71 and 73) is the adding shaft corresponding to shaft 43 in Fig. 4 and to shaft 43' in Figs. 64 and 65. The adding shaft 43^A runs from side frame V through side frame V' and turns therein. Adding arm 44^A is fastened solidly on shaft 43^A and is the "9" adding arm corresponding to the adding arm 44 of Fig. 4 and 44' of Fig. 65. There is an adding arm on shaft 44^A to operate with each digit key, excepting the zero key, for adding the amount designated by the keys as previously explained. Adding arm 44^A extends under pin 624^A. Solidly fastened to shaft 43^A is an arm 640. Arm 540 is connected by rod 39^B with arm 641 which is fastened on shaft 4. Close beside shaft 43^A is shaft 127^A which runs from side frame V through side frame V' turning in said frames. Shaft 127^A corresponds with shaft 127 of Fig. 4, and shaft 127' of Fig. 65 and turns in said side frames. Solidly fastened to shaft 127^A is part 129^A which projects under pin 624^A', the latter being operated by the "8" key 594^B. There is a part corresponding to part 129^A for each digit key excepting the "9" key and the zero key. Arm 642 is fastened solidly to the end of shaft 127^A, and is connected by rod 643 with lower end of the swinging stop member 128 which is mounted on stud 636 projecting from the side frame B'. The operation of the stop 128 to arrest the downward movement of the arms C and C' of the cradle H has already been explained.

When the machine under discussion is at rest, the lowermost step of part 128 is in position to stop the arm C' when the "9" key is being used. Therefore it is not necessary to have an arm 129^A on shaft 127 to operate in conjunction with the "9" key. Arm 639 is fastened solidly to shaft 14 (Figs. 70, 71 and 73) and one end of pin 629' at the end of bellcrank 629 is in line with arm 639. The operation of the machine is as follows: Suppose it is desired to add 9 in the units column. The units column key 580^A (Figs. 69, 70 and 71) is depressed thereby swinging bell crank 581^A and crank 78^A backward which turns offset rod 80^A, swings crank 79^2, pulls rod 79^A', swings bellcrank 560^A, and by means of rod 583^A operates the lever 584^A to set the pawl 11^A into the teeth of its gear wheel 1 and to lift the latch 18 as previously described. The units column key is now released and the "9" digit key depressed. Key rod 594^A' will swing arm 624 on shaft W, said arm 624 carrying with it rod 626. Rod 626 through arms 625 and 625' turns shaft W. At the same time pin 624^A depresses adding arm 44^A thereby turning the adding shaft 43^A which carries arm 640 (Fig. 73). Arm 640 by means of rod 39^B pulls down arm 641 which rotates shaft 4, and shaft 4 swings down the arms C and C', causing the gear wheel 1 of the units column to add 9 as already described. The numeral "9" will now show on the units type wheel 3, through the indicator opening at A (Fig. 72). In the meantime the shaft W has rotated with the following result: Crank 627 (Fig. 73) is lifted turning bellcrank 629 on shaft 80^A. Bellcrank 629 by means of rod 630 swings part 631 on shaft 86^A, so that just as the digit key is approaching the end of its stroke the upper arm of part 631 strikes the lower arm of part 607^A, swinging it on its pivot and pulling down rod 567^A thus turning shaft 564. This releases the latch 18 as previously described. Just as latch 18 is released pin 629' strikes arm 639 (Fig. 73), turns shaft 14 thereby swinging arms 571, 571' and 577, which releases pawl 11^A as previously described. Upon releasing the digit key the operating parts will assume their original positions. If the "8" digit key, or any digit key of lower number, excepting the zero key, be used, then pin 624^A' will depress arm 129^A, turning shaft 127^A, carrying arm 642. Arm 642 by means of rod 643 will operate stop 128 so as to bring the proper notch or step under the arm C' to arrest the cradle at the proper point.

The mechanism for resetting the machine to zero is the same as previously described with the exception of a few minor changes. Such changes appear in Figs. 70, 74 and 75. Shaft 211 runs from side frame B through side frame N to the outside of the casing Y. Key shaft 187' is fastened solidly to the end of shaft 211. Part 212 is fastened solidly to shaft 211 and provided with pin 213 which projects under part 214^X. Part 214^X is solid on shaft 226 which runs between the side frames B and N turning therein. Part 214^Z is solid on shaft 226' and 214^C is solid on shaft 226. Link 214^D connects parts 214^Z and 214^C. The other parts are the same as previously described. When the key 187 is depressed, arm 212 is raised and pin 213 lifts arm 214ˣ turning the shaft 226; which depresses parts 214ᶻ, 214ᴅ and 214ᶜ, thus turning shaft 226. The operation of the rest of the mechanism is the same as already described. Inasmuch as the number wheels 3 in the machine when used as an attachment for the typewriter, face forward instead of to the rear, as in the adding machine previously described, the crank 188 will be rotated in a counter clockwise direction.

*Electric attachment.*—In Figs. 76, 77 and 78 I have shown means whereby the adding mechanism may be operated electrically, thus providing a machine which will respond to a very light touch of the keys. On the lower end of each key shaft 71' of the machine is fastened a contact member or circuit closer in the form of a ring of suitable metal, 663ᴬ, insulated from the key shaft by a sleeve 663 of hard rubber, or other suitable insulating material. Insulating strips 661 and 662 are fastened on the underside of the floor 59 and extend the full width of the keyboard on each side of each horizontal row of keys. Spring contacts 658 and 659 are fastened to these insulating strips and arranged to engage the contact member on the end of keyshaft 71' when the same is depressed. Similar contact springs are provided for each digit key of the keyboard. Nine electro-magnets or solenoids 653 are secured to the floor 59 in line with the several adding rods 50. The several plungers 654 of said electro-magnets are connected with the several adding rods 50. Any suitable source of electrical energy, herein conventionally shown at 655, may be used. The generator 655 is connected by wire 656 with one end of each electro-magnet coil, the other end of which is connected with wire 660. The several wires 660 are connected to the several contact springs 659. The other contact springs 658 are connected by wire 657 with the other pole of the generator. Thus, the depression of the several keys and key shafts will, by closing said normally open circuits, energize the several electro-magnets respectively in circuit therewith. The operation of said electromagnets will draw back the adding rods 50 connected therewith, thus performing the addition of the corresponding amount in the column operated. The length of the downward stroke of any digit key need be only sufficient to set pawl 11ᴬ and lift latch 18 (Figs. 54 and 55). Having set pawl 11ᴬ, the circuit through the corresponding electromagnet 653 being closed by the contact members 663, 658 and 659, then the electro-magnet will add the proper amount in the column operated, but rod 33—36 will not be drawn back sufficiently to cause hammer 109 to strike its printing blow. I therefore provide that rod 33—36 shall be given sufficient movement to operate the hammers 109 as follows: A guide-comb 644 runs between the side frames B and B' and is fastened solidly thereto. The several rods 33—36 pass between the teeth of said guide comb resting on the solid part at the base of the teeth. Pin 644' passes through the teeth and over rods 33—36.

As shown in Fig. 76, the pin in the arm of bellcrank 560 rests in a slot in the end of arm 33—36. Notch 33ᴅ is provided on the under side of rod 33—36. Arm 649 is fastened solidly to shaft 26 just inside the frame D, and arm 649' is a duplicate thereof on shaft 26 just inside the frame D'. Rod 650 connects said arms. Arm 651 is fastened solidly to shaft 26 just inside the frame B, and a duplicate arm 651' is on shaft 26 just inside of frame B'. Rod 652 connects the ends of said arms. Assuming now that the "9" key of the unit column is depressed, pawl 11ᴬ will be set into the unit gear wheel 1 and its latch 18 lifted as already described. Bellcrank 560 will also be swung and will draw rod 33—36 backward until lever 103 is in contact with the operating arm of the hammer 109. At this point the contact member 663 will engage the contact springs 658 and 659 and the key 71 comes to the end of its stroke. Thereupon electro-magnet 653 pulls rod 50, causing the addition of 9 in the units column, and in so doing, part 47 swinging on shaft 26, and strikes rod 650, which turns shaft 26 acting through arms 649 and 649'. The turning of shaft 26 swings arms 651 and 651' carrying the rod 652, into engagement with notch 33ᴅ in rod 33—36, thus imparting to rod 33—36 the necessary movement to operate the hammer 109. In a similar manner an electro-magnet may be provided to pull rod 167 (Figs. 2 and 5) to print the sum, and another electromagnet to pull rod 320 (Fig. 12) to operate the inked tape and the spacing mechanism. By providing the machine in this manner with electro-magnets, I am enabled to use a much shorter and lighter stroke of the keys, thereby rendering possible the more rapid and easy operation of the machine.

*Modification of mechanism for operating the cradle.*—It is to be recalled by reference particularly to Figs. 4 and 14, that provision is made whereby the first part of the movement of a key will set the pawl for operating the number wheel, and the remainder of the movement will swing the pawl downward to rotate the number wheel. This is accomplished in the machine as heretofore described by providing lost motion between the pin 49 and the cam or working surface of slot 46 in adding arm 44 (Fig. 14). Therefore, when the pin 49 swings forward, during the initial part of the stroke of the key, it will simply move from the normal, inoperative position shown in Fig. 14 to the working face of slot 46, without affecting adding arm 44, and consequently, without affecting the pawl arm or the number wheel; and the remainder of the stroke of the key will swing adding arm 44 and perform the addition on the number wheel.

In Fig. 79 I have shown certain modifications wherein the lost motion for effecting the same purpose is between link 39 and the arm of cradle H, instead of between pin 49 and adding arm 44. In this modification adding arm 44$^a$ is of slightly different shape from adding arm 44, and slots 45$^a$ and 46$^a$ correspond with but are of slightly different form from slots 45 and 46 shown in Figs. 4 and 14. The pin 49 (Fig. 79) when in normal position, corresponding to that shown in Fig. 14, instead of being spaced from the working face of slots 46$^a$ is in engagement therewith, so that the moment the rod 50 swings pin 49 forward on arm 47 the adding arm 44$^a$ will also start to swing arm 41 and link 39 downward. Link 39 is provided at its upper end with a slot 39$^a$, in which the stud 38 on the cradle H works. When adding arm 44$^a$ is thus swung forward, the cradle will not start until the upper end of slot 39$^a$ engages stud 38. Thus lost motion is provided whereby the key may first set the pawl to actuate the number wheel, and further movement of the key will swing the cradle to actuate the number wheel. Latch 154$^a$ corresponds with latch 154' in Fig. 5, and parts 155$^a$ and 156$^a$ correspond respectively with parts 155 and 156 in Fig. 5. Pin 154$^b$ acts as a stop for latch 154$^a$. In other respects the parts shown in Fig. 79 are like those shown in Figs 4, 5 and 14.

*Modification of column rod locking mechanism.*—Instead of the locking mechanism for the column rods illustrated in Figs. 1, 2, 3, 54 and 55, comprising the rocker 152, that shown in Figs. 80, 81 and 82 may be used. In the last mentioned figures I have illustrated the modified form of lock as applied to the form of machine shown in Figs. 54 and 55. Extending between side frames B and B', above the rods 36, is a cross bar $b$ which supports the locking devices. The locking devices consist of the flaring plates 152$^a$, arranged alternately in an upper and a lower tier, and pivoted to cross bar $b$ by screws 152$^b$, so as to swing laterally on their pivots. The plates 152$^a$ of the lower tier are provided with shoulders 152$^c$ which abut against the edges of the plates of the upper tier, thus each plate engages the plate or plates adjacent thereto and the movement of any one will move all the others on the side thereof in the direction of the movement. Blocks $b'$, $b'$, secured to the inside of frames B' and B, limit the lateral movement of the locking plates 152$^a$. The column rods 36 are each provided on their upper sides with lugs or projections 36$^a$ rising close to the rear ends of said locking plates and in lines passing through their abutting edges. When any rod 36 is drawn forward by the operation of a key, the lug 36$^a$ on such rod will pass between two adjacent plates 152$^a$, spreading them apart, and thereby swinging all the other plates on the same sides of the lug respectively with the two operated, so that all will be clamped and firmly held between the lug 36$^a$ and the blocks $b'$ and $b$. It will then be impossible to pull any other rod 36 forward until the rod operated has been returned and its lug 36$^a$ removed from between the plates 152$^a$. It will also be impossible to draw two column rods 36 forward at the same time because, all the plates 152$^a$ being in engagement edge to edge, any two lugs 36$^a$ moving forward together would tend to move the plate or plates therebetween in opposite directions, and would be blocked thereby. The edges of the locking plates toward the working faces of the lugs 36$^a$ are beveled as shown in the drawings, to facilitate the spreading of the plates by the lugs.

I claim:—

1. In a machine of the character described, a plurality of type wheels journaled side by side, tripping mechanisms by which each type wheel will at a predetermined point in its rotation, rotate the adjacent wheel appropriate to the next higher column a predetermined distance, a plurality of printing hammers adapted to strike the types of said type wheels, and a type plate bearing types corresponding to the types of the type wheels, said type plate being movable in the path of said hammers between the hammers and the type wheels, and also movable out of the path of the hammer.

2. In a machine of the character described, a plurality of type wheels journaled side by side, tripping mechanisms by which each type wheel will at a predetermined point in its rotation, rotate the adjacent wheel appropriate to the next higher column a predetermined distance, a plurality of printing hammers adapted to strike the types of said type wheels, and a curved type plate carried by a pivoted cradle and bearing types corresponding to the types of the type wheels, said type plate being adapted to be swung on said cradle in the path of said hammers between the hammers and the type wheels, and also to be swung out of the path of the hammers.

3. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of individually movable printing hammers adapted respectively to strike the types of the several type wheels, and printing types supported in series corresponding to the series of the types on the type wheels, said printing types being movable in the path of said hammers between the hammers and the type wheels, and also movable out of the path of the hammers, and means to actuate said hammers individually to cause them to strike each its respective series of printing types.

4. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheel, printing types supported in series corresponding to the series of the types on the type wheels, said printing types being movable in the path of said hammers between the hammers and the type wheels, and also movable out of the path of the hammers, and columns of keys numbered in series like the series of the types on the corresponding type wheels and printing types, and connections between each key, and the printing types and type wheel and hammer of the corresponding column, adapted when such key is operated both to print from the printing types and to add on the proper column the amount indicated by said key.

5. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheel, printing types supported in series corresponding to the series of the types on the type wheels, said printing types being movable in the path of said hammers between the hammers and the type wheels, and also movable out of the path of the hammers, columns of keys numbered in series like the series of the types on the corresponding type wheels and printing types, connections between each key, and the printing types and type wheel and hammers of the corresponding column, adapted when such key is operated both to print from the printing types and to add on the proper column the amount indicated by said key, and a single lever or key adapted to operate all of the hammers in unison to strike the type wheels when the printing types are out of the path of the hammers.

6. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of individually movable printing hammers adapted respectively to strike the types of the several type wheels, and printing types supported in series corresponding to the series of the types on the type wheels, said printing types being movable in the path of said hammers between the hammers and the type wheels, and also movable out of the path of the hammers, means to actuate any of said type wheels and the series of printing types corresponding thereto, to move the same into proper relative positions to effect the desired computation, and means to actuate said hammers individually to cause them to strike each its respective series of printing types.

7. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of individually movable printing hammers adapted respectively to strike the types of the several type wheels, printing types supported in series corresponding to the series of the types on the type wheels, said printing types being movable in the path of said hammers between the hammers and the type wheels, and also movable out of the path of the hammers, means to actuate any of said type wheels and the series of printing types corresponding thereto, to move the same into proper relative positions to effect the desired computation, and means positively to arrest said type wheels and said printing types at a predetermined point in their movement, and means to actuate said hammers individually to cause them to strike each its respective series of printing types.

8. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of individually movable printing hammers adapted respectively to strike the types of the several type wheels, printing types supported in series corresponding to the series of the types on the type wheels, said printing types being movable in the path of said hammers between the hammers and the type wheels, and also movable out of the path of the hammers, a printing sheet, such as an inked ribbon, between said hammers and said types, and means to actuate said hammers individually to cause them to strike each its respective series of printing types.

9. In a machine of the character described, a plurality of type wheels journaled side by side, tripping mechanisms by which each type wheel will, at a predetermined point in its rotation, rotate the adjacent type wheel appropriate to the next higher column a predetermined distance, a plurality of individually movable printing hammers adapted respectively to strike the types of the several type wheels, printing types supported in series corresponding to the series of the types on the type wheels, said printing types being movable in the path of said hammers between the hammers and the type wheels, and also movable out of the path of the hammers, and means to actuate said hammers individually to cause them to strike each its respective series of printing types, a paper carrier adapted to support paper between said hammers and said types.

10. In a machine of the character described, a plurality of type wheels journaled side by side, tripping mechanisms by which each type wheel will at a predetermined point in its rotation, rotate the adjacent wheel appropriate to the next higher column a predetermined distance, a plurality of individually movable printing hammers adapted respectively to strike the types of the several type wheels, printing types supported in series corresponding to the series of the types on the type wheels, said printing types being movable in the path of said hammers between the hammers and the type wheels, and also movable out of the path of the hammers, means to actuate said hammers individually to cause them to strike each its respective series of printing types, an inked ribbon extending between said hammers and said types, and a paper carrier adapted to support and feed paper between said inked ribbon and said hammers.

11. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheel, printing types supported in series corresponding to the series of the types on the type wheels, said printing types being movable in the path of said hammers between the hammers and the type wheels, and also movable out of the path of the hammers, and a spring adapted to urge said printing types toward their normal position.

12. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of individually movable printing hammers adapted to strike the types of said type wheels, and printing types supported in series corresponding to the series of the types on the type wheels, said printing types normally having their zero type in the path of the hammer, and being movable to bring the other types thereof into the path of the hammer and also to remove said printing types from the path of the hammer.

13. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheel, printing types supported in series corresponding to the series of the types on the type wheels, said printing types being movable in the path of said hammers between the hammers and the type wheels, and also movable out of the path of the hammers, a series of keys adapted to actuate the type wheels, the printing types to correspond with the movement of the type wheels, and the hammers individually to strike the printing types, and means adapted to actuate the hammers together, to strike the type wheels.

14. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheels, and printing types supported in series corresponding to the series of the types on the type wheels, said printing types normally having their zero type in the path of the hammer, and being movable to bring the other types thereof into the path of the hammer, and also to remove said printing types from the path of the hammer, a series of keys adapted to actuate the type wheels, the printing types to correspond with the movement of the type wheels, and the hammers individually, to strike the printing types, and means adapted to remove said printing types from the path of said hammers and to actuate the hammers together, to strike the type wheels.

15. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheels, and printing types supported in series corresponding to the series of the types on the type wheels, said printing types normally having their zero type in the path of the hammers, and being movable to bring the other types thereof into the path of the hammers and also to remove said printing types from the path of the hammers, a series of keys adapted to actuate the type wheels, the printing types to correspond with the movement of the type wheels, and the hammers individually to strike the printing types, and means adapted to remove said printing types from the path of said hammers and to actuate the hammers together, to strike the type wheels, said means automatically actuated by a single lever or key.

16. In a machine of the character described, a plurality of type wheels journaled side by side, tripping mechanisms by which each type wheel will at a predetermined point in its rotation, rotate the adjacent type wheel appropriate to the next higher column a predetermined distance, a plurality of printing hammers adapted to strike the types of said type wheels, and printing types supported in series corresponding to the series of the types on the type wheels, said printing types normally having their zero types in the path of the hammers and being movable to bring the other types thereof into the path of the hammers and also to remove said printing types from the path of the hammers, a series of keys comprising digit keys and zero keys, said digit keys adapted to actuate the type wheels, the printing types, and the hammers individually to strike the printing types, and the zero keys adapted to actuate the hammers to strike the zero of the printing types, and means to remove said printing types from the path of said hammers and to actuate the hammers together to strike the type wheels.

17. In a machine of the character described, a plurality of type wheels journaled side by side, tripping mechanisms by which each type wheel will at a predetermined point in its rotation, rotate a type wheel higher in order a predetermined distance, a plurality of individually movable printing hammers adapted respectively to strike the types of the several type wheels, printing types supported in series corresponding to the series of the type on the type wheels, said printing types being movable in the path of said hammers between the hammers and the type wheels and also movable out of the path of the hammers, a series of keys, and mechanisms controlled by said keys adapted at each operation to move the printing type appropriate to the key being operated into the path of the corresponding hammer, thereafter to actuate said hammer individually to strike said printing type, and thereafter to restore said printing type to normal position.

18. In a machine of the character described, a plurality of number wheels journaled side by side, tripping mechanism by which each number wheel will, at a predetermined point in its rotation, rotate the adjacent number wheel appropriate to the next higher column a predetermined distance, each number wheel having a gear fastened solidly thereto, a gear wheel meshing with each number wheel gear, a single pawl-carrying shaft extending across the peripheries of said gear wheels, pawls on said shaft, one for each gear wheel, means to engage said pawls one at a time with the respective gear wheels, means to move said shaft to rotate the gear wheel connected therewith by a pawl a predetermined distance, means to disengage said pawl and means to return said shaft to its original position.

19. In a machine of the character described, a plurality of number wheels journaled side by side, tripping mechanism by which each number wheel will, at a predetermined point in its rotation, rotate the adjacent number wheel appropriate to the next higher column a predetermined distance, each number wheel having a gear fastened solidly thereto, a gear wheel meshing with each number wheel gear, a single pawl-carrying shaft extending across the peripheries of said gear wheels carried by a cradle pivotally mounted concentric with said gear wheels, said cradle comprising a pair of pawl arms one at each side of the gear wheels, pawls on said shaft, one for each gear wheel, means to engage said pawls one at a time with their respective gear wheels, means to swing said cradle and shaft to rotate the gear wheel connected therewith by a pawl a predetermined distance, means to disengage said pawl and means to return said cradle to its original position.

20. In a machine of the character described, a plurality of type wheels journaled side by side, tripping mechanism by which each type wheel will, at a predetermined point in its rotation, rotate the adjacent type wheel appropriate to the next higher column a predetermined distance, each type wheel having a gear fastened solidly thereto, a gear wheel meshing with each type wheel gear, a cradle pivotally mounted concentric with said gear wheels, a type plate carried by one end of said cradle, and a shaft carried by the other end of said cradle, pawls on said shaft, one for each gear wheel, means to engage said pawls one at a time with their respective gear wheels, a plurality of hammers movable in a path to strike the type-wheels, means to swing said cradle to rotate the gear wheel connected therewith by a pawl a predetermined distance and simultaneously to swing said type plate between said type wheels and said hammers, means to disengage said pawl and means to return said cradle to its original position.

21. In a machine of the character described, a plurality of type wheels journaled side by side, the tripping mechanisms between said type wheels, the printing hammers movable in a path to strike said type wheels, the printing types movable in and out of the path of said hammers, a series of keys adapted to actuate the printing types, and also the type wheels and the hammers individaually to strike the printing types, means to actuate said hammers together when the printing types are removed from the path of said hammers, and means when the hammers are operated together to block or arrest the printing stroke of those hammers appropriate to the type wheels which have not been operated.

22. In a machine of the character described, a plurality of type wheels journaled side by side, the tripping mechanisms between said type wheels, the printing hammers movable in a path to strike said type wheels, the printing types movable in and out of the path of said hammers, a series of keys adapted to actuate the printing types, and also the type wheels and the hammers individually to strike the printing types, means to actuate said hammers together when the printing types are removed from the path of said hammers, blocks normally in position to prevent the hammers from printing, and means automatically to remove said blocks from the path of such of the hammers as correspond with the type wheels which have been operated.

23. In a machine of the character described, a plurality of number wheels journaled side by side, a gear fastened solidly to each number wheel, a gear wheel meshing with each number wheel gear, a plurality of keys to actuate said gear wheels individually, and means to reset said number wheels to their original or zero position, comprising a resetting shaft rotatably mounted transverse of said gear wheels, pinions loose upon said shaft meshing with said gear wheels, one for each gear wheel, yielding shaft-engaging means mounted on each pinion, abutments for said shaft-engaging means upon said resetting shaft, said yielding shaft-engaging means adapted to slip over said abutments and permit said pinions to turn idly on said resetting shaft during the operation of said gear wheels and type wheels, and to engage said abutments and turn said pinions with said resetting shaft when the latter is rotated, so as to return all of said pinions, gear wheels and number wheels to their original positions.

24. In a machine of the character described, a plurality of number wheels journaled side by side, a gear fastened solidly to each number wheel, a gear wheel meshing with each number wheel gear, a plurality of keys to actuate said gear wheels individually, and means to reset said number wheels to their original or zero position, comprising a resetting shaft rotatably mounted transverse of said gear wheels, pinions loose upon said shaft meshing with said gear wheels, one for each gear wheel, the ratio between the number of teeth on the pinions and on the gears fastened to the type wheels, being such that the number of teeth on the pinions is divisible by the number of teeth on said gears, spring pressed pawls mounted on the sides of said pinions, said resetting shaft provided with a shoulder to engage said pawls, said pawls adapted to slip over said shoulder and permit said pinions to turn idly on said resetting shaft during the operation of said gear wheels and type wheels, and to engage said shoulder and turn said pinions with the said resetting shaft when the latter is rotated, so as to return all of said pinions, gear wheels and number wheels to their original positions.

25. In a machine of the character described, a plurality of number wheels journaled side by side, a gear fastened solidly to each number wheel, a gear wheel meshing with each number wheel gear, a plurality of keys to actuate said gear wheels individually, tripping mechanism, means automatically locking said gear wheels against movement excepting when a key is being operated, and mechanism for resetting said number wheels to their original position, comprising means to unlock all of said gear wheels, a rotatable resetting shaft, connections between said resetting shaft and said gear wheels to return them all to their original positions, when said shaft is rotated, and connections between said resetting shaft and said gear wheel locking mechanisms adapted automatically to lock said gear wheels against movement when the shaft has been rotated to reset said gear wheels and number wheels to their original positions.

26. In a machine of the character described, a plurality of number wheels journaled side by side, a plurality of keys to actuate said number wheels individually, tripping mechanisms, means automatically locking said number wheels against movement excepting when a key is being operated, and mechanism for resetting said number wheels to their original position comprising means to unlock all of said wheels, and to throw said tripping mechanisms out of operative position, means to turn said number wheels to their original position and there to relock said number wheels and to restore said tripping mechanism to operative position.

27. In a machine of the character described, a plurality of type wheels journaled side by side, a plurality of keys to actuate said type wheels individually, tripping mechanisms, means automatically locking said type wheels against movement excepting when a key is being operated, printing hammers also actuated by said keys adapted to strike said type wheels, blocks normally in position to prevent the hammers from printing and means to remove said blocks from the path of such of the hammers as correspond with the type wheels which have been operated, and resetting mechanism comprising means to unlock all of said wheels and throw said tripping mechanisms out of operative position and there relock them, and to restore said tripping mechanism to operative position and said hammer blocks to their normal position.

28. In a machine of the character described, a plurality of type wheels journaled side by side, a plurality of keys to actuate said type wheels individually, tripping mechanisms, means locking said type wheels against movement excepting when a key is being operated, printing hammers actuated by said keys adapted to strike said type wheels, blocks normally in position to prevent the hammers from striking said type wheels, and mechanisms to remove said blocks from the path of the hammers, actuated when the corresponding type wheels respectively are operated, means to unlock all of said type wheels and to throw said tripping mechanisms out of operative position, and a rotatable resetting shaft connected with said type wheels, with said type wheel locking means, with said tripping mechanisms and with said hammer blocks, adapted when turned to reset said type wheels to their original position, relock them in that position, restore said tripping mechanisms to operative position, and restore said hammer blocks to their normal positions.

29. In a machine of the character described, a plurality of type wheels journaled side by side, a gear fastened solidly to each type wheel, a gear wheel meshing with each type wheel gear, keys to actuate said gear wheels individually, tripping mechanisms, means locking said type wheels against movement excepting when a key is being operated, printing hammers actuated by said keys adapted to strike said type wheels, blocks normally in position to prevent the hammers from striking said type wheels and mechanisms to remove said blocks from the path of the hammers, actuated when the corresponding type wheels respectively are operated, means to unlock all of said type wheels and to throw said tripping mechanisms out of operative position, a rotatable resetting shaft, pinions loose upon said shaft meshing with said gear wheels, one for each gear wheel, said pinions turning idly on said shaft during the operation of said gear wheels and type wheels, and mechanisms connected with said shaft adapted when said shaft is turned, to reset said type wheels to their original position, relock them in that position, restore said tripping mechanisms to operative position, and restore said hammer blocks to their normal positions.

30. In a machine of the character described, a plurality of number wheels journaled side by side, tripping mechanisms, each number wheel having a gear fastened solidly thereto, a gear wheel meshing with each number wheel gear, a shaft transverse of said gear wheels, pawls on said shaft, one for each gear wheel, pawl setting levers adapted to press said several pawls into engagement with their respective gear wheels, keys to actuate said levers and to move said shafts to rotate the gear wheel connected therewith by a pawl a predetermined distance, means to hold said pawl in engagement with said gear wheel during its stroke, means to disengage said pawl from said gear wheel at the end of said stroke, and means to return said shaft and its pawls to their original position.

31. In a machine of the character described, a plurality of number wheels journaled side by side, tripping mechanisms, each number wheel having a gear fastened solidly thereto, a gear wheel meshing with each number wheel gear, a lock for each gear wheel normally preventing the rotation thereof, a shaft transverse of said gear wheels, pawls on said shaft, one for each gear wheel, pawl setting levers adapted to press said several pawls into engagement with their respective gear wheels and to disengage said locks from their respective gear wheels, keys to actuate said levers and to move said shafts to rotate the gear wheel connected therewith by a pawl a predetermined distance, means to hold said pawl in engagement with said gear wheel during its stroke, means to disengage said pawl from said gear wheel and to reset said lock at the end of said stroke, and means to return said shaft and its pawls to their original position.

32. In a machine of the character described, a plurality of number wheels journaled side by side, tripping mechanisms, each number wheel having a gear fastened solidly thereto, a gear wheel meshing with each number wheel gear, a lock for each gear wheel normally preventing the rotation thereof, a shaft transverse of said gear wheels, pawls on said shaft, one for each gear wheel, mechanism to set said pawls individually in their respective gear wheels and to disengage said locks from their respective gear wheels, said last mentioned operations so timed that the pawl will begin to enter between the gear teeth before the lock is fully withdrawn from the gear teeth, keys to actuate said pawl setting mechanism and to move said shafts to rotate the gear wheel connected therewith by a pawl a predetermined distance, means to hold said pawl in engagement with said gear wheel during its stroke, means to disengage said pawl from said gear wheel and to reset said lock at the end of said stroke, said last named operations so timed that the lock will begin to enter between the gear teeth before the pawl is fully withdrawn from said gear teeth, and means to return said shaft and its pawls to their original position.

33. In a machine of the character described, a plurality of number wheels journaled side by side, tripping mechanisms, each number wheel having a gear fastened solidly thereto, a gear wheel meshing with each number wheel gear, a shaft transverse of said gear wheels, pawls on said shaft, one for each gear wheel, pawl setting levers adapted to press said several pawls into engagement with their respective gear wheels, keys to actuate said levers and to move said shaft to rotate the gear wheel connected therewith by a pawl a predetermined distance, said pawl setting levers having pawl engaging surfaces curved in a plane concentric with the axis of the gear wheels when the levers are in operative positions, adapted to hold said pawls in engagement with their respective gears during the operating stroke of the key, and means to withdraw said levers from said pawls to permit the latter to disengage from their respective gear wheels at the end of said stroke, and return to their normal position.

34. In a machine of the character described, a plurality of number wheels journaled side by side, tripping mechanisms, each number wheel having a gear fastened solidly thereto, a gear wheel meshing with each number wheel gear, a lock for each gear wheel normally preventing rotation thereof, a shaft transverse of said gear wheels, pawls on said shaft, one for each gear wheel, pawl setting levers adapted to press said several pawls into engagement with their respective gear wheels, and to disengage said locks from their respective gear wheels, keys to actuate said levers and to move said shaft to rotate the gear wheel connected therewith by a pawl a predetermined distance, said pawl setting levers having pawl engaging surfaces curved in a plane concentric with the axis of the gear wheels when the levers are in operative positions, adapted to hold said pawls in engagement with their respective gears during the operating stroke of the key, means to permit said locks to return to their normal position at the end of said stroke, and means to withdraw said levers from said pawls to permit the latter to disengage from their respective gear wheels at the end of said stroke, and return to their normal position.

35. In a machine of the character described, a plurality of number wheels journaled side by side, tripping mechanisms, each number wheel having a gear fastened solidly thereto, a gear wheel meshing with number wheel gear, a movable shaft transverse of said gear wheels, pawls on said shaft, one for each gear wheel, and means to set said pawls, each such pawl provided with a latch pivoted eccentric to the axis of the pawl, and with a detent adapted to engage said latch when the pawl is swung forward to engage with its gear wheel, whereby the pawl will automatically be locked when moved to operative position, and means to disengage said latch from said detent, to permit the pawl to disengage from the gear wheel.

36. In a machine of the character described, a plurality of number wheels journaled side by side, tripping mechanisms, each number wheel having a gear fastened solidly thereto, a gear wheel meshing with number wheel gear, a movable shaft transverse of said gear wheels, pawls on said shaft, one for each gear wheel, and means to set said pawls, each such pawl provided with a latch pivoted eccentric to the axis of the pawl, and with a detent adapted to engage said latch when the pawl is swung forward to engage with its gear wheel, and each pawl provided with a spring normally urging the latch against the pawl and a spring normally urging the pawl away from the gear wheel, the tension of the latter spring being sufficient to overcome the tension of the former, whereby the pawl will automatically be locked when moved to operative position, and will normally tend to swing into disengaged position when the latch is disengaged, and means to disengage said latch from said detent, to permit the pawl to disengage from the gear wheel.

37. In a machine of the character described, a plurality of number wheels journaled side by side, tripping mechanisms, each number wheel having a gear fastened solidly thereto, a gear wheel meshing with number wheel gear, a movable shaft transverse of said gear wheels, pawls on said shaft, one for each gear wheel, and means to set said pawls, each such pawl provided with a latch pivoted eccentric to the axis of the pawl, and with a detent adapted to engage said latch when the pawl is swung forward to engage with its gear wheel, each pawl provided with a spring mounted on said shaft, one end of which urges the latch toward the pawl and the other end of which urges the pawl away from the gear wheel, the tension exerted by the latter end overbalancing the tension exerted by the former end, whereby the pawl will automatically be locked when moved to operative position, and will normally tend to swing into disengaged position when the latch is disengaged, and means to disengage said latch from said detent to permit the pawl to disengage from the gear wheel.

38. In a machine of the character described, a plurality of gear wheels adapted severally to actuate number wheels, a lock for each gear wheel normally adapted to engage and hold the same against rotation excepting when the tripping pawl is making its tripping stroke, and tripping mechanisms between said gear wheels, each comprising a cam wheel rotatable with one of the gear wheels, a dog engaging and operated by said cam wheel, a tripping pawl pulled back by said dog and adapted to move the gear wheel next higher in order each time said dog drops off a cam tooth, and means between said dog and the lock engaging the gear wheel next higher in order adapted to disengage said lock from said gear wheel while said tripping pawl is making its tripping stroke, and to relock said gear wheel after each operation of the tripping pawl.

39. In a machine of the character described, a plurality of gear wheels adapted severally to actuate number wheels, a lock for each gear wheel normally adapted to engage and hold the same against rotation excepting when the tripping pawl is making its tripping stroke, and tripping mechanism between said gear wheels, each comprising a cam wheel rotatable with one of the gear wheels, a dog engaging and operated by said cam wheel, a tripping pawl pulled back by said dog and adapted to move the gear wheel next higher in order each time said dog drops off a cam tooth, means to disengage said lock from said gear wheel the instant before the tripping pawl engages said gear wheel to trip the same, and means to reset said lock in said gear wheel at the instant of the completion of each stroke of said tripping pawl.

40. In a machine of the character described, a plurality of gear wheels adapted severally to actuate number wheels, a lock for each gear wheel normally adapted to engage and hold the same against rotation excepting when the tripping pawl is making its tripping stroke, and tripping mechanisms between said gear wheels, each comprising a cam wheel rotatable with one of the gear wheels, a dog engaging and operated by said cam wheel, a tripping pawl pulled back by said dog and adapted to move the gear wheel next higher in order each time said dog drops off a cam tooth, means to disengage said lock from said gear wheel the instant before the tripping pawl engages said gear wheel to trip the same, and means positively to arrest and relock said gear wheels simultaneously with the completion of the tripping stroke of said tripping pawl.

41. In a machine of the character described, a plurality of gear wheels adapted severally to actuate number wheels, a lock for each gear wheel normally adapted to engage and hold the same against rotation excepting when the tripping pawl is making its tripping stroke, and tripping mechanisms between said gear wheels, each comprising a cam wheel rotatable with one of the gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to disengage said lock from said gear wheel when said dog drops off a cam tooth, and means to reset said lock in said gear wheel simultaneously with the completion of the tripping stroke of the tripping pawl.

42. In a machine of the character described, a plurality of gear wheels adapted severally to actuate number wheels, a pivoted latch to lock each gear wheel normally engaging and holding the same against rotation, and tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, and a coil spring adapted to drop the dog off the cam tooth to actuate said arm, thereby lifting said latch to rotate said gear wheel, and to engage said latch when lifted and again impel it toward its locking position.

43. In a machine of the character described, a plurality of gear wheels adapted severally to actuate number wheels, a pivoted latch to lock each gear wheel, normally engaging and holding the same against rotation, and tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, and a spring adapted to drop the dog off the cam tooth, thereby actuating the arm, to lift said latch and to rotate said gear wheel.

44. In a machine of the character described, a plurality of gear wheels adapted severally to actuate number wheels, a pivoted latch to lock each gear wheel, normally engaging and holding the same against rotation, tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, by means comprising a latch operating piece, adapted to lift said latch when swung backward and to permit said latch to be lifted independently of said latch operating piece, said latch operating piece being in the path of and actuated by said arm during the tripping stroke of the latter, momentarily to lift said latch.

45. In a machine of the character described, a plurality of gear wheels adapted severally to actuate number wheels, a pivoted latch to lock each gear wheel, normally engaging and holding the same against rotation, tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, by means comprising a latch operating piece, adapted to lift said latch when swung backward and to permit said latch to be lifted independently of said latch operating piece, said latch operating piece being in the path of and actuated by said arm during the tripping stroke of the latter, momentarily to lift said latch, said latch operating piece and said arm being connected by a coil spring under tension.

46. In a machine of the character described, a plurality of gear wheels adapted severally to actuate number wheels, a pivoted latch to lock each gear wheel, normally engaging and holding the same against rotation, tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth by means comprising a latch operating piece, adapted to lift said latch when swung backward and to permit said latch to be lifted independently of said latch operating piece, said latch operating piece being in the path of and actuated by said arm during the tripping stroke of the latter, momentarily to lift said latch, and a stop to limit the forward movement of the latch operating piece.

47. In a machine of the character described, a plurality of gear wheels adapted severally to actuate number wheels, a pivoted latch to lock said gear wheels, normally engaging and holding the same against rotation, tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth by means comprising a latch operating piece, adapted to lift said latch when swung backward and to permit said latch to be lifted independently of said latch operating piece, said latch operating piece being in the path of and actuated by said arm during the tripping stroke of the latter, momentarily to lift said latch, and means positively to disengage said arm from said latch operating piece at a predetermined point in its operation.

48. In a machine of the character described, a plurality of gear wheels adapted severally to actuate number wheels, a pivoted latch to lock each gear wheel, normally engaging and holding the same against rotation, and tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, by means comprising a latch operating piece, adapted to lift said latch when swung backward and to permit said latch to be lifted independently of said latch operating piece, said latch operating piece having a shoulder in the path of said arm during the tripping stroke of the latter, and a nose extending under said arm, whereby said arm will during its tripping stroke engage said shoulder to swing said latch operating piece, and thereafter be disengaged from said shoulder by said nose to release said latch operating piece.

49. In a machine of the character described, a plurality of gear wheels adapted severally to actuate number wheels, a pivoted latch to lock each gear wheel normally engaging and holding the same against rotation, and tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, a spring adapted to drop the dog off the cam tooth, to actuate the arm to lift said latch and to rotate said gear wheel, and a stop positively to limit the tripping stroke of said tripping parts.

50. In a machine of the character described, a plurality of gear wheels adapted severally to actuate number wheels, a pivoted latch to lock each gear wheel normally engaging and holding the same against rotation, tripping mechanisms each comprising a cam wheel rotatable with one of said gear wheels, a dog engaging and operated by said cam wheel, a tripping pawl pulled back by said dog and adapted to move the gear wheel next higher in order each time said dog drops off a cam tooth, an arm pulled back by said dog and adapted momentarily to lift and unlock said latch from said gear wheel when said dog drops off a cam tooth, a spring adapted to drop the dog off the cam tooth, to actuate the arm to lift said latch and to rotate said gear wheel, and a stop to engage the rear end of said arm, positively to limit the tripping stroke of said tripping parts.

51. In a machine of the character described, a plurality of number wheels, each wheel having on its periphery a series of numerals, columns of keys, said columns corresponding to the several number wheels, the individual keys of each column being numbered in series to correspond with the numerals on the corresponding number wheels, and means to operate any one of said number wheels from any key in its corresponding column, said means adapted during the first part of the stroke of the key to connect the corresponding number wheel with said key, and during the remainder of its stroke to rotate said number wheel a distance corresponding with the value of the individual key being operated.

52. In a machine of the character described, a plurality of adding wheels and keys in columns corresponding with the adding wheels, a rotatable adding arm shaft, normally disconnected means for operating any one of said adding wheels by rotation of the adding arm shaft, a plurality of adding arms fastened solidly to said shaft, and connected with their respective keys, such connections adapted to cause said adding arms to swing a distance appropriate to the value of the key by which it is operated, other connections between said keys and said normally disconnected adding wheel operating means, adapted to connect the latter with the wheel appropriate to the key being operated during the initial part of the operation of the key, the rest of the operation of said key actuating the adding arm to turn the adding wheel.

53. In a machine of the character described, a plurality of adding wheels and keys in columns corresponding with the adding wheels, a rotatable adding arm shaft, normally disconnected means for operating any one of said adding wheels by rotation of the adding arm shaft, a plurality of adding arms fastened solidly to said shaft, said adding arms provided with cam surfaces of varying angles with one another, means connected with said keys and acting upon said cam surfaces to swing said arms and rotate said shaft varying extents corresponding with the forms of the several cam surfaces, and connections between said keys and said adding wheel operating means to connect the latter with said adding wheels.

54. In a machine of the character described, a plurality of adding wheels, a rotatable adding arm shaft, means for connecting said adding wheels and said adding arm shaft, and adding arms fastened solidly to said shaft, said adding arms each provided with a slot having parallel sides, one side of which constitutes a cam surface and the other side a stop adapted to engage the cam operating means and prevent overthrowing said arm, cam operating means to work in said slot, and means operated by a key to actuate said cam operating means to swing said arm.

55. In a machine of the character described, a plurality of adding wheels, and columns of keys coresponding with said adding wheels, a rotatable adding arm shaft, means for connecting and operating said adding wheels from said adding arm shaft, and adding arms fastened solidly to said shaft one for each numeral other than zero represented by the keys, said adding arms each provided with a slot having parallel sides, one side of which constitutes a cam surface and the other side a stop adapted to engage the cam operating means and prevent overthrowing said arm, the several slots of said arms being disposed at progressively varying angles with one another, cam operating means to work in each slot, and actuating means connecting each cam operating means with all the keys bearing the same numeral.

56. In a machine of the character described, a plurality of adding wheels, and columns of keys corresponding with said adding wheels, a rotatable adding arm shaft, means for connecting and operating said adding wheels from said adding arm shaft, and adding arms fastened solidly to said shaft one for each numeral other than zero represented by the keys, said adding arms each provided with a slot having parallel sides, one side of which constitutes a cam surface and the other side a stop adapted to engage the cam operating means and prevent overthrowing said arm, the several slots of said arms being disposed at progressively varying angles with one another, cam operating means to work in each slot, and actuating means connecting each cam operating means with all the keys bearing the same numeral, each adding arm having a surface adapted to engage and lock its cam operating means against movement when said adding arm shaft is rotated by any means other than such adding arm and its own cam operating means.

57. In a machine of the character described, a plurality of adding wheels, a plurality of gear wheels adapted to turn said adding wheels, a movable pawl shaft extending across said gear wheels, pawls on said shaft to engage said gear wheels, a plurality of operating keys, means controlled by said keys to engage the several pawls with their respective gear wheels, a rotatable adding arm shaft having adding arms fastened solidly thereon, said arms provided with cam surfaces of varying angles with one another, cam-operating means controlled by said keys acting upon said cam surfaces to swing said arms and rotate said shaft varying extents corresponding with the several cam surfaces, and connection between said rotatable adding arm shaft and said pawl-shaft to move the latter.

58. In a machine of the character described, a plurality of adding wheels and columns of keys corresponding with said adding wheels, a rotatable adding arm shaft, means connecting and operating said adding wheels from said adding arm shaft, and adding arms fastened solidly to said shaft, said arms provided with cam surfaces of varying angles with one another, and cam operating means connected with said keys and acting upon said cam surfaces to swing said arms and rotate said shaft varying extents corresponding with the several cam surfaces, said adding arms being adapted to lock all of said cam operating means against movement excepting the one cam operating means by which said adding arm shaft is being rotated.

59. In a machine of the character described, a plurality of adding wheels and columns of keys corresponding with said adding wheels, a rotatable adding arm shaft, means connecting and operating said adding wheels from said adding arm shaft, and adding arms fastened solidly to said shaft, said arms provided with cam surfaces of varying angles with one another, and cam operating means connected with said keys and acting upon said cam surfaces to swing said arms and rotate said shaft varying extents corresponding with the several cam surfaces, each adding arm provided with a surface adapted to engage and lock its own cam operating means against movement when said adding arm shaft is rotated by any means other than such adding arm and its own cam operating means.

60. In a machine of the character described, a plurality of type wheels journaled side by side, tripping mechanisms between said type wheels, a plurality of printing hammers adapted to strike the types of said type wheels, a pivoted cradle to which is secured a curved type plate bearing printing types corresponding to the types of the type wheels, said type plate adapted to be swung on said cradle in the path of said hammers between the hammers and the type wheels, keys adapted to operate said cradle said type wheels and said hammers, and a movable lock adapted automatically to engage and hold said cradle in its normal position against accidental movement.

61. In a machine of the character described, a plurality of type wheels journaled side by side, tripping mechanisms between said type wheels, a plurality of printing hammers adapted to strike the types of said type wheels, a pivoted cradle to which is secured a curved type plate bearing printing types corresponding to the types of the type wheels, said type plate adapted to be swung on said cradle in the path of said hammers between the hammers and the type wheels, keys adapted to operate said cradle said type wheels and said hammers, and a movable lock normally adapted to engage and hold said cradle against movement, and movable by the keys to unlock said cradle.

62. In a machine of the character described, a plurality of type wheels journaled side by side, tripping mechanisms between said type wheels, a plurality of printing hammers adapted to strike the types of said type wheels, a pivoted cradle to which is secured a curved type plate bearing printing types corresponding to the types of the type wheels, said type plate adapted to be swung on said cradle in the path of said hammers between the hammers and the type wheels, keys adapted to operate said cradle said type wheels and said hammers, and a movable lock normally adapted to engage and hold said cradle against movement and movable by the keys to unlock said cradle, and also adapted automatically to relock said cradle upon its return to normal position.

63. In a machine of the character described, a plurality of plungers, keys carried by said plungers, said plungers provided with racks, gear segments engaging said racks, said gear segments loosely mounted on rotatable shafts, and means to cause said segments to turn said shafts when the plungers are depressed and to permit said shafts to turn independently of said segments.

64. In a machine of the character described, a plurality of plungers, keys carried by said plungers, rotatable shafts and connections between said shafts and plungers adapted to turn said shafts when said plungers are depressed and to permit each of said shafts to be turned independently of all the plungers except the one being depressed.

65. In a machine of the character described, a plurality of keys arranged in rows, rotatable shafts one for each of said rows, a set of adding rods and a set of column rods, the several rods of one of said sets actuated respectively by said rotatable shafts, each key adapted to rotate the shaft of its row and also to actuate the corresponding rod of the other set, without affecting any of the other keys, any of the other shafts or any of the other rods.

66. In a machine of the character described, a plurality of keys arranged in rows, rotatable shafts one for each of said rows, a set of adding rods, the several rods of which are actuated respectively by said rotatable shafts, and a set of column rods, each key adapted to rotate the shaft of its row, thereby actuating the adding rod appropriate to such key, and also adapted to actuate the column rod appropriate to such key, without affecting any of the other keys, any of the other shafts or any of the other rods.

67. In a machine of the character described, a plurality of keys arranged in rows, rotatable shafts one for each of said rows, a plunger for each key, a set of adding rods and a set of column rods, a member actuated by each plunger loosely mounted on the shaft corresponding with such plunger, an arm solid on said shaft adapted to be operated to turn the shaft when said plunger actuates said member, and another arm loosely mounted on said shaft adapted to be operated by said member when the plunger is operated, said shaft adapted to operate a rod of one of said sets of rods, and said last-named arm adapted to operate a rod of the other of said sets of rods, whereby each key and its plunger will operate one adding rod and one column rod without affecting the other keys and plungers, the other shafts or the other rods.

68. In a machine of the character described, a plurality of keys arranged in rows, rotatable shafts one for each of said rows, a plunger for each key, a set of adding rods and a set of column rods, a member actuated by each plunger loosely mounted on the shaft corresponding with said plunger, said member having a projection on each side thereof, an arm solid on said shaft at one side of said member in the path of one of said projections, and another arm loosely journaled on said shaft at the other side of said member in the path of the other of said projections, said shaft adapted to operate a rod of one of said sets of rods, and said last named arm adapted to operate a rod of the other of said set of rods, whereby each key and its plunger will operate one adding arm and one column rod without affecting the other keys and plungers, the other shafts or the other rods.

69. In a machine of the character described, a plurality of number wheels, and a plurality of columns of operating keys, said number wheels being arranged relatively closer together than their corresponding columns of keys, column rods actuated each by the keys of its respective column, offset shafts rotated respectively by said column rods, and means connecting each offset shaft with the corresponding number wheel.

70. In a machine of the character described, a plurality of number wheels, a plurality of keys arranged in vertical columns and horizontal rows, said number wheels being arranged relatively closer together than their corresponding columns of keys, a rotatable shaft for each horizontal row of keys, a set of adding rods the several rods of which set are actuated respectively by said rotatable shafts, and a set of column rods, one for each column of keys, said column rods including offset means to connect each column of keys with its corresponding number wheel, each key adapted to operate the shaft of its row and the column rod of its column.

71. In a machine of the character described, a plurality of number wheels, a plurality of keys arranged in vertical columns and horizontal rows, said number wheels being arranged relatively closer together than their corresponding columns of keys, a rotatable shaft for each horizontal row of keys, a set of adding rods the several rods of which set are actuated respectively by said rotatable shafts, a set of column rods, one for each column of keys, a rotatable offset shaft connected with and operated by each column rod, and connection between each offset shaft and its corresponding number wheel.

72. In a machine of the character described, a plurality of number wheels, a plurality of keys, a pawl and gear wheel to operate each number wheel, a cradle carrying all of said pawls, means to engage said pawls one at a time with their respective gear wheels, means to actuate said cradle, a movable stop coöperating with said cradle to arrest the same at various points in its movement, said stop mounted on a rotatable shaft, a plurality of arms fast on said shaft having cam surfaces of varying angles, and cam operating means connected with the keys and acting upon said cam surfaces, adapted to swing said stop varying extents to correspond with the key being operated.

73. In a machine of the character described, a plurality of number wheels, a plurality of keys, a pawl and gear wheel to operate each number wheel, a cradle carrying all of said pawls, means to engage said pawls one at a time with their respective gear wheels, means to actuate said cradle, a plurality of movable stops adapted to arrest said cradle at various points in its movement, said stops moved into operative position by a swinging arm, said arm solid on a rotatable shaft, a plurality of shaft operating arms fast on said shaft, and means to operate said arms from the keys of the machine to varying extents, to move the stop corresponding with the key being operated to its operative position.

74. In a machine of the character described, a plurality of number wheels, and a single movable type plate extending across all of the number wheels in close proximity with the peripheries of said wheels and bearing columns of types in series corresponding to the numbers on the number wheels, said columns registering respectively with the number wheels.

75. In a machine of the character described, a plurality of number wheels, a cradle comprising a pair of side frames, one at each side of the number wheels, a curved type plate mounted on one end of said frames and extending across and in close proximity to the peripheries of said number wheels, said type plate bearing columns of types in series corresponding to the numbers on the number wheels, said columns registering respectively with the number wheels.

76. In a machine of the character described, a plurality of number wheels, a plurality of gear wheels to operate the number wheels, a cradle, comprising a pair of side frames one at each side of the said wheels, a curved type plate mounted on one end of said frames and extending across and in close proximity to the peripheries of said number wheels, said type plate bearing columns of types in series corresponding to the numbers on the number wheels, a shaft connecting the other ends of said frames of the cradle and extending across said gear wheels, and pawls hung on said shaft adapted to engage said gear wheels.

77. In a machine of the character described, a plurality of number wheels, and a movable type plate in close proximity to the peripheries of said wheels and bearing columns of types in series corresponding to the numbers on the number wheels, said columns registering respectively with the number wheels, and a single set of hammers adapted to print either from said number wheels or from said type plate.

78. In a machine of the character described, a plurality of number wheels, a cradle comprising a pair of side frames, one at each side of the number wheels, a curved type plate mounted on one end of said frames and extending across and in close proximity to the peripheries of said number wheels, said type plate bearing columns of types in series corresponding to the numbers on the number wheels, said columns registering respectively with the number wheels, and a single set of hammers adapted to print either from said number wheels or from said type plate.

79. In a machine of the character described, a plurality of number wheels, a plurality of gear wheels to operate the number wheels, cradle bearings in axial alinement with the centers of said gear wheels, a cradle journaled on said bearings comprising a pair of side frames one at each side of the said wheels, a curved type plate mounted on one end of said frames and extending across and in close proximity to the peripheries of said number wheels, said type plate bearing columns of types in series corresponding to the numbers on the number wheels, a shaft connecting the other ends of said frames of the cradle and extending across said gear wheels, and pawls hung on said shaft adapted to engage said gear wheels.

80. In a machine of the character described, the combination with the number wheels, the cam wheels, the keys, and the hammers, of means normally blocking the hammers and movable to unblock such of the hammers as correspond with the number wheels which have been rotated, said means comprising a movable block for each hammer, and connections between each block and the cam wheel of the corresponding number wheel normally holding said block in the path of said hammer and adapted when said cam wheel is operated to permit said block to be removed and said hammer to strike its printing blow.

81. In a machine of the character described, the combination with the number wheels, the cam wheels, the keys, and the hammers, of means normally blocking the hammers and movable to unblock such of the hammers as correspond with the number wheels which have been rotated, said means comprising a movable block for each hammer, connections between each block and the cam wheel of the corresponding number wheel normally holding said block in the path of said hammer and adapted when said cam wheel is operated to permit said block to be removed and said hammer to strike its printing blow, and means to remove said block from the path of said hammer when released by said cam.

82. In a machine of the character described, the combination with the number wheels, the cam wheels, the keys and the hammers, of means normally blocking the hammers and movable to unblock such of the hammers as correspond with the number wheels which have been rotated, said means comprising a movable block for each hammer carried by a two branch lever, connections between one of said branches and the cam wheel of the corresponding number wheel adapted when said cam wheel is operated to permit said lever and block to be moved to unblock said hammer, and connections between the other branch and a key of the corresponding column, adapted to move said lever and block independently of the cam wheel, to unblock said hammer whenever such key is operated.

83. A computing device comprising a frame having side members, a shaft extending between the side members of said frame, a plurality of adjacent number wheels each provided with a pinion fastened solidly thereto, said number wheels mounted on said shaft, another shaft extending between said side frame members, a plurality of gear wheels meshing with said pinions and mounted on the last named shaft, a swinging shaft carried by arms journaled with relation to said frame, a plurality of pawls mounted on said swinging shaft, means supported by said frame to connect said pawls one at a time with their respective gear wheels and to swing said pawl carrying arms, said means adapted to be actuated from various forms of key boards, the whole device constituting a compact self-contained unitary computer complete in itself.

84. A computing device comprising a plurality of adjacent number wheels, a plurality of gear wheels adapted to operate said number wheels, a movable shaft a plurality of pawls mounted thereon to operate said gear wheels, means to engage said pawls one at a time with their respective gear wheels and to move said pawl-carrying shaft, resetting mechanism, and a frame having side members supporting all of said parts in a compact, self-contained, unitary device, complete in itself, and adapted to be coupled with various forms of key boards.

85. In combination, two parallel shafts having their axes fixed relatively to each other, a plurality of gear wheels rotatable on one of said shafts, all of said gear wheels having the same number of teeth and substantially the same diameters, and a plurality of gear wheels rotatable on the other of said shafts all having substantially the same diameter but varying numbers of teeth, meshing respectively with the first mentioned gear wheels.

86. In combination, two parallel shafts having their axes fixed respectively to each other, a gear wheel rotatable on one of said shafts, and a number of interchangeable gear wheels adapted to be mounted on the other of said shafts, said last named gear wheels having varying numbers of teeth and all adapted to mesh with the first named gear wheel.

87. In combination, two parallel shafts having their axes fixed relatively to each other, a plurality of identical gear wheels rotatable on one of said shafts, and a plurality of gear wheels rotatable on the other of said shafts having varying numbers of teeth and meshing respectively with the first mentioned gear wheels.

88. In combination with a plurality of number wheels carrying each a series of numeral characters, the numeral characters on some of said wheels varying in number from those on the other wheels, a shaft, a plurality of uniform or identical gear wheels rotatable on said shaft, another shaft having its axis fixed with relation to the first shaft, and a plurality of gear wheels rotatable on said second shaft having varying numbers of teeth appropriate to the varying numbers of numeral characters on their respective number wheels, meshing with said uniform gear wheels and adapted to actuate said number wheels.

89. In combination, a plurality of number wheels, rotatably mounted on a common shaft, carrying each a series of numeral characters, the numeral characters on some of said wheels varying in number from those on other wheels, said shaft, a plurality of gear wheels fastened solidly to said number wheels and having varying numbers of teeth appropriate to the varying numbers of numeral characters on their respective number wheels, a second shaft having its axis parallel with and fixed with relation to the first shaft, and a plurality of uniform or identical gear wheels rotatable upon said second shaft and meshing with the gears fast to number wheels.

90. In combination, two parallel shafts having their axes fixed relatively to each other, a plurality of gear wheels rotatable on one of said shafts having varying numbers of teeth, all of said gear wheels adapted to mesh with a single form of gear wheel mounted on the other shaft.

91. In a machine of the character described, adapted to the English money system, one or more pounds number wheels each having thereon ten numerals from "0" to "9" inclusive, two shillings number wheels one for the units column and one for the tens column, the units column wheel having thereon numerals from "0" to "9" inclusive, and the tens column wheel having thereon several numerals "1" alternating with blank spaces, and a pence number wheel having thereon numerals from "0" to "11" inclusive, tripping mechanisms adapted when the pence number wheel passes from "11" to "0" to carry 1 on the shillings unit wheel, and when the shillings wheels pass from "19" to "0", to carry 1 on the pounds unit wheel, gears mounted on a common shaft adapted to actuate said number wheels, each having a number of teeth appropriate to its own number wheel, and a plurality of uniform gear wheels mounted on a common shaft and meshing with the first named gear wheels respectively.

92. In a machine of the character described adapted to the English money system, one or more pounds number wheels each having thereon ten numerals from "0" to "9" inclusive, two shillings number wheels one for the units column and one for the tens column, the units column wheel having thereon numerals from "0" to "9" inclusive, and the tens column wheel having thereon several numerals "1" alternating with blank spaces, and a pence number wheel having thereon numerals from "0" to "11" inclusive, tripping mechanisms adapted when the pence number wheel passes from "11" to "0" to carry 1 on the shillings unit wheel, and when the shillings wheels pass from "19" to "0", to carry 1 on the pounds unit wheel, gears mounted on a common shaft adapted to actuate said number wheels the gear actuating the pence number wheel having 12 teeth, and the other gears having 10 teeth each, and a plurality of uniform gear wheels mounted on a common shaft and meshing with the first named gear wheels respectively.

93. In a machine of the character described adapted to the English money system, one or more pounds number wheels each having thereon ten numerals from "0" to "9" inclusive, two shillings number wheels one for the units column and one for the tens column, the units column wheel having thereon numerals from "0" to "9" inclusive, and the tens column wheel having thereon several numerals "1" alternating with blank spaces, and a pence number wheel having thereon numerals from "0" to "11" inclusive, tripping mechanisms adapted when the pence number wheel passes from "11" to "0" to carry 1 on the shillings unit wheel, and when the shillings wheels pass from "19" to "0", to carry 1 on the pounds unit wheel, gears fastened solidly to said number wheels each having a number of teeth appropriate to its own number wheel, and a plurality of uniform gear wheels mounted on a common shaft and meshing with the first named gear wheels respectively.

94. In a machine of the character described adapted to the English money system, one or more pounds number wheels each having thereon ten numerals from "0" to "9" inclusive, two shillings number wheels one for the units column and one for the tens column, the units column wheel having thereon numerals from "0" to "9" inclusive, and the tens column wheel having thereon several numerals "1" alternating with blank spaces, and a pence number wheel having thereon numerals from "0" to "11" inclusive, tripping mechanisms adapted when the pence number wheel passes from "11" to "0" to carry 1 on the shillings unit wheel, and when the shillings wheels pass from "19" to "0", to carry 1 on the pounds unit wheel, gears mounted on a common shaft adapted to actuate said number wheels, each having a number of teeth appropriate to its own number wheel, a plurality of uniform gear wheels mounted on a common shaft and meshing with the first named gear wheels respectively, and resetting mechanism adapted to reset all of said number wheels to zero, including a rotatable shaft carrying gears, each having a number of teeth appropriate to the number of teeth on the corresponding gear which actuates the number wheel.

95. In combination, a plurality of number wheels carrying each a series of numeral characters, the numeral characters on some of said wheels varying in number from those on the other wheels, a shaft, a plurality of uniform or identical gear wheels rotatable on said shaft, another shaft having its axis fixed with relation to the first shaft, a plurality of gear wheels rotatable on said second shaft having varying numbers of teeth appropriate to the varying numbers of numeral characters on their respective number wheels, meshing with said uniform gear wheels and adapted to actuate said number wheels, and tripping mechanism adapted to advance each number wheel of the next higher order when the number wheel of the next lower order completes its series.

96. In a machine of the character described adapted to the English money system, one or more pounds number wheels each having thereon ten numerals from "0" to "9" inclusive, two shillings number wheels, one for the units column having thereon numerals from "0" to "9" inclusive, and one for the tens column having thereon several numerals "1" alternating with blank spaces, gears mounted on a common shaft adapted to actuate said number wheels, each having a number of teeth appropriate to its own number wheel, a plurality of uniform gear wheels mounted on a common shaft and meshing with the first named gear wheels respectively, and a tripping mechanism comprising a double cam wheel fast to the uniform gear wheel of the shillings units column, said shillings tens uniform gear wheel mounted to rotate between the two parts of said double cam wheel, one part of said double cam wheel adapted to actuate the shillings tens column each time the shillings units wheel passes from "9" to "0," and the other part of said double cam wheel adapted to actuate the pounds units column each time the shillings tens column passes from "1" to "0."

97. In combination, a plurality of number wheels carrying each a series of numeral characters, the numeral characters on some of said wheels varying in number from those on the other wheels, a shaft, a plurality of uniform or identical gear wheels rotatable on said shaft, another shaft having its axis fixed with relation to the first shaft, a plurality of gear wheels rotatable on said second shaft having varying numbers of teeth appropriate to the varying numbers of numeral characters on their respective number wheels, meshing with said uniform gear wheels and adapted to actuate said number wheels, and tripping mechanism adapted to advance each number wheel of the next higher order when the number wheel of the next lower order completes its series, said tripping mechanisms including cam wheels fast to said uniform gear wheels having varying numbers of teeth appropriate to the number wheels with which they operate.

98. In a machine of the character described, adapted to the English money system, one or more pounds number wheels each having thereon ten numerals from "0" to "9" inclusive, two shillings number wheels one for the units column and one for the tens column, the units column wheel having thereon numerals from "0" to "9" inclusive, and the tens column wheel having thereon several numerals "1" alternating with blank spaces, and a pence number wheel having thereon numerals from "0" to "11" inclusive, tripping mechanisms adapted when the pence number wheel passes from "11" to "0" to carry 1 on the shillings unit wheel, and when the shillings wheels pass from "19" to "0," to carry 1 on the pounds unit wheel, gears mounted on a common shaft adapted to actuate said number wheels, each having a number of teeth appropriate to its own number wheel, a plurality of uniform gear wheels mounted on a common shaft and meshing with the first named gear wheels respectively, each of said uniform gear wheels having 60 teeth, and said tripping mechanisms comprising a cam wheel of 5 teeth fast to the uniform gear wheel of the pence column, a double cam wheel of 3 and 6 teeth respectively, fast to the uniform gear wheel of the shillings units column, and a cam wheel of 6 teeth fast to each uniform gear wheel of the pounds column.

99. In a machine of the character described, a plurality of number wheels, a gear wheel adapted to rotate each number wheel, tripping mechanism comprising a plurality of cam wheels fixed to and rotatable with one of said gear wheels, and mechanism adapted to engage and rotate said gear wheel to which said cam wheels are affixed, and to disengage therefrom and return to its original position, said cam wheels adapted each to trip one of the other gear wheels and its number wheel of a different order at a predetermined point in the movement of the gear wheel to which said cam wheels are affixed.

100. In combination, a plurality of printing hammers pivotally mounted side by side, a spring to actuate each hammer individually, each spring independently adjustable, and means whereby all of said springs may be adjusted simultaneously to vary the force exerted thereby.

101. In a machine of the character described, a set of type wheels, a type plate in close proximity thereto, and a plurality of printing hammers, the type wheels being in the path of the printing hammers, and the type plate movable into and out of the path of said hammers, the face of said hammers being normally clear of the types, and manually operated means to swing said hammers all together away from said types and to hold them in such position to facilitate the insertion of the paper or the inspection of the printing.

102. In a machine of the character described, a set of type wheels, a type plate in close proximity thereto, and a plurality of printing hammers, the type wheels being in the path of the printing hammers, and the type plate movable into and out of the path of said hammers, the face of said hammers being normally clear of the types, and a manually movable bar transverse of said hammers adapted to engage the inner surfaces thereof and to swing the hammers all together away from said types.

103. In a machine of the character described, a plurality of number wheels, normally disengaged means for actuating said wheels one at a time, a plurality of keys arranged in columns, means controlled by the keys for engaging said normally disengaged actuating means with their respective number wheels, a plurality of rods to operate said number wheel actuating means, and an electro-magnet to move each of said rods, the several circuits of which magnets are controlled by the several keys appropriate thereto.

104. The combination with a typographical machine having a paper carrier support and mechanism for controlling the paper carrier, said support and said controlling mechanism constituting permanent parts of the machine, of a paper carrier wholly self-contained, complete in itself and removable from the machine as a unit without detaching said support and controlling mechanism from the machine, said paper carrier and said mechanism for controlling the same adapted automatically to come into coöperative relationship when the paper carrier is inserted in the machine.

105. The combination with a typographical machine having a paper carrier support and mechanism for controlling the paper carrier, said support and said controlling mechanism constituting permanent parts of the machine, of a paper carrier comprising means for supporting and feeding the paper, said paper carrier and said supporting and feeding means wholly self-contained, complete in itself and removable from the machine as a unit without detaching said support and controlling mechanism from the machine, said means for feeding the paper and said mechanism for controlling the same adapted automatically to come into coöperative relationship when the paper carrier is inserted in the machine.

106. The combination with a typographical machine, having a paper carrier support and mechanism for controlling endwise movement of the paper carrier, said support and said controlling mechanism constituting permanent parts of the machine, of a paper carrier provided with engaging means to coöperate with said controlling mechanism to shift the carrier endwise, said carrier and engaging means being wholly self-contained, complete in itself and detachable from the machine as a unit, and said mechanism for controlling the carrier and the engaging means on the carrier adapted automatically to make coöperative engagement with each other when the carrier is inserted in the machine.

107. The combination with a typographical machine, having a paper carrier support and mechanism for controlling endwise movement of the paper carrier, said support and said controlling mechanism constituting permanent parts of the machine, of a paper carrier provided with engaging means to coöperate with said controlling mechanism to shift the carrier endwise, said carrier and engaging means being wholly self-contained, complete in itself and detachable from the machine as a unit, and said mechanism for controlling the carrier and the engaging means on the carrier adapted automatically to make coöperative engagement with each other when the carrier is inserted in the machine, a stop normally adapted to prevent the carrier from being removed from the machine endwise, and manually operated means to release the stop and permit the carrier to be removed from the machine.

108. The combination with a typographical machine, having a paper carrier support and mechanism for controlling endwise movement of the paper carrier, said support and said controlling mechanism constituting permanent parts of the machine, of a paper carrier provided with engaging means to coöperate with said controlling mechanism to shift the carrier endwise, said carrier and engaging means being wholly self-contained, complete in itself and detachable from the machine as a unit, and said mechanism for controlling the carrier and the engaging means on the carrier adapted automatically to make coöperative engagement with each other when the carrier is inserted in the machine, said paper carrier movable endwise relatively to the machine, power mechanism fixed with relation to one of said relatively movable parts, and coupling means between said power mechanism and the other relatively movable part, said coupling means adapted automatically to engage when the carrier is inserted in the machine and to disengage when the carrier is removed from the machine.

109. The combination with a typographical machine, having a paper carrier support and mechanism for controlling endwise movement of the paper carrier, said support and said controlling mechanism constituting permanent parts of the machine, of a paper carrier provided with engaging means to coöperate with said controlling mechanism to shift the carrier endwise, said carrier and engaging means being wholly self-contained, complete in itself and detachable from the machine as a unit, and said mechanism for controlling the carrier and the engaging means on the carrier adapted automatically to make coöperative engagement with each other when the carrier is inserted in the machine, power mechanism fixed to the machine, a coupling member connected with and actuated by said power mechanism, and a coupling member upon said paper carrier, said coupling members adapted automatically to engage each other when the carrier is inserted in the machine and to disengage from each other when the carrier is removed from the machine.

110. The combination with a typographical machine having a paper carrier support and a lever for actuating the paper feeding mechanism, said support and lever constituting permanent parts of the machine, of a paper carrier having paper feeding mechanism comprising rollers for feeding the paper, ratchet and pawl mechanism actuated by an arm for operating said rollers, and a rod running lengthwise of the paper carrier to move said arm, said paper carrier and its said component parts being self-contained and removable from the machine as a unit without detaching said support and actuating lever from the machine, and said rod extending across and in close proximity to said lever when the carrier is inserted in the machine, whereby the operation of said lever will operate the paper feeding mechanism.

111. In a machine of the character described, a plurality of type wheels journaled side by side, tripping mechanisms therefor, a plurality of individually movable printing hammers adapted to strike the several type wheels, printing types supported in series corresponding to that on the type wheels and movable in the path of said hammers between the hammers and the type wheels and also movable out of the path of the hammers, a series of keys, mechanisms controlled by said keys adapted at each operation of each key except the zero key, to add on said type wheels an amount corresponding to the value of the key being used in the column appropriate thereto, to move the printing type appropriate to the key being used into the path of the corresponding hammer, and to actuate said hammer individually to strike said printing type, and means to actuate all of said hammers in unison corresponding to the type wheels which have been operated, to print the sum therefrom.

112. In a machine of the character described, a plurality of number wheels journaled side by side, a gear fastened solidly to each number wheel, a gear wheel meshing with each number wheel gear, a plurality of keys to actuate said gear wheels individually, and means to reset said number wheels to their original or zero position, comprising a resetting shaft rotatably mounted transverse of said gear wheels, pinions loose on said resetting shaft meshing with said gear wheels, one for each gear wheel, and yielding means to connect each pinion with said resetting shaft, adapted to permit said pinions to turn idly on said shaft during the operation of said gear wheels and number wheels from the keys, and to cause said pinions to turn with said resetting shaft when the latter is rotated, so as to return all of said pinions, gear wheels and number wheels to their original positions.

113. In a machine of the character described, a plurality of type wheels journaled side by side, individually movable printing hammers adapted to strike the several type wheels, printing types supported in series corresponding to that on the type wheels and movable in the path of said hammers between the hammers and the type wheels, a series of operating keys and connections between said keys and said type wheels, printing types and hammers to actuate the same, normally unlocked means to lock said key against operation, means normally locking said type wheels against operation, and means normally locking said printing types against operation, and mechanisms whereby the operation of any one key will automatically lock all the other keys against operation, unlock the number wheel appropriate to such key leaving the other number wheels locked, and unlock the printing types.

114. In a machine of the character described, a plurality of type wheels journaled side by side, individually movable printing hammers adapted to strike the several type wheels, printing types supported in series corresponding to that on the type wheels and movable in the path of said hammers between the hammers and the type wheels, a series of operating keys and connections between said keys and said type wheels, printing types and hammers to actuate the same, normally unlocked means to lock said keys against operation, means normally locking said type wheels against operation, and means normally locking said printing types against operation, mechanisms whereby the operation of any one key will automatically lock all the other keys against operation, unlock the number wheel appropriate to such key leaving the other number wheels locked, and unlock the printing types, and means automatically to restore all of said locks to normal position upon the return of said key to normal position.

115. In a machine of the character described, a plurality of type wheels journaled side by side and keys to operate the same, printing hammers adapted to strike said type wheels to print the sum therefrom, printing types from which the individual items entering into the sum are printed, said hammers adapted to be operated to strike the type wheels by the operation of a single key or lever, and said single key or lever.

116. In a machine of the character described, a plurality of type wheels journaled side by side and keys to operate the same, printing hammers adapted to strike said type wheels to print the sum therefrom, printing types from which the individual items entering into the sum are printed supported to move in the path of said hammers between the hammers and the type wheels and having their zero types normally in the path of said hammers, and a single key or lever adapted at each operation to move said printing types out of the path of said hammers and to actuate said hammers to strike said type wheels.

117. In a machine of the character described, a plurality of type wheels journaled side by side and keys to operate the same, hammers individually operable by said keys, said hammers adapted to strike said type wheels, a type plate bearing types corresponding to those on the type wheels journaled to swing in the path of said hammers between the hammers and the type wheels, the zero types on said type plate being normally in the path of said hammers, and a single sum key or lever adapted at each operation to swing said type plate out of the path of said hammers and to operate said hammers in unison to strike said type wheels.

Signed by me at Boston, Massachusetts, this sixth day of January, 1910.

GEORGE WALKER.

Witnesses:
ROBERT CUSHMAN,
CHARLES D. WOODBERRY.

---

Copies of this patent may be obtained for five cents each, by addressing the "Commissioner of Patents, Washington, D. C."